(12) United States Patent
Masuda

(10) Patent No.: US 7,425,089 B2
(45) Date of Patent: Sep. 16, 2008

(54) LIGHTING DEVICE AND IMAGE DISPLAY UNIT AND LIGHT GUIDE PROVIDED WITH IT

(75) Inventor: Takeshi Masuda, Shijonawate (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/533,893

(22) PCT Filed: Oct. 28, 2003

(86) PCT No.: PCT/JP03/13796

§ 371 (c)(1),
(2), (4) Date: May 5, 2005

(87) PCT Pub. No.: WO2004/042273

PCT Pub. Date: May 21, 2004

(65) Prior Publication Data

US 2006/0056196 A1    Mar. 16, 2006

(30) Foreign Application Priority Data

Nov. 6, 2002 (JP) .............................. 2002-322454
Jun. 5, 2003 (JP) .............................. 2003-161135

(51) Int. Cl.
*F21V 7/04* (2006.01)

(52) U.S. Cl. .................... 362/617; 362/615; 362/616; 362/19

(58) Field of Classification Search ................ 362/617, 362/19, 615, 616, 600
See application file for complete search history.

(56) References Cited

U.S. PATENT DOCUMENTS

| 4,798,448 | A | * | 1/1989 | van Raalte | .................... | 349/62 |
| 5,729,311 | A |   | 3/1998 | Broer et al. | | |
| 5,764,322 | A | * | 6/1998 | Mamiya et al. | ............... | 349/65 |
| 5,808,709 | A | * | 9/1998 | Davis et al. | .................... | 349/65 |

(Continued)

FOREIGN PATENT DOCUMENTS

JP         10-20125        1/1998

(Continued)

OTHER PUBLICATIONS

Jagt, Henri J. B., et al., *Micro-structured Polymeric Linearly Polarized Light Emitting Lightguide for LCD Illumination*, SID 02 Digest, pp. 1236-1239.

(Continued)

*Primary Examiner*—Ali Alavi
*Assistant Examiner*—Evan Dzierzynski
(74) *Attorney, Agent, or Firm*—Nixon & Vanderhye P.C.

(57) ABSTRACT

An illumination device according to the present invention includes a light source; and a lightguide element including an incidence surface for receiving light emitted from the light source and an outgoing surface from which the light incident from the incidence surface goes out. The lightguide element includes a polarization selection layer for causing light of a specific polarization direction (first polarized light), among the light incident from the incidence surface, to selectively go out from the outgoing surface, and a polarization conversion layer for converting second polarized light, polarized in a different direction from that of the first polarized light, into the first polarized light. The polarization selection layer reflects the first polarized light substantially only toward the outgoing surface.

28 Claims, 47 Drawing Sheets

U.S. PATENT DOCUMENTS

| | | | |
|---|---|---|---|
| 6,020,944 A | | 2/2000 | Hoshi |
| 6,101,032 A | * | 8/2000 | Wortman et al. ............ 359/500 |
| 6,104,454 A | * | 8/2000 | Hiyama et al. ................ 349/65 |
| 6,329,968 B1 | * | 12/2001 | Cornelissen et al. .......... 345/87 |
| 6,335,999 B1 | * | 1/2002 | Winston et al. ............. 385/146 |
| 6,650,382 B1 | * | 11/2003 | Sumida et al. ................ 349/63 |
| 6,742,921 B2 | | 6/2004 | Umemoto et al. |
| 6,829,071 B2 | * | 12/2004 | Allen et al. ................. 359/247 |
| 2002/0149925 A1 | * | 10/2002 | Epstein et al. ................ 362/31 |

FOREIGN PATENT DOCUMENTS

| | | |
|---|---|---|
| JP | 10-332914 | 12/1998 |
| JP | 11-232919 | 8/1999 |
| JP | 2001-264698 | 9/2001 |

OTHER PUBLICATIONS

Tanase, H., et al, *A New Backlighting System with a Polarizer Light Pipe for Enhanced Light Output from LCDs*, SID 97 Digest, pp. 365-368.

Blom, S.M.P., et al., *Towards Polarised Light Emitting Back Lights: Micro-structured Anisotropic Layers*, Asia Display/IDW '01, pp. 525-528.

International Search Report for PCT/JP03/13796 dated Feb. 10, 2004.

English translation of the International Preliminary Examination Report mailed Jul. 14, 2005 in corresponding PCT Application No. PCT/JP2003/013796.

* cited by examiner

FIG.3
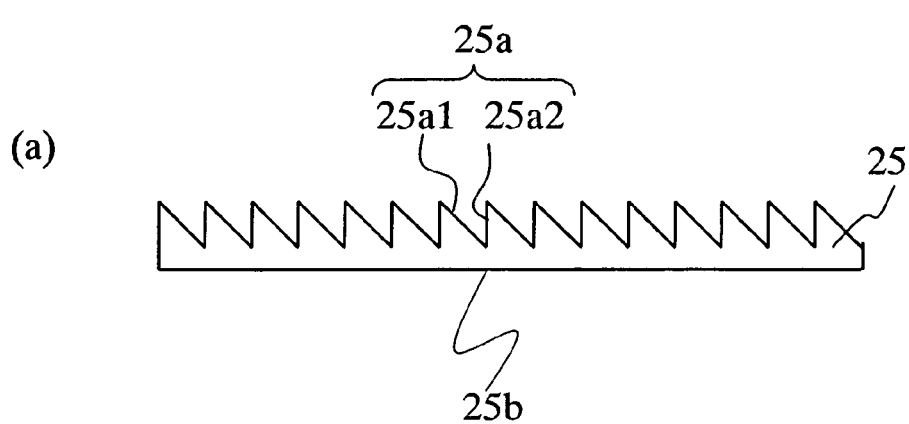
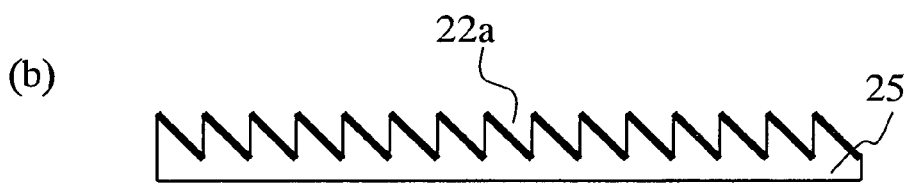
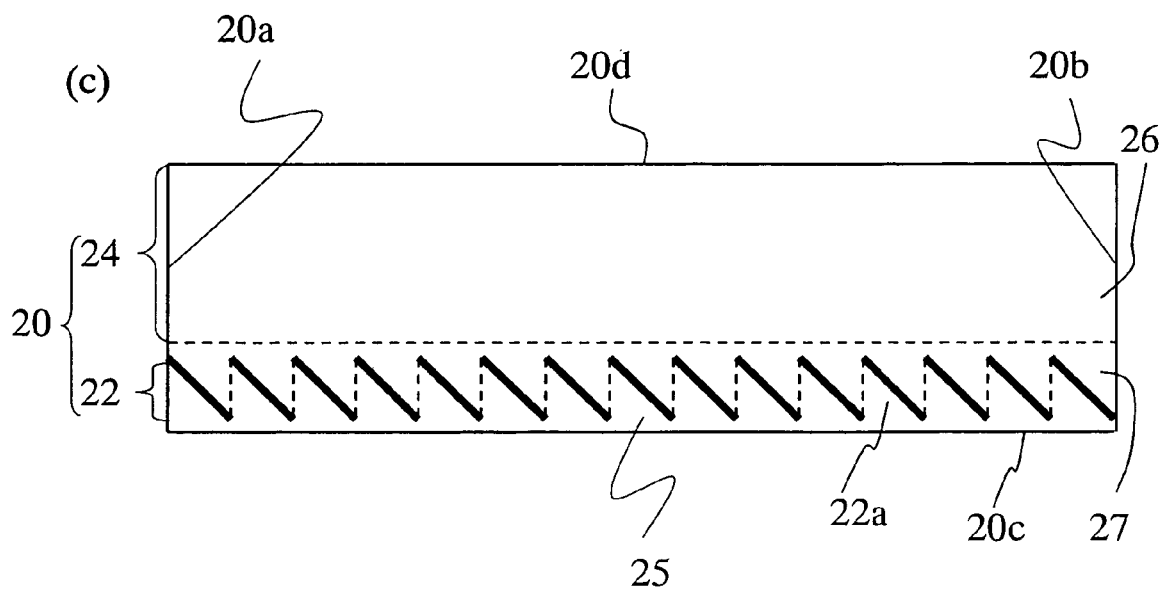

FIG.10
(a)
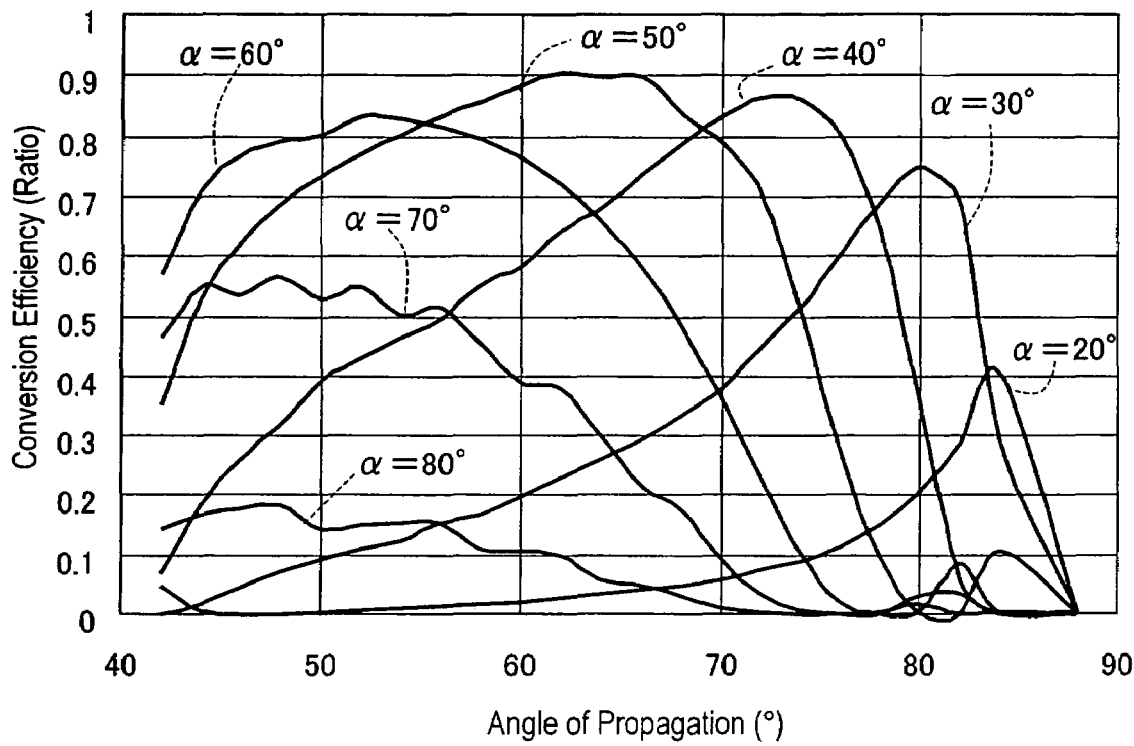
(b)
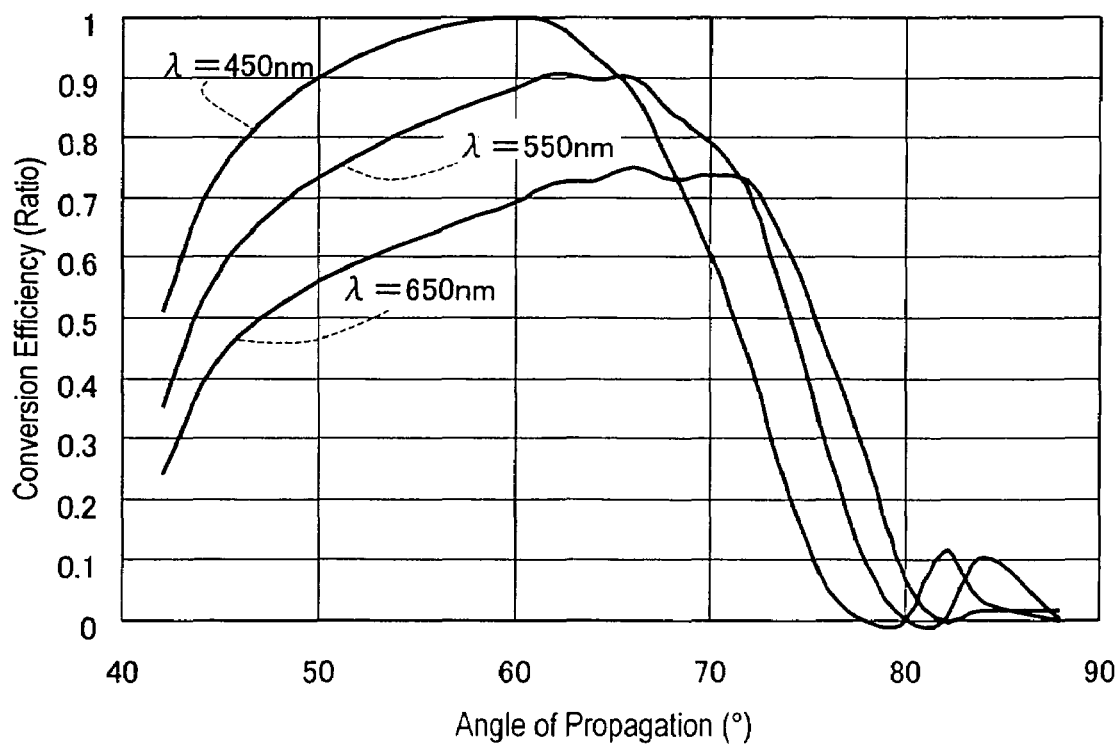

FIG.11
(a)
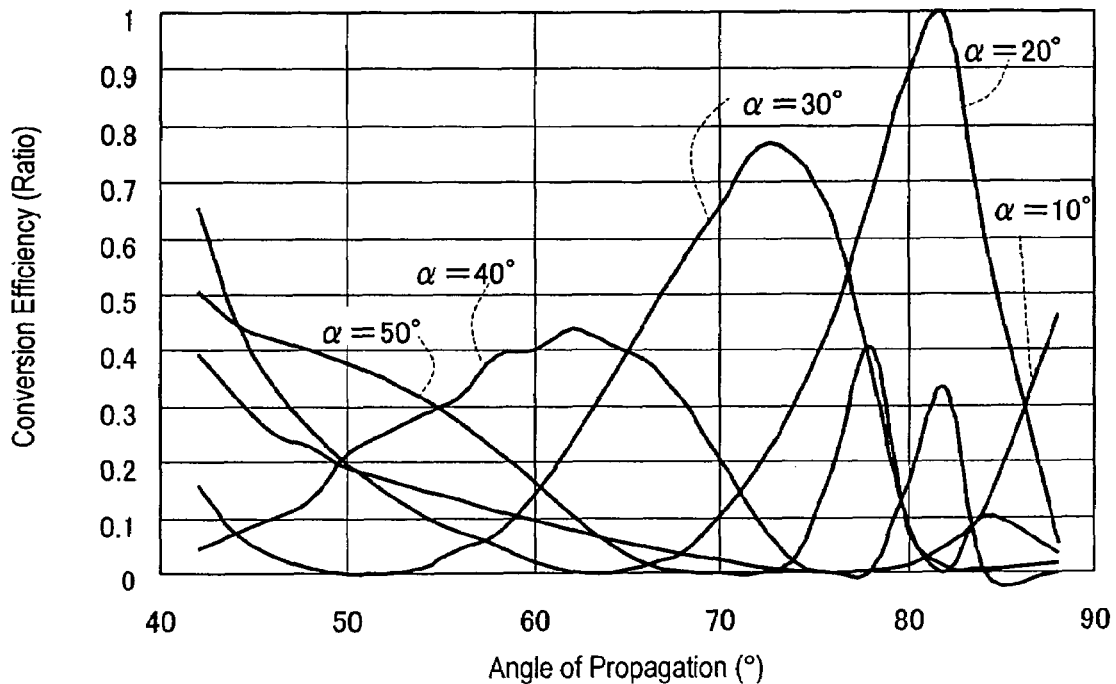
(b)
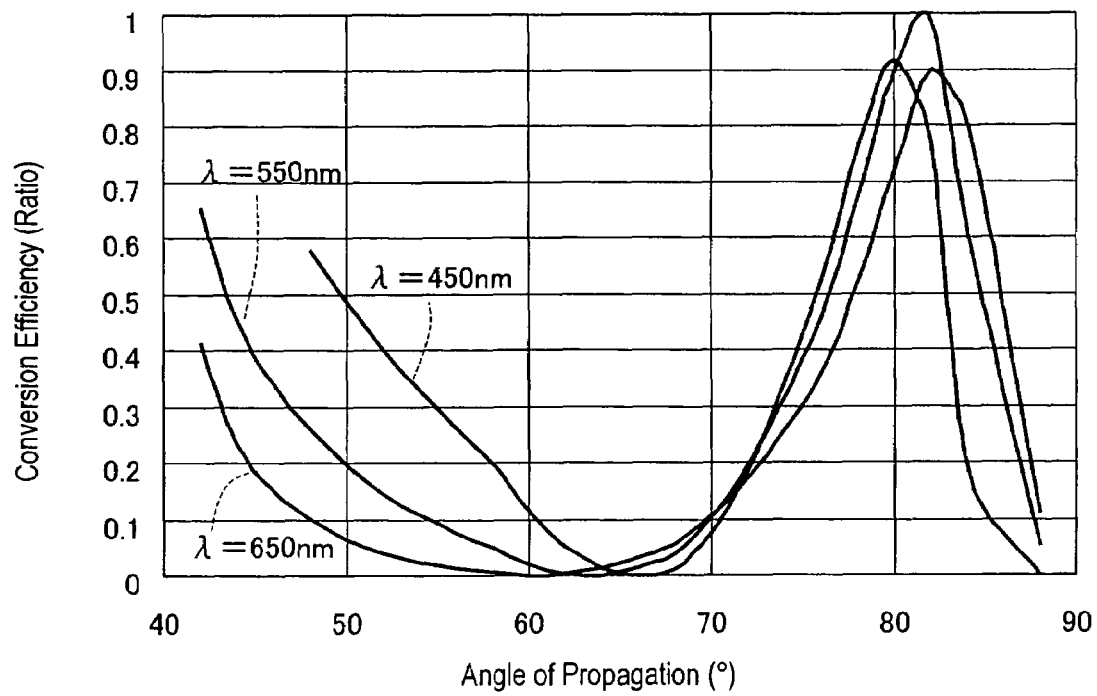

FIG.12
(a)
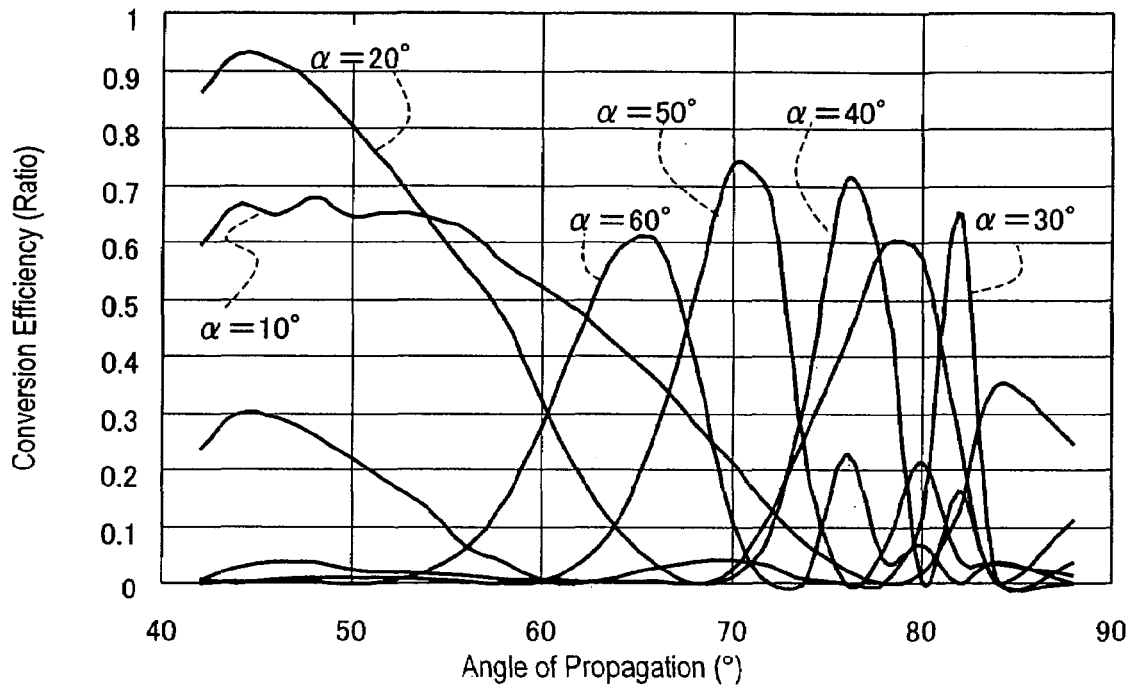
(b)
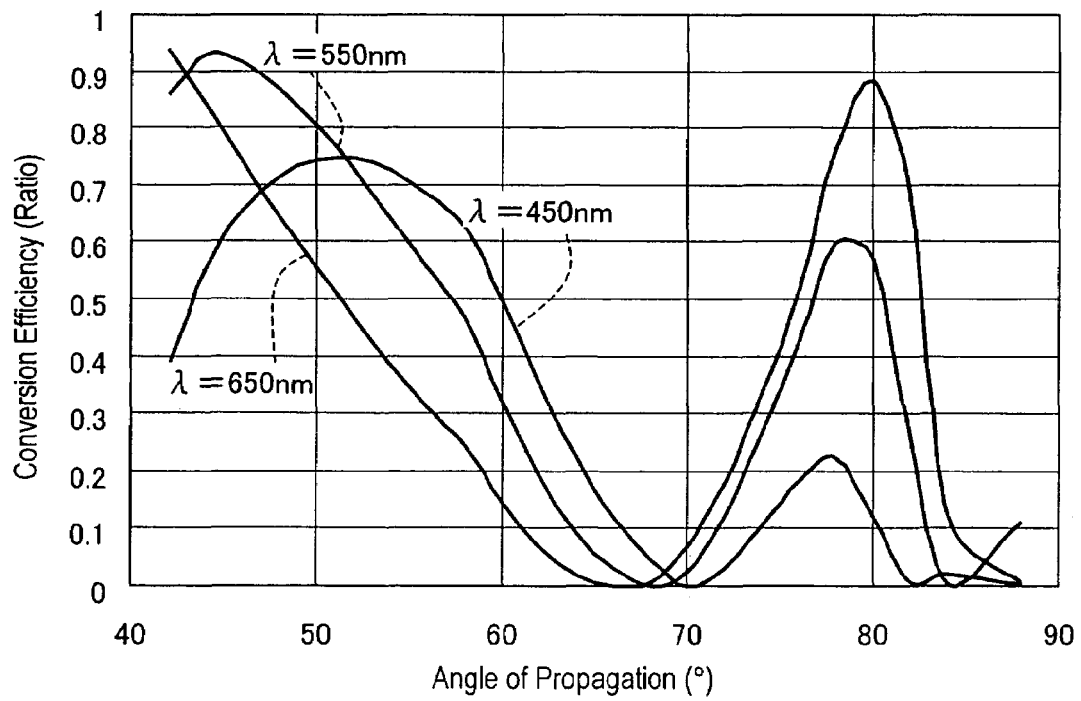

FIG.15
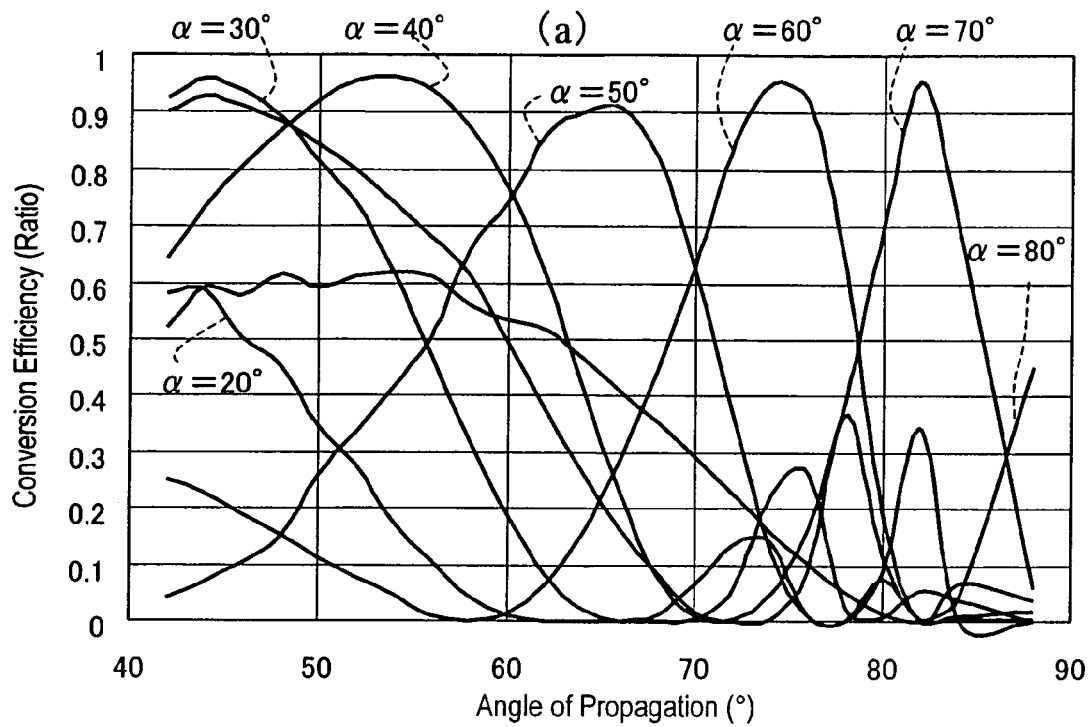
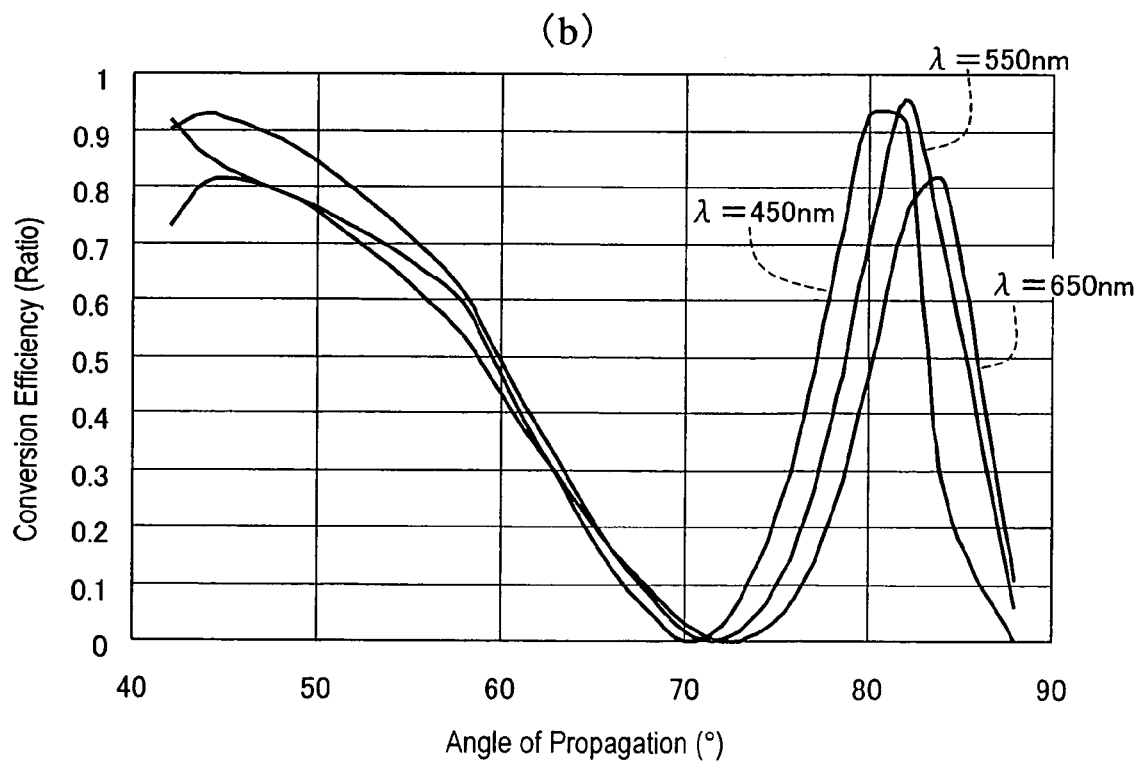

FIG.17
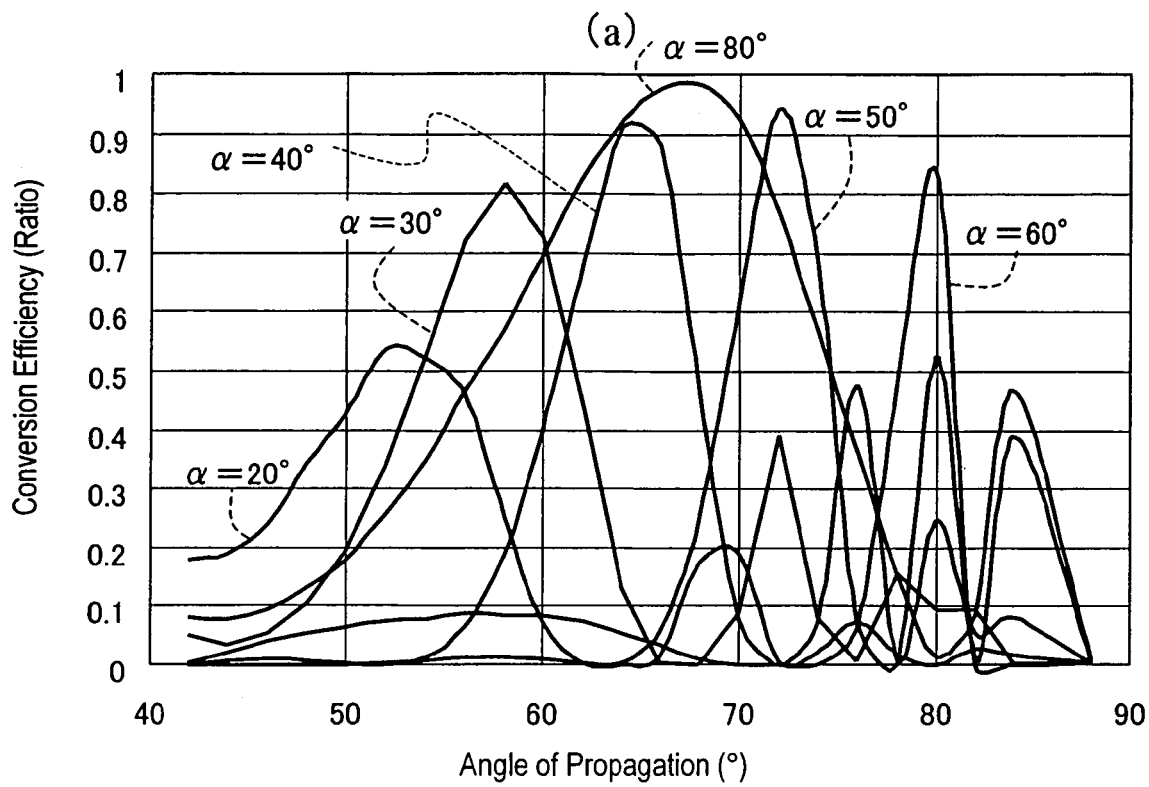
(a)
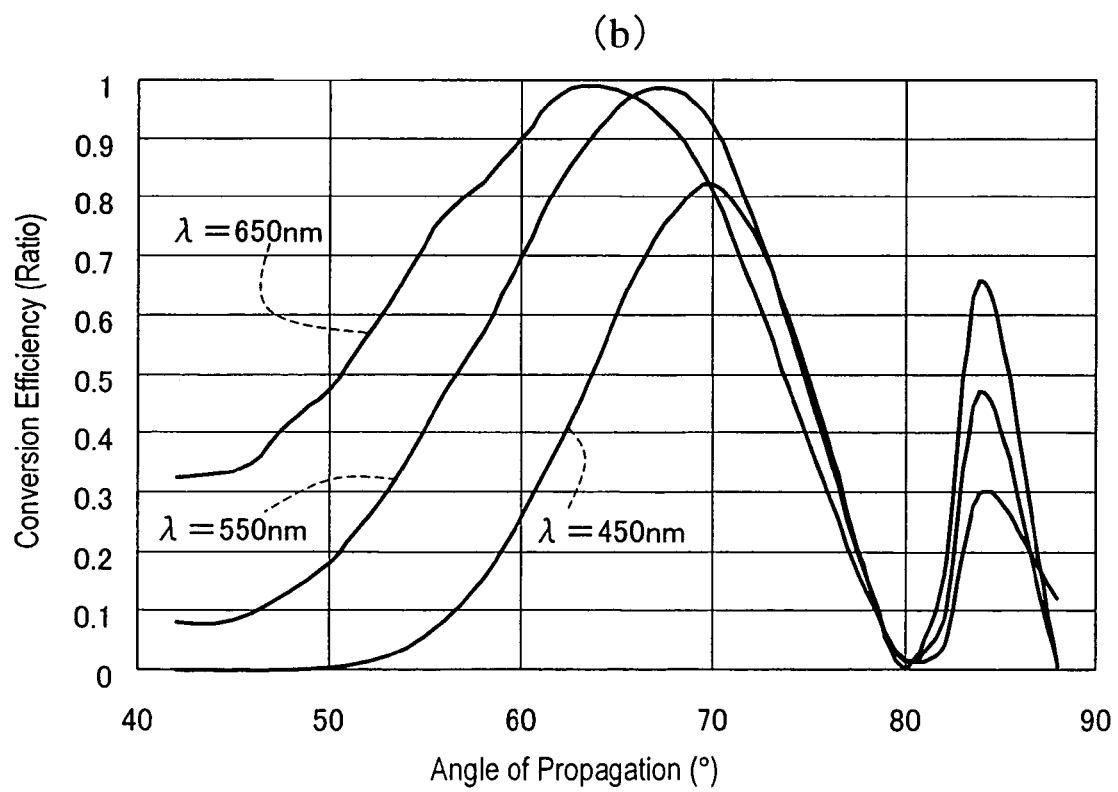
(b)

FIG.18
(a)
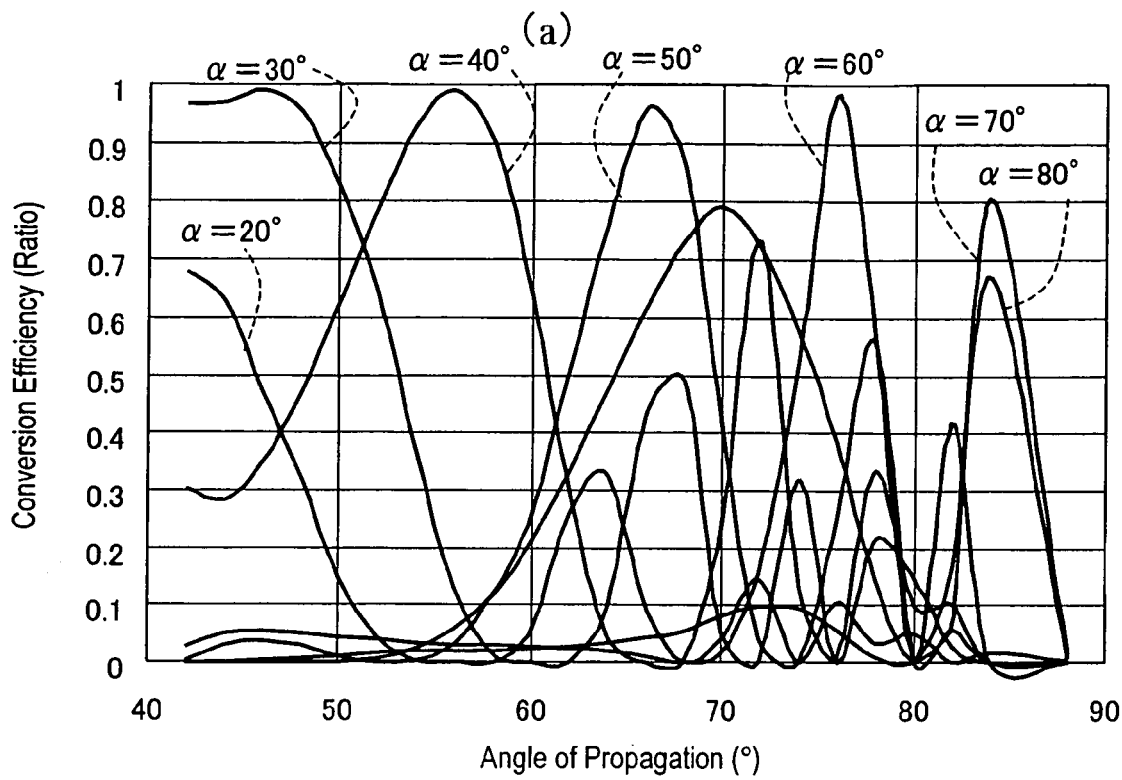
(b)
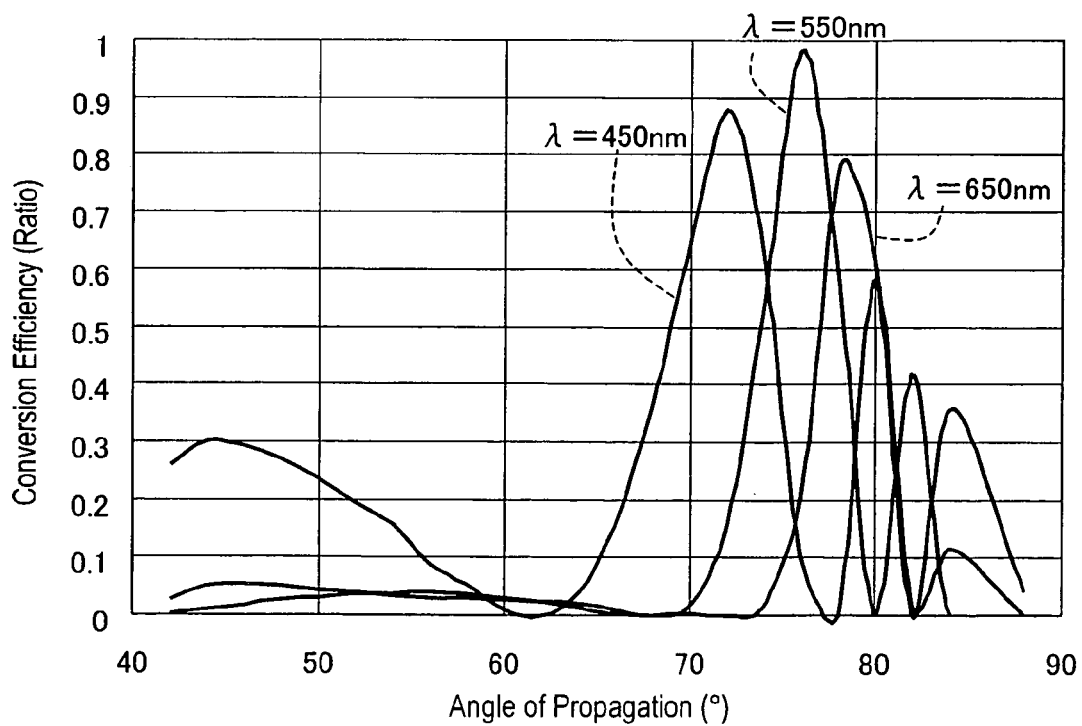

FIG.22
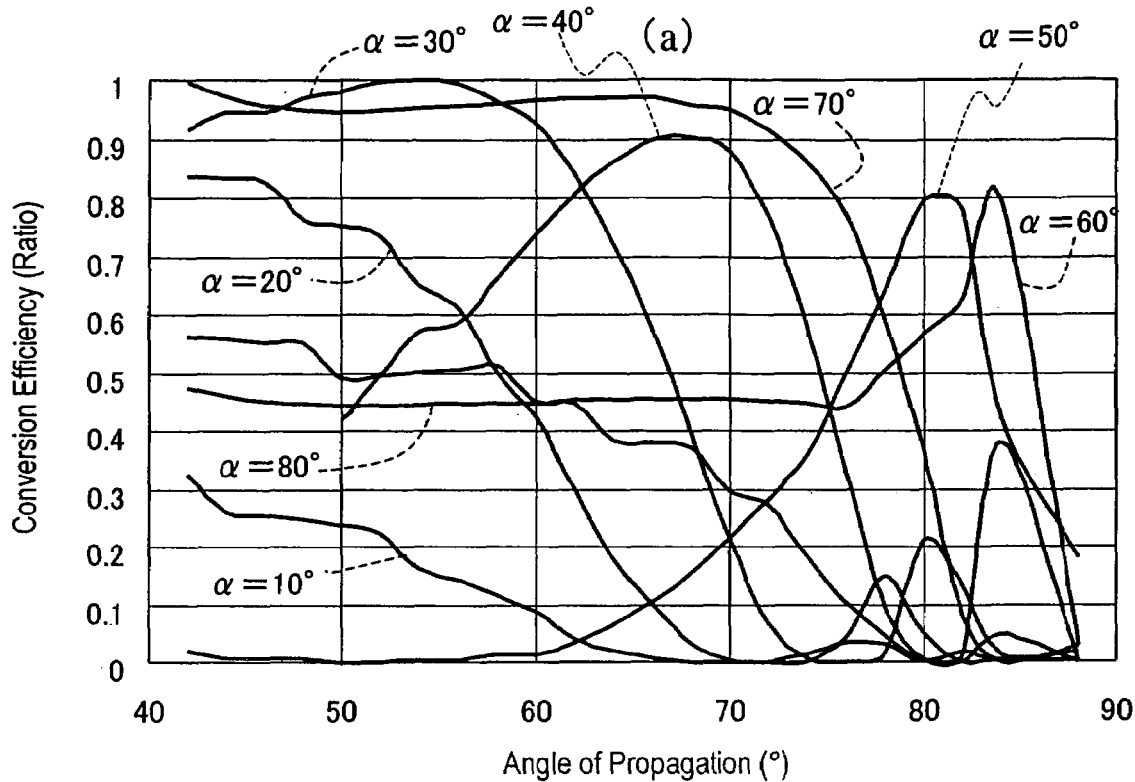
(a)
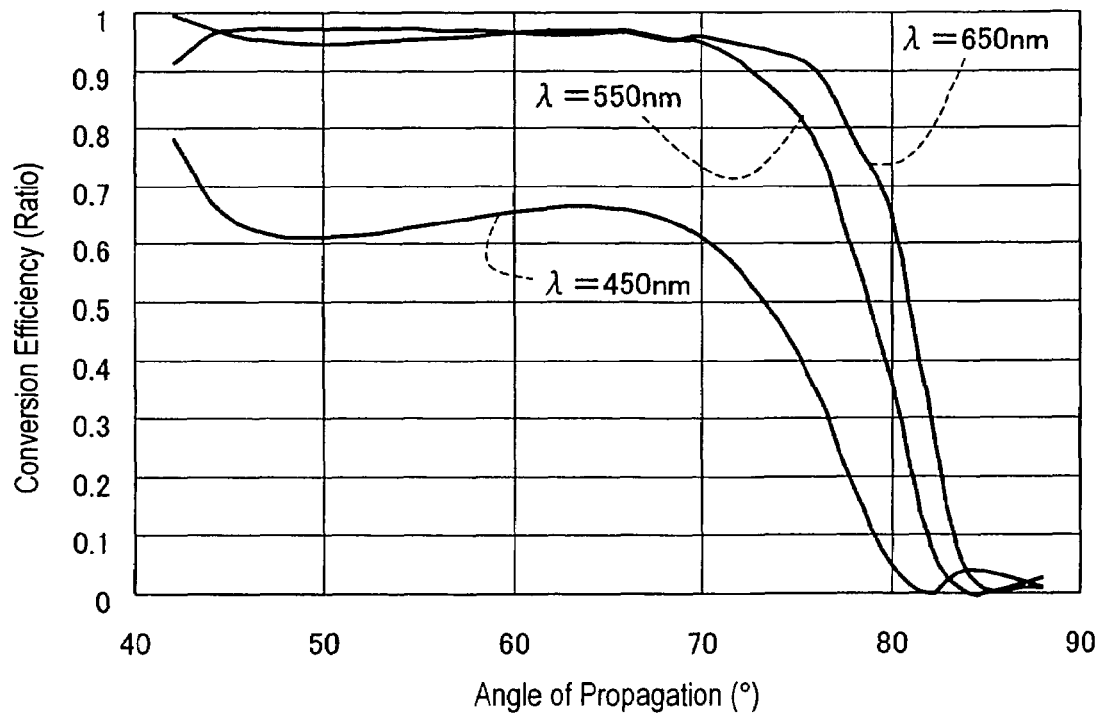
(b)

FIG.24
(a)
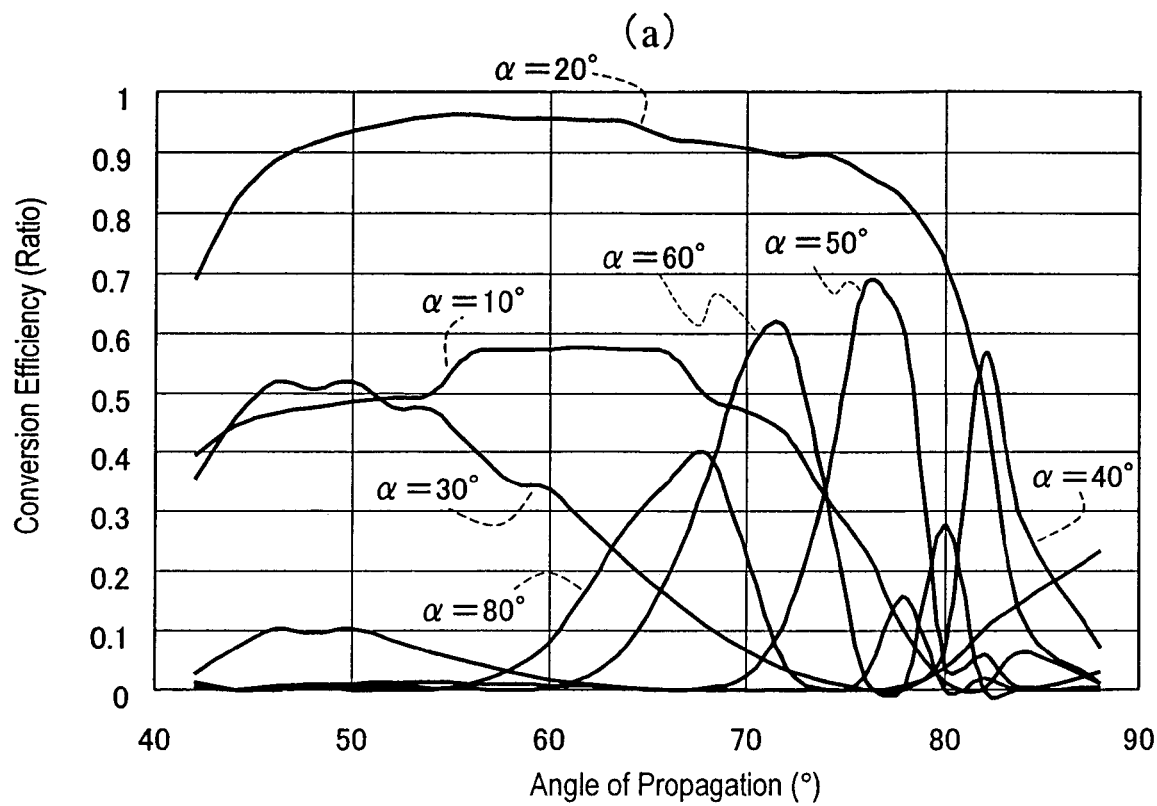
(b)
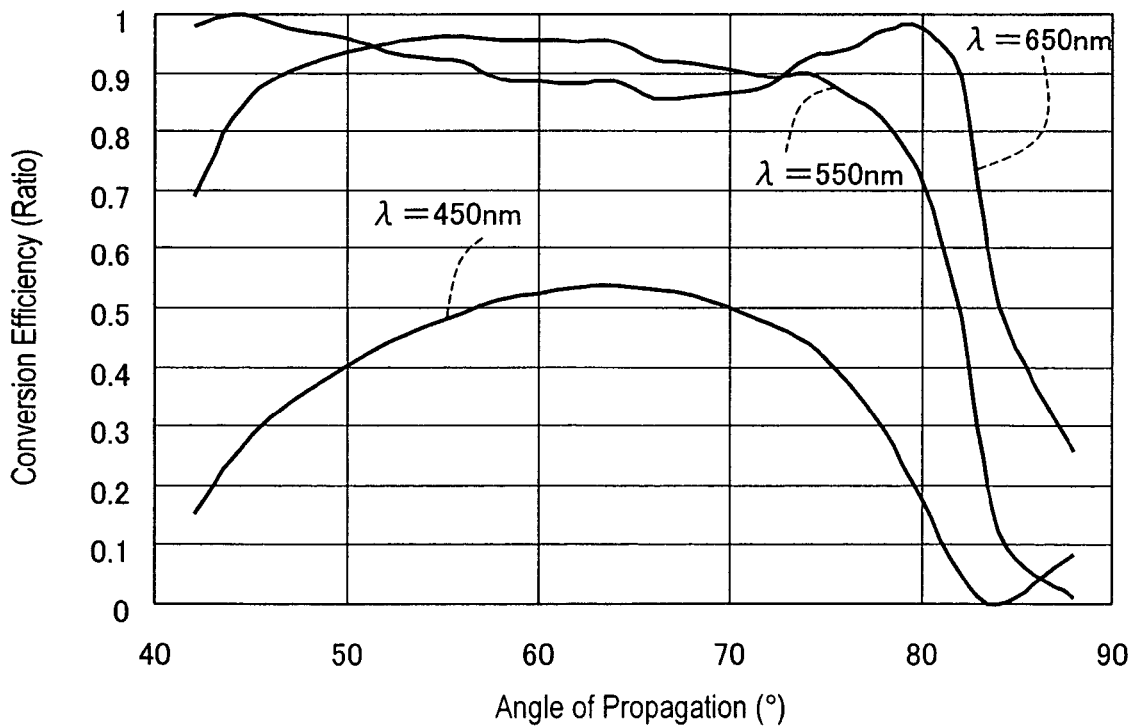

FIG. 29
(a) 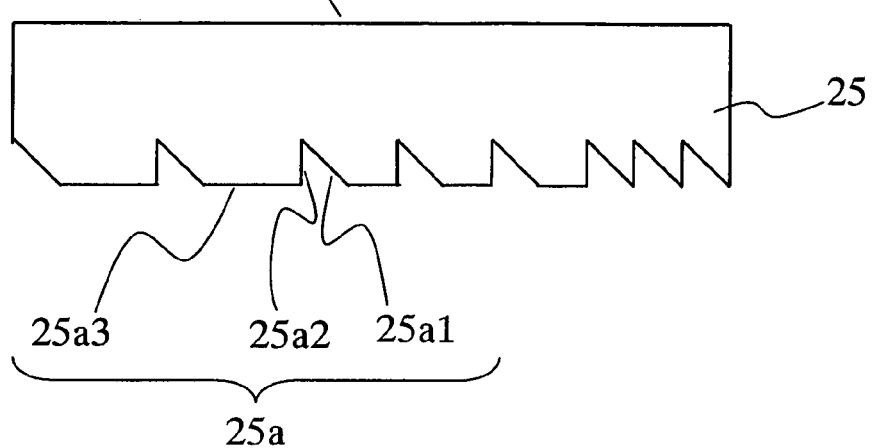
(b) 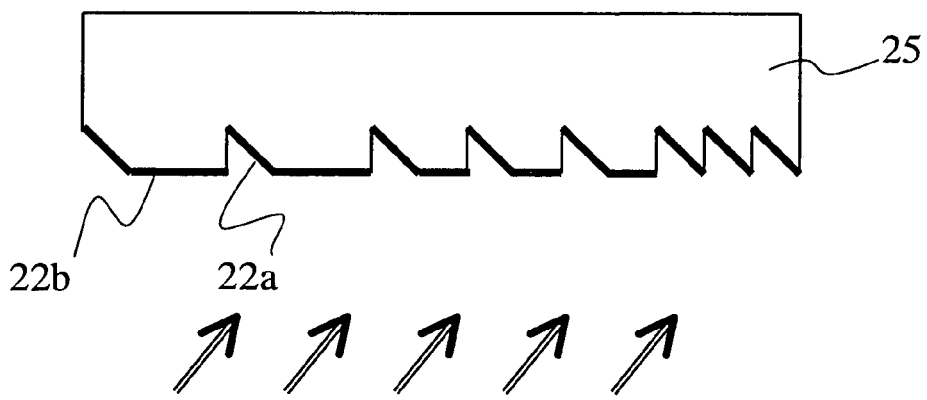
(c) 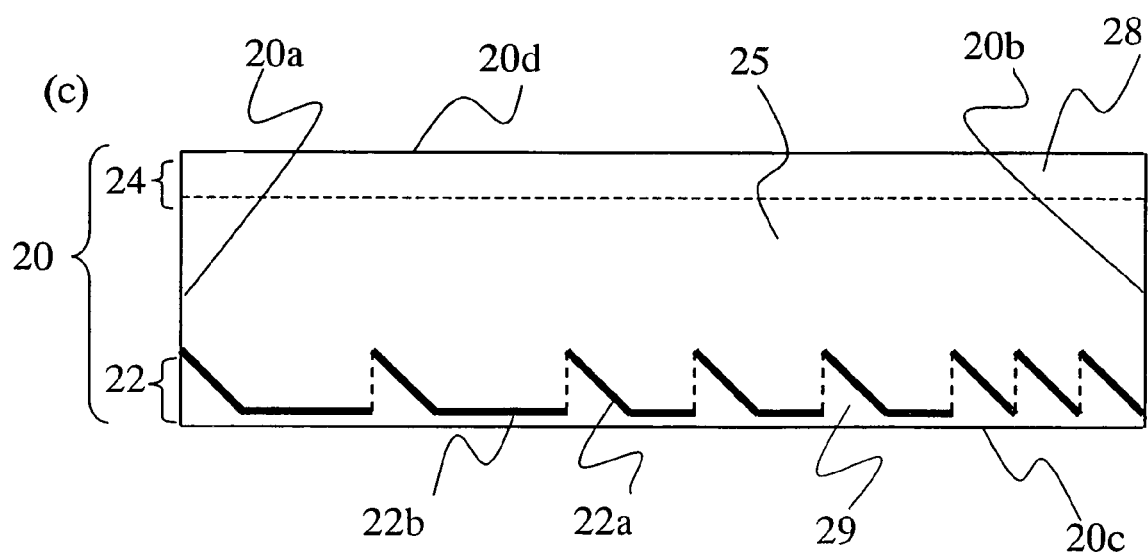

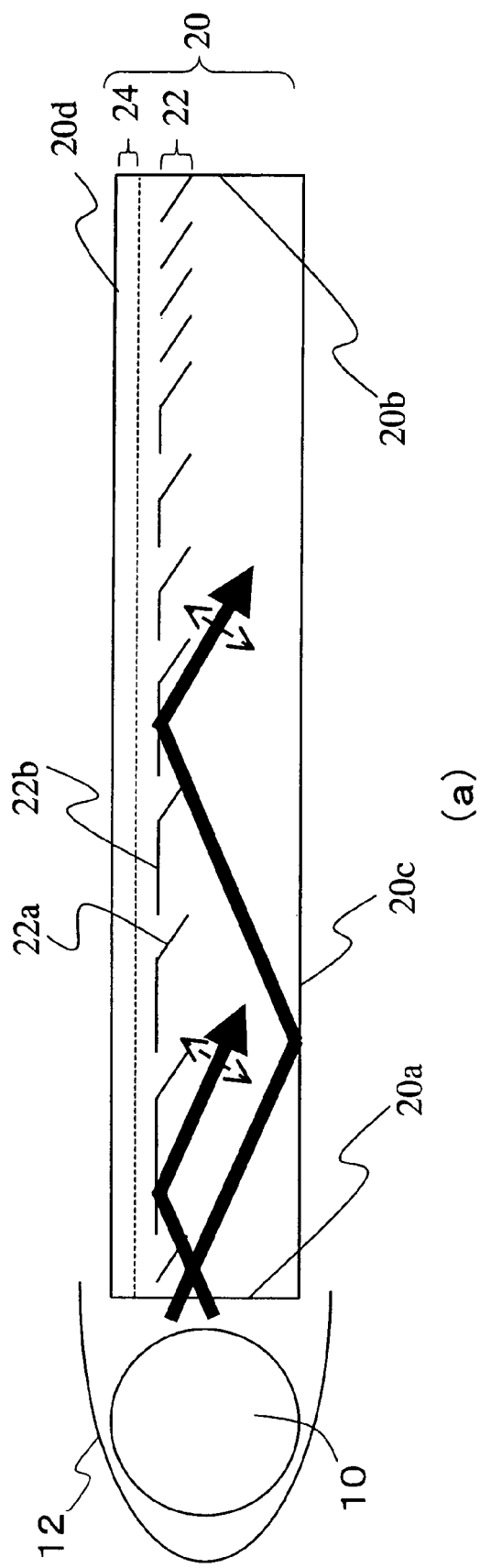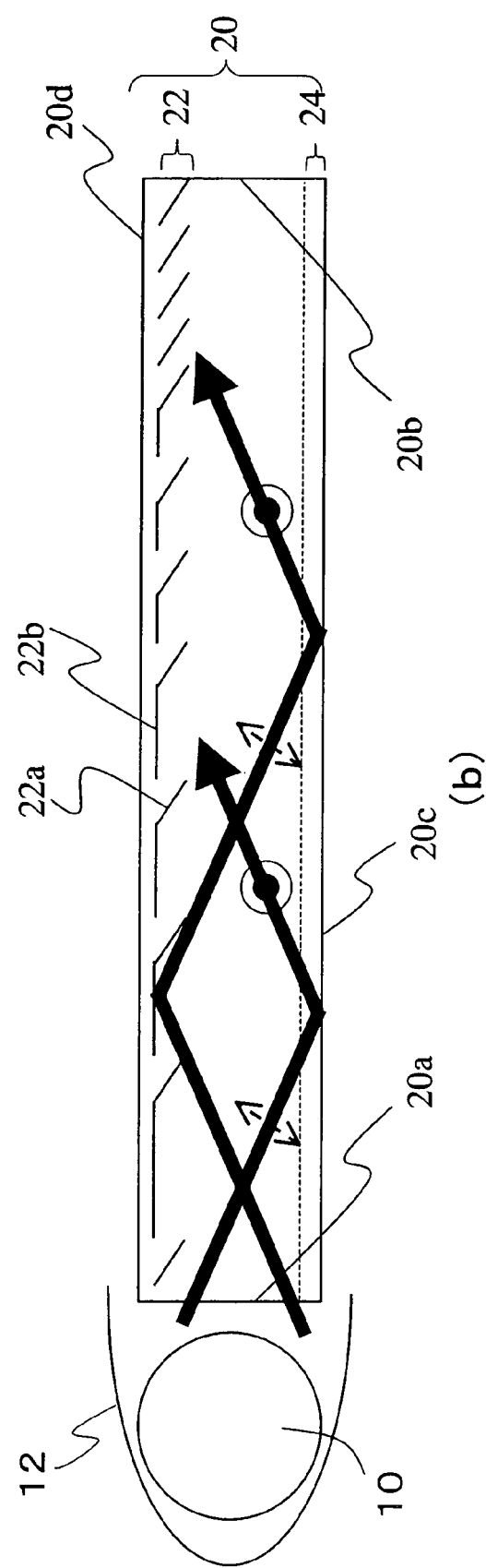
FIG. 33

US 7,425,089 B2

LIGHTING DEVICE AND IMAGE DISPLAY UNIT AND LIGHT GUIDE PROVIDED WITH IT

This application is the U.S. national phase of international application PCT/JP2003/013796 filed 28 Oct. 2003, which designated the U.S. and claims benefit of JP 2002-322454, filed 6 Nov. 2002, and JP 2003-161135, filed 5 Jun. 2003, entire contents of each of which are hereby incorporated by reference.

TECHNICAL FIELD

The present invention relates to an illumination device, an image display apparatus including the same, and a lightguide element, and more particularly relates to an illumination device having a high light utilization efficiency, an image display apparatus including the same, and a lightguide element.

BACKGROUND ART

Recently, liquid crystal displays have been widely used for, for example, office automation devices such as word processors and personal computers, mobile information devices such as PDAs, and camera-equipped VTRs including liquid crystal monitors owing to their features of being thin and consuming low power.

Unlike light emitting displays such as CRTs (cathode ray tubes), PDPs (plasma display panels) and EL (electroluminescence) devices, non-light emitting displays represented by liquid crystal displays do not emit light themselves but control a transmitted amount or a reflected amount of externally emitted light to display characters and images.

The above-mentioned liquid crystal displays are roughly classified into transmission type liquid crystal displays and reflection type liquid crystal displays.

Transmission type liquid crystal displays perform display using light of an illumination device (a so-called backlight) provided behind a liquid crystal panel, whereas reflection type liquid crystal displays perform display using ambient light. Some known reflection type liquid crystal displays include an illumination device for improving the display quality for the case where a sufficient strength of light is not obtained. Such an illumination device is called a "front light", as opposed to a "backlight" which is an illumination device of a transmission type liquid crystal display.

Most of the transmission type liquid crystal displays practically used today include a pair of polarizers facing each other with a liquid crystal cell interposed therebetween. Most of the reflection type liquid crystal displays practically used today include a polarizer provided on the viewer side of the liquid crystal cell. Therefore, in the case where illumination light emitted from an illumination device (a backlight or a front light) is in a randomly polarized state, about 50% of the illumination light is absorbed by the polarizer before being incident on the liquid crystal cell.

In order to reduce the amount of light absorbed by the polarizer and thus to improve the light utilization efficiency, illumination devices for selectively emitting light of a predetermined polarization direction have been proposed.

For example, Japanese Laid-Open Patent Publication No. 9-5739 and Tanase and five others, "A New Backlighting System with a Polarizer Light Pipe for Enhanced Light Output from LCDs", SID 97 DIGEST, pp. 365-368, disclose an illumination device for emitting light of a specified polarization direction, utilizing that the reflectance at an interface between transparent mediums having different refractive indices from each other has polarization dependency. FIG. 43 and FIG. 44 schematically show an illumination device 740 disclosed in Japanese Laid-Open Patent Publication No. 9-5739 and a liquid crystal display 700 including the illumination device 740 as a backlight, respectively.

The liquid crystal display 700 includes a transmission type liquid crystal display panel 710 and the illumination device (backlight) 740 provided on the rear side of the liquid crystal display panel 710.

The liquid crystal display panel 710 includes a pair of substrates 711 and 712, a liquid crystal layer 713 provided between the pair of substrates 711 and 712, and a pair of polarizers 715a and 715b provided outside the pair of substrates 711 and 712. The liquid crystal display panel 710 performs display by modulating light, emitted from the illumination device 740 and incident on the liquid crystal display panel 710 via the polarizer 715b, by the liquid crystal layer 713 and thus controlling the amount of light transmitted through the polarizer 715a.

The illumination device 740 includes a light source 741, a lightguide element 720, and a reflection film 742 provided so as to surround the light source.

The lightguide element 720 includes a first side surface (incidence surface) 720a on the side of the light source 741, a second side surface 720b facing the first side surface 720a, an outgoing surface 720c from which light incident from the light source 741 goes out, and a counter surface 720d facing the outgoing surface 720c. A λ/4 plate (quarter-wave plate) 732 and a reflection plate 734 are provided in the vicinity of the second side surface of the lightguide element 720, and a reflection plate 736 is provided in the vicinity of the counter surface 720d of the lightguide element 720.

The lightguide element 720 is formed of a lightguide plate 721 and a lightguide sheet 723 attached to each other. The lightguide sheet 723 is formed of transparent amorphous layers 723a and 723b which have different refractive indices from each other and are alternately stacked at a predetermined angle.

Light, which is emitted from the light source 741 and is incident on the inside of the lightguide element 720 via the incidence surface 720a, is propagated toward the second side surface 720b while being totally reflected between the outgoing surface 720c and the counter surface 720d repeatedly. A part of the light propagated in the lightguide element 720 is reflected by interfaces between the amorphous layers 723a and 723b forming the lightguide sheet 723, and goes out from the outgoing surface 720c toward the liquid crystal display panel 710.

It is known that the reflectance is different in accordance with the polarization direction at the interfaces between the amorphous layers having different refractive indices from each other. Especially when light is incident on such an interface at a specific angle of incidence which is referred to as the "Brewster angle", the reflectance of P polarized light is zero and only S polarized light is reflected.

Accordingly, by stacking the amorphous layers 723a and 723b forming the lightguide sheet 723 so as to be at an angle closer to the Brewster angle with respect to the outgoing surface 720c of the lightguide element 720, the reflectance of first polarized light vibrating in a direction perpendicular to the direction in which the amorphous layers 723a and 723b are alternately repeated (vibrating in the direction vertical to the sheet of FIG. 44) can be made high and the reflectance of second polarized light vibrating in a direction parallel to the direction in which the amorphous layers 723a and 723b are alternately repeated (vibrating in the direction parallel to the sheet of FIG. 44) can be made low. Thus, the illumination light going out from the lightguide element 720 can have polarization characteristics.

The λ/4 plate 732 and the reflection plate 734 located in the vicinity of the second side surface 720b of the lightguide element 720 are provided in order to realize the following: the polarization direction of light, which does not go out from the outgoing surface 720c of the lightguide element 720 and reaches the second side surface 720b, is rotated and such light is again incident on the inside of the lightguide element 720, and thus the light utilization efficiency is improved. The reflection plate 736 located in the vicinity of the counter surface 720d of the lightguide element 720 is provided in order to reflect the illumination light, reflected toward the lightguide element 720 by the liquid crystal display panel 710, back toward the liquid crystal display panel 710.

In the liquid crystal display 700, light of a specific polarization direction is selectively emitted from the illumination device 740 as described above. Therefore, absorption of light by the polarizer 715b of the liquid crystal display panel 710 can be suppressed, and thus the light utilization efficiency is improved.

Japanese PCT National Phase Laid-Open Publication No. 10-508151, Japanese PCT National Phase Laid-Open Publication No. 2001-507483, S. M. P. Blom and two others, "Towards Polarized Light Emitting Back Lights: Microstructured Anisotropic Layers", Asia Display/IDW '01, pp. 525-528, and Henri J. B. Jagt and three others, "Micro-structured Polymeric Linearly Polarized Light Emitting Lightguide for LCD Illumination", SID 02 DIGEST, pp. 1236-1239; disclose an illumination device for emitting light of a specific polarization direction, utilizing that the reflectance at an interface between a material having an isotropic refractive index and a material having an anisotropic refractive index has polarization dependency. FIGS. 45(a), (b) and 46 schematically show an illumination device 800 disclosed in the Asia Display/IDW '01, pp. 525-528.

The illumination device 800 includes a light source 810, a lightguide element 820, and a reflection film 812 provided so as to surround the light source 810.

The lightguide element 820 includes a first side surface (incidence surface) 820a on the side of the light source 810, a second side surface 820b facing the first side surface 820a, an outgoing surface 820c from which light incident from the light source 810 goes out, and a counter surface 820d facing the outgoing surface 820c.

The lightguide element 820 is formed of an isotropic layer 821 formed of a material having an isotropic refractive index and an anisotropic layer 823 formed of a material having an anisotropic refractive index which are stacked on each other. A surface of the isotropic layer 821 on the side of the anisotropic layer 823 has grooves having a V-shaped cross section formed therein at a constant pitch, and a surface of the anisotropic layer 823 on the side of the isotropic layer 821 has projections engageable with the V-shaped grooves formed thereon. Thus, the cross section of the interface between the isotropic layer 821 and the anisotropic layer 823 is wave-like. The anisotropic layer 823 is designed such that only a refractive index ne in a specific direction is different from a refractive index n of the isotropic layer 821 and a refractive index no in the other directions is almost the same as the refractive index n of the isotropic layer 821.

Light, which is emitted from the light source 810 and is incident on the inside the lightguide element 820 via the incidence surface 820a, is propagated toward the second side surface 820b while being totally reflected between the outgoing surface 820c and the counter surface 820d repeatedly. A part of the light propagated in the lightguide element 820 is reflected by parts of the interface between the anisotropic layer 823 and the isotropic layer 821, the parts being inclining with respect to the outgoing surface 820c, and goes out from the outgoing surface 820c.

At the interface between the anisotropic layer 823 and the isotropic layer 821, only first polarized light vibrating in a direction in which the refractive indices thereof are different from each other is reflected, and second polarized light vibrating in a direction in which the refractive indices thereof are almost the same is not reflected. Therefore, the illumination light going out from the lightguide element 820 can have polarization characteristics.

In the liquid crystal display 800, light of a specific polarization direction is selectively emitted from the outgoing surface 820c as described above. Therefore, the light utilization efficiency can be improved.

Japanese PCT National Phase Laid-Open Publication No. 10-508151 also discloses an illumination device for emitting light of a specific polarization direction, utilizing that the reflectance at an interface between an isotropic layer and an anisotropic layer has polarization dependency, like the illumination device 800 shown in FIGS. 45(a), (b) and 46. Japanese PCT National Phase Laid-Open Publication No. 10-508151 further discloses that as shown in FIGS. 45(a) and 46, the light utilization efficiency can be further improved by providing a depolarizing reflection plate 832 in the vicinity of the second side surface 820b of the lightguide element 820. The depolarizing reflection plate 832 depolarizes the second polarized light which is not reflected at the interface between the anisotropic layer 823 and the isotropic layer 821 and causes a part of such light to be incident again on the lightguide element 820 as first polarized light. Therefore, the second polarized light can be utilized as the illumination light.

Japanese Laid-Open Patent Publication No. 9-218407 discloses an illumination device for emitting light of a specific polarization direction, utilizing the polarization dependency of diffraction in an arranged grating formed at an interface between an isotropic layer (a layer formed of a material having an isotropic refractive index) and an anisotropic layer (a layer formed of a material having an anisotropic refractive index). FIGS. 47(a), (b) and 48 schematically show an illumination device 900 disclosed in Japanese Laid-Open Patent Publication No. 9-218407.

The illumination device 900 includes a light source 910, a lightguide element 920, and a reflection film 912 provided so as to surround the light source 910.

The lightguide element 920 includes a first side surface (incidence surface) 920a on the side of the light source 910, a second side surface 920b facing the first side surface 920a, an outgoing surface 920c from which light incident from the light source 910 goes out, and a counter surface 920d facing the outgoing surface 920c.

The lightguide element 920 is formed of an isotropic layer 921 formed of a material having an isotropic refractive index and an anisotropic layer 923 formed of a material having an anisotropic refractive index which are stacked on each other. The anisotropic layer 923 is designed such that only a refractive index ne in a specific direction is different from a refractive index n of the isotropic layer 921 and a refractive index no in the other directions is almost the same as the refractive index n of the isotropic layer 921. An interface between the isotropic layer 921 and the anisotropic layer 923 is rectangular wave-like, and the interface between the isotropic layer 921 and the anisotropic layer 923 acts as an arranged grating.

A phase plate 932 and a reflection plate 934 are provided on the side of the counter surface 920d of the lightguide element 920.

Light, which is emitted from the light source 910 and is incident on the inside the lightguide element 920 via the second incidence surface 920a, is propagated toward the second side surface 920b while being totally reflected between the outgoing surface 920c and the counter surface 920d repeatedly. A part of the light propagated in the lightguide element 920 is diffracted by the arranged grating formed at the interface between the anisotropic layer 923 and the isotropic layer 921, and goes out from the outgoing surface 920c.

At the interface between the anisotropic layer 923 and the isotropic layer 921, only first polarized light vibrating in a direction in which the refractive indices thereof are different from each other is reflected, and second polarized light vibrating in a direction in which the refractive indices thereof are almost the same is not reflected. Therefore, the illumination light going out from the lightguide element 920 can have polarization characteristics.

In the liquid crystal display 900, light of a specific polarization direction is selectively emitted from the outgoing surface 920c as described above. Therefore, the light utilization efficiency can be improved.

Japanese Laid-Open Patent Publication No. 9-218407 also describes that the second polarized light which is not diffracted by the arranged grating is converted into the first polarized light by the anisotropic layer 923 and the phase plate 932 while being propagated in the lightguide element 920 toward the second side surface 920b, and therefore the second polarized light also can be utilized as the illumination light.

However, the illumination devices described above have the following problems.

In the illumination device 740 shown in FIG. 43 and FIG. 44 and the illumination device 800 shown in FIGS. 45 and 46, the second polarized light which is not directly reflected by the interface between the amorphous layers 723a and 723b, or the interface between the isotropic layer 821 and the anisotropic layer 823, is converted into the first polarized light by the $\lambda/4$ plate 732 and the reflection plate 734 provided in the vicinity of the second side surface 720b of the lightguide element 720, or the depolarizing reflection plate 832 provided in the vicinity of the second side surface 820b of the lightguide element 820.

A transparent resin such as polymethylmethacrylate or polycarbonate generally used as a material of a lightguide element has slight birefringence. In order to convert the second polarized light which has reached the second side surface 720a of the lightguide element 720, or the second side surface 820a of the lightguide element 820, into the first polarized light by the $\lambda/4$ plate 732 and the reflection plate 734, or the depolarizing reflection plate 832, the birefringence of the lightguide element 720 or 820 needs to be suppressed sufficiently low for the following reason. When the lightguide element 720 or 820 has a large birefringence, the second polarized light propagated in the lightguide element 720 or 820 is partially depolarized and reaches the second side surface as the first polarized light. Such light is converted into second polarized light by the $\lambda/4$ plate 732 and the reflection plate 734 or the depolarizing reflection plate 832. As a result, such light is not propagated toward the outgoing surface 720c or 820c after being incident again on the lightguide element 720 or 820.

Therefore, in the illumination devices 740 and 800, the lightguide elements 720 and 820 each need to be formed of a material having a sufficiently small birefringence, which restricts the range of usable materials.

Recently, liquid crystal displays have been remarkably reduced in thickness, to the extent that the lightguide element 720 or 820 may be about 0.7 mm to 0.8 mm thick at the second side surface 720b or 820b. For the production-related reasons, it is very difficult to locate the $\lambda/4$ plate 732 and the reflection plate 734, or the depolarizing reflection plate 832, in the vicinity of such a second side surface 720b or 820b of the lightguide element 720 or 820 with high precision. Considering that the liquid crystal displays will become thinner in the future, such a structure is not practical.

Regarding the illumination device 900 shown in FIG. 47 and FIG. 48, patent document 4 describes that the second polarized light is converted into the first polarized light by the anisotropic layer 923. However, it is theoretically impossible that the second polarized light is converted into the first polarized light by the birefringence of the anisotropic layer 923, because the first polarized light and the second polarized light respectively correspond to ordinary light and extra ordinary light for the anisotropic layer 923 in the illumination device 900. Therefore, in the illumination device 900, the second polarized light must be converted into the first polarized light only by the phase plate 932.

However, Japanese Laid-Open Patent Publication No. 9-218407 describes no practical specifications of the phase plate 932, for example, the anisotropy of the refractive index, thickness, and the direction of the optical axis (slow axis or fast axis). Japanese Laid-Open Patent Publication No. 9-218407 does not disclose any knowledge required for efficiently converting the second polarized light into the first polarized light.

In addition, in the illumination device 900, light is diffracted toward the counter surface 920d by the arranged grating formed at the interface between the isotropic layer 921 and the anisotropic layer 923 as well as toward the outgoing surface 920c. Therefore an unnegligible amount of light goes out from the counter surface 920d, which decreases the light utilization efficiency. When the illumination device 900 is used as a front light, light goes out toward the viewer and thus the display quality is deteriorated.

As described above, an illumination device capable of causing light from a light source to go out as light of a specific polarization direction sufficiently efficiently has not been developed.

The present invention, made in light of the above-described problems, has an object of providing an illumination device capable of causing light from a light source to go out as light of a specific polarization direction sufficiently efficiently, an image display apparatus including the same, and a lightguide element.

DISCLOSURE OF INVENTION

A first illumination device according to the present invention includes a light source; and a lightguide element including an incidence surface for receiving light emitted from the light source and an outgoing surface from which the light incident from the incidence surface goes out. The lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization selection layer reflects the light of the specific polarization direction substantially only toward the outgoing surface. By this, the above-described object is achieved.

The polarization selection layer may include a plurality of inclining dielectric films provided at a predetermined angle with respect to the outgoing surface.

A second illumination device according to the present invention includes a light source; and a lightguide element including an incidence surface for receiving light emitted from the light source and an outgoing surface from which the light incident from the incidence surface goes out. The lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization selection layer includes a plurality of inclining dielectric films inclining with respect to the outgoing surface, and the plurality of inclining dielectric films are arranged increasingly densely as becoming farther from the incidence surface. By this, the above-described object is achieved.

The lightguide element may include a first member having a main surface which includes a plurality of inclining surfaces inclining with respect to the outgoing surface and a plurality of parallel surfaces generally parallel to the outgoing surface, and a second member provided on the main surface of the first member for flattening the main surface. The plurality of inclining dielectric films may be respectively formed on the plurality of inclining surfaces of the main surface; and the plurality of parallel surfaces of the main surface may be arranged increasingly sparsely as becoming farther from the incidence surface.

The polarization selection layer may include a plurality of further dielectric films respectively formed on the plurality of parallel surfaces of the main surface.

The polarization selection layer may be located in the vicinity of the outgoing surface and closer to the outgoing surface than the polarization conversion layer. In this case, the plurality of parallel surfaces are preferably located closer to the outgoing surface than the plurality of inclining surfaces.

The lightguide element may further include a counter surface facing the outgoing surface, and the polarization selection layer may be located in the vicinity of the counter surface and closer to the counter surface than the polarization conversion layer. In this case, the plurality of parallel surfaces are preferably located closer to the counter surface than the plurality of inclining surfaces.

The first member, for example, is a prism sheet including a plurality of prisms arranged on the main surface.

The second member, for example, is a transparent resin layer formed of a transparent resin material.

The polarization conversion layer may be formed of a transparent material having birefringence.

The polarization conversion layer may be an injection-molded transparent resin layer.

The polarization conversion layer may be a phase plate.

It is preferable that directions of a slow axis and a fast axis of the phase plate in a plane parallel to the outgoing surface do not match the specific polarization direction.

A third illumination device according to the present invention includes a light source; and a lightguide element including an incidence surface for receiving light emitted from the light source and an outgoing surface from which the light incident from the incidence surface goes out. The lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization conversion layer is an injection-molded transparent resin layer having birefringence. By this, the above-described object is achieved.

A fourth illumination device according to the present invention includes a light source; and a lightguide element including an incidence surface for receiving light emitted from the light source and an outgoing surface from which the light incident from the incidence surface goes out. The lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization conversion layer is a phase plate. Directions of a slow axis and a fast axis of the phase plate in a plane parallel to the outgoing surface do not match the specific polarization direction. By this, the above-described object is achieved.

The phase plate may have monoaxial refractive index anisotropy.

In the case where the phase plate has monoaxial refractive index anisotropy, it is preferable that a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $(n_x-n_z)/(n_x-n_y)\approx 0$, $0<(n_x-n_y)\cdot d<\lambda$, and $10°<\alpha<30°$ or $40°<\alpha<60°$. It is more preferable that the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength $\lambda$ of visible light, and the angle $\alpha$ made by the specific polarization direction and the slow axis of the phase plate fulfill the relationship of $(n_x-n_z)/(n_x-n_y)\approx 0$, $(n_x-n_y)\cdot d=\lambda/2$, and $10°<\alpha<30°$.

Alternatively, it is preferable that a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $(n_x-n_z)/(n_x-n_y)\approx 1$, $\lambda/4<(n_x-n_y)\cdot d<5\lambda/4$, and $20°<\alpha<90°$. It is more preferable that the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength $\lambda$ of visible light, and the angle $\alpha$ made by the specific polarization direction and the slow axis of the phase plate fulfill the relationship of $(n_x-n_z)/(n_x-n_y)\approx 1$, $(n_x-n_y)\cdot d=\lambda/2$, and $20°<\alpha<80°$.

The phase plate may have biaxial refractive index anisotropy.

In the case where the phase plate has biaxial refractive index anisotropy, it is preferable that a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $0.6<(n_x-n_z)/(n_x-n_y)<0.9$, $\lambda/4<(n_x-n_y)\cdot d<3\lambda/4$, and $60°<\alpha<80°$. It is more preferable that the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength $\lambda$ of visible light, and the angle $\alpha$ made by the specific polarization direction and the slow axis of the phase plate fulfill the relationship of $0.6<(n_x-n_z)/(n_x-n_y)<0.9$, $(n_x-n_y)\cdot d=\lambda/2$, and $60°<\alpha<80°$.

The polarization conversion layer may be located oppositely to the outgoing surface with the polarization selection layer interposed therebetween.

The polarization conversion layer may be located closer to the outgoing surface than the polarization selection layer.

An image display apparatus according to the present invention includes an illumination device having the above-described structure; and a display panel provided on the outgoing surface side of the lightguide element of the illumination device and including at least one polarizer. By this, the above-described object is achieved.

The illumination device may further include a transparent input device formed on the counter surface of the lightguide element.

The display panel may include a substrate; and the lightguide element included in the illumination device may act as the substrate.

A first lightguide element according to the present invention includes an incidence surface for receiving light emitted from a light source and an outgoing surface from which the light incident from the incidence surface goes out. The lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization selection layer reflects the light of the specific polarization direction substantially only toward the outgoing surface. By this, the above-described object is achieved.

A second lightguide element according to the present invention includes an incidence surface for receiving light emitted from a light source and an outgoing surface from which the light incident from the incidence surface goes out. The lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization selection layer includes a plurality of inclining dielectric films inclining with respect to the outgoing surface, and the plurality of inclining dielectric films are arranged increasingly densely as becoming farther from the incidence surface. By this, the above-described object is achieved.

A third lightguide element according to the present invention includes an incidence surface for receiving light emitted from a light source and an outgoing surface from which the light incident from the incidence surface goes out. The lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization conversion layer is an injection-molded transparent resin layer having birefringence. By this, the above-described object is achieved.

A fourth lightguide element according to the present invention includes an incidence surface for receiving light emitted from a light source and an outgoing surface from which the light incident from the incidence surface goes out. The lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. The polarization conversion layer is a phase plate. Directions of a slow axis and a fast axis of the phase plate in a plane parallel to the outgoing surface do not match the specific polarization direction. By this, the above-described object is achieved.

Hereinafter, the functions of the present invention will be described.

In the first illumination device according to the present invention, the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. In addition, the polarization selection layer reflects the light of the specific polarization direction substantially only toward the outgoing surface. Therefore, the reduction in the light utilization efficiency and the reduction in the display quality (contrast ratio), which are caused by light reflection toward the counter surface (toward the viewer in a front light), can be suppressed.

Owing to a structure in which the polarization selection layer includes a plurality of inclining dielectric films provided at a predetermined angle with respect to the outgoing surface, the polarization selection layer can reflect the light of the specific polarization direction substantially only toward the outgoing surface.

In the second illumination device according to the present invention, the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. The polarization selection layer includes a plurality of inclining dielectric films with respect to the outgoing surface, and these inclining dielectric films reflect the light of the specific polarization direction toward the outgoing surface. In the second illumination device according to the present invention, the plurality of inclining dielectric films are arranged increasingly densely as becoming farther from the incidence surface. Therefore, the uniformity of the strength of the light going out from the outgoing surface is enhanced.

The second illumination device according to the present invention can be easily produced by, for example, constructing the lightguide element so as to include a first member having a main surface which includes a plurality of inclining surfaces inclining with respect to the outgoing surface and a plurality of parallel surfaces generally parallel to the outgoing surface, and a second member provided on the main surface of the first member for flattening the main surface; forming the plurality of inclining dielectric films respectively on the plurality of inclining surfaces of the main surface; and arranging the plurality of parallel surfaces of the main surface increasingly sparsely as becoming farther from the incidence surface.

In a structure in which the polarization selection layer includes a plurality of further dielectric films (i.e., dielectric films which are generally parallel to the outgoing surface) respectively formed on the plurality of parallel surfaces of the main surface, it is preferable to adopt a structure in which the incidence of light on the polarization conversion layer is not prevented by these parallel dielectric films. Namely, it is preferable to adopt a structure in which the incidence of light on the inclining dielectric films is not prevented by the parallel dielectric films. Specifically, it is preferable to adopt the following structures.

First, in the case where the polarization selection layer is located in the vicinity of the outgoing surface, it is preferable that the polarization selection layer is located closer to the outgoing surface than the polarization conversion layer. In such a structure, the incidence of light on the polarization conversion layer is not prevented by the parallel dielectric films, and thus the conversion of the polarization direction into the specific polarization direction can be preferably performed. In this case, it is preferable that the parallel surfaces of the first member are located closer to the outgoing surface than the inclining surfaces of the first member, i.e., it is preferable that the parallel dielectric films are located closer to the outgoing surface than the inclining dielectric films. In such a structure, the light is not prevented by the parallel dielectric films from reaching the inclining dielectric films, and thus the light can preferably go out from the outgoing surface.

In the case where the lightguide element further includes a counter surface facing the outgoing surface and the polarization selection layer is located in the vicinity of the counter surface, it is preferable that the polarization selection layer is located closer to the counter surface than the polarization conversion layer. In such a structure, the incidence of light on the polarization conversion layer is not prevented by the parallel dielectric films, and thus the conversion of the polarization direction into the specific polarization direction can be preferably performed. In this case, it is preferable that the parallel surfaces of the first member are located closer to the counter surface than the inclining surfaces of the first member, i.e., it is preferable that the parallel dielectric films are located closer to the counter surface than the inclining dielectric films. In such a structure, the light is not prevented by the parallel dielectric films from reaching the inclining dielectric films, and thus the light can preferably go out from the outgoing surface.

As the first member, for example, a prism sheet including a plurality of prisms arranged on the main surface is usable. As the second member, for example, a transparent resin layer formed of a transparent resin material is usable.

The polarization conversion layer is typically formed of a transparent material having birefringence.

It is preferable that the polarization conversion layer is an injection-molded transparent resin layer. In this case, it is easy to provide a structure in which the polarization conversion layer is thick and occupies a majority of the area of the lightguide element. This enables a large amount of light to be propagated in the light conversion layer to convert the light into the light of the specific polarization direction efficiently. It is preferable that the polarization conversion layer is a phase plate. In this case, the slow axis thereof is generally uniform (the same) in a plane parallel to the outgoing surface. Accordingly, the efficiency at which the light is converted into the light of the specific polarization direction is generally uniform in a plane parallel to the outgoing surface. Therefore, it is easy to provide a design in which the light of the specific polarization direction goes out uniformly from the outgoing surface.

Owing to a structure in which the directions of a slow axis and a fast axis of the phase plate in a plane parallel to the outgoing surface do not match the specific polarization direction, the phase plate preferably acts as a polarization conversion layer.

In the third illumination device according to the present invention, the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. In addition, the polarization conversion layer is an injection-molded transparent resin layer having birefringence. Therefore, it is easy to provide a structure in which the polarization conversion layer is thick and occupies a majority of the area of the lightguide element. This enables a large amount of light to be propagated in the light conversion layer to convert the light into the light of the specific polarization direction efficiently.

In the fourth illumination device according to the present invention, the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. In addition, the polarization conversion layer is a phase plate. Therefore, the slow axis thereof is generally uniform (the same) in a plane parallel to the outgoing surface. Accordingly, the efficiency at which the light is converted into the light of the specific polarization direction is generally uniform in a plane parallel to the outgoing surface. Therefore, it is easy to provide a design in which the light of the specific polarization direction goes out uniformly from the outgoing surface. Furthermore, the directions of the slow axis and the fast axis of the phase plate in a plane parallel to the outgoing surface do not match the specific polarization direction. Therefore, the phase plate preferably acts as a polarization conversion layer.

A phase plate having monoaxial refractive index anisotropy may be used.

In the case where the phase plate is monoaxial, it is preferable that a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength λ of visible light, and an angle α made by the specific polarization direction and the slow axis of the phase plate fulfill the relationship of $(n_x-n_z)/(n_x-n_y) \approx 0$, $0 < (n_x-n_y) \cdot d < \lambda$, and $10° < \alpha < 30°$ or $40° < \alpha < 60°$. In this case, the conversion of the light into the light of the specific polarization direction can be efficiently performed. It is especially preferable that the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength λ of visible light, and the angle α made by the specific polarization direction and the slow axis of the phase plate fulfill the relationship of $(n_x-n_z)/(n_x-n_y) \approx 0$, $(n_x-n_y) \cdot d = \lambda/2$, and $10° < \alpha < 30°$. In this case, the conversion efficiency does not vary almost at all in the wavelength range of the visible light regardless of the wavelength, and thus the occurrence of coloring is suppressed.

In the case where the phase plate is monoaxial, it is also preferable that a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength λ of visible light, and an angle α made by the specific polarization direction and the slow axis of the phase plate fulfill the relationship of $(n_x-n_z)/(n_x-n_y) \approx 1$, $\lambda/4 < (n_x-n_y) \cdot d < 5\lambda/4$, and $20° < \alpha < 90°$. In this case also, the conversion of the light into the light of the specific polarization direction can be efficiently performed. It is especially preferable that the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength λ of visible light, and the angle α made by the specific polarization direction and the slow axis of the phase plate fulfill the relationship of $(n_x-n_z)/(n_x-n_y) \approx 1$, $(n_x-n_y) \cdot d = \lambda/2$, and $20° < \alpha < 80°$. In this case, the conversion efficiency does not vary almost at all in the wavelength range of the visible light regardless of the wavelength, and thus the occurrence of coloring is suppressed.

A phase plate having biaxial refractive index anisotropy may be used. In the case where the phase plate is biaxial, it is preferable that a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength λ of visible light, and an angle α made by the specific polarization direction and the slow axis of the phase plate fulfill the relationship of $0.6 < (n_x-n_z)/(n_x-n_y) < 0.9$, $\lambda/4 < (n_x-n_y) \cdot d < 3\lambda/4$, and $60° < \alpha < 80°$. In this case, the conversion of the light into the light of the specific polarization direction can be efficiently performed in a wide range of angles (in a wide range of angle of propagation). It is especially preferable that the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength λ of visible light, and the angle α made by the specific polarization direction and the slow axis of the phase plate fulfill the relationship of $0.6 < (n_x-n_z)/(n_x-n_y) < 0.9$, $(n_x-n_y) \cdot d = \lambda/2$, and $60° < \alpha < 80°$. In this case, the conversion efficiency does not vary almost at all in the wavelength range of the visible light regardless of the wavelength, and thus the occurrence of coloring is suppressed.

The polarization conversion layer may be located oppositely to the outgoing surface with the polarization selection layer interposed therebetween (i.e., on the side of the counter surface facing the outgoing surface), or on the side of the outgoing surface.

However, in the case where the polarization conversion layer is an injection-molded transparent resin layer, it is preferable that the polarization conversion layer is located oppositely to the outgoing surface with the polarization selection layer interposed therebetween (i.e., on the side of the counter surface). In the case where the polarization conversion layer is an injection-molded transparent resin layer, the slow axis of the polarization conversion layer is disperse in a plane parallel to the outgoing surface. In a structure in which the polarization conversion layer is located oppositely to the outgoing surface with the polarization selection layer interposed therebetween (i.e., on the side of the counter surface), the light of the specific polarization direction directed toward the outgoing surface by the polarization selection layer does not pass the polarization conversion layer before going out from the outgoing surface and thus is not depolarized by the polarization conversion layer.

In the case where the polarization conversion layer is a phase plate, the slow axis of the polarization conversion layer is generally uniform in a plane parallel to the outgoing surface. It is preferable that the polarization conversion layer is located closer to the outgoing surface than the polarization selection layer. In such a structure, the polarization state (for example, the polarization direction) of the light of the specific polarization direction which is directed toward the outgoing surface by the polarization selection layer can be controlled by the polarization conversion layer (phase plate).

An illumination device according to the present invention is preferably usable for an image display apparatus. An image display apparatus, including an illumination device according to the present invention and a display panel provided on the outgoing surface side of the lightguide element of the illumination device and including at least one polarizer, has a high light utilization efficiency and can provide bright display.

In a structure in which such an image display apparatus includes a transparent input device (a so-called touch panel) formed on the counter surface of the lightguide element of the illumination device, the image display apparatus can be thinner than a structure in which the transparent input device, the illumination device and the display panel are simply stacked. A lightguide element having a transparent input device formed on a counter surface thereof is obtained by, for example, adding a polarization selection layer and a polarization conversion layer to a known transparent input device.

In a structure in which the display panel includes a substrate in such an image display apparatus, it is preferable that the lightguide element included in the illumination device acts as the substrate. In this case, the image display apparatus can be thinner than a structure in which the illumination device and the display panel are simply stacked.

The first lightguide element according to the present invention includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. In addition, the polarization selection layer reflects the light of the specific polarization direction substantially only toward the outgoing surface. Therefore, the reduction in the light utilization efficiency and the reduction in the display quality (contrast ratio), which are caused by light reflection toward the counter surface (toward the viewer in a front light), can be suppressed.

The second lightguide element according to the present invention includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. The polarization selection layer includes a plurality of inclining dielectric films inclining with respect to the outgoing surface, and these inclining dielectric films reflect the light of the specific polarization direction toward the outgoing surface. In the second lightguide element according to the present invention, the plurality of inclining dielectric films are arranged increasingly densely as becoming farther from the incidence surface. Therefore, the uniformity of the strength of the light going out from the outgoing surface is enhanced.

The third lightguide element according to the present invention includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. In addition, the polarization conversion layer is an injection-molded transparent resin layer having birefringence. Therefore, it is easy to provide a structure in which the polarization conversion layer is thick and occupies a majority of the area of the lightguide element. This enables a large amount of light to be propagated in the light conversion layer to convert the light into the light of the specific polarization direction efficiently.

The fourth lightguide element according to the present invention includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction. Accordingly, the light incident on the inside of the lightguide element from the light source via the incidence surface can be caused to go out efficiently as light of the specific polarization direction. Therefore, the light utilization efficiency is improved. In addition, the polarization conversion layer is a phase plate. Therefore, the slow axis thereof is uniform (the same) in a plane parallel to the outgoing surface Accordingly, the efficiency at which the light is converted into the light of the specific polarization direction is generally uniform in a plane parallel to the outgoing surface. Therefore, it is easy to provide a design in which the light of the specific polarization direction goes out uniformly from the outgoing surface. Furthermore, the directions of the slow axis and the fast axis of the phase plate in a plane parallel to the outgoing surface do not match the specific polarization direction. Therefore, the phase plate preferably acts as a polarization conversion layer.

BRIEF DESCRIPTION OF DRAWINGS

FIGS. 3(a), 3(b) and 3(c) are step cross-sectional views schematically showing production steps of the illumination device 120 in Embodiment 1.

FIG. 10(a) is a graph showing the relationship between the efficiency (ratio) at which second polarized light is converted into the first polarized light after passing through the phase plate twice and the angle (°) at which the light is propagated in the phase plate, in the case where a λ/4 plate (Nz=0 and monoaxial) for the light of λ=550 nm is used; and FIG. 10(b) is a graph showing the relationship between the conversion efficiency (ratio) into the first polarized light and the angle (°) of propagation when the λ/4 plate is located to realize α=50°.

FIG. 11(a) is a graph showing the relationship between the conversion efficiency (ratio) into the first polarized light and the angle (°) of propagation, in the case where a λ/2 plate (Nz=0 and monoaxial) for the light of λ=550 nm is used; and FIG. 11(b) is a graph showing the relationship between the conversion efficiency (ratio) and the angle (°) of propagation when the λ/2 plate is located to realize α=20°.

FIG. 12(a) is a graph showing the relationship between the conversion efficiency (ratio) into the first polarized light and the angle (°) of propagation, in the case where a 3λ/4 plate (Nz=0 and monoaxial) for the light of λ=550 nm is used; and FIG. 12(b) is a graph showing the relationship between the conversion efficiency (ratio) and the angle (°) of propagation when the 3λ/4 plate is located to realize α=20°.

FIG. 15(a) is a graph showing the relationship between the conversion efficiency (ratio) into the first polarized light and the angle (°) of propagation, in the case where a λ/2 plate (Nz=1 and monoaxial) for the light of λ=550 nm is used; and FIG. 15(b) is a graph showing the relationship between the conversion efficiency (ratio) and the angle (°) of propagation when the λ/2 plate is located to realize α=70°.

FIG. 17(a) is a graph showing the relationship between the conversion efficiency (ratio) into the first polarized light and the angle (°) of propagation, in the case where a λ plate (Nz=1 and monoaxial) for the light of λ=550 nm is used; and FIG. 17(b) is a graph showing the relationship between the conversion efficiency (ratio) and the angle (°) of propagation when the λ plate is located to realize α=80°.

FIG. 18(a) is a graph showing the relationship between the conversion efficiency (ratio) into the first polarized light and the angle (°) of propagation, in the case where a 5λ/4 plate (Nz=1 and monoaxial) for the light of λ=550 nm is used; and FIG. 18(b) is a graph showing the relationship between the conversion efficiency (ratio) and the angle (°) of propagation when the 5λ/4 plate is located to realize α=60°.

FIG. 22(a) is a graph showing the relationship between the conversion efficiency (ratio) into the first polarized light and the angle (°) of propagation, in the case where a λ/2 plate (Nz=0.7 and biaxial) for the light of λ=550 nm is used; and FIG. 22(b) is a graph showing the relationship between the conversion efficiency (ratio) and the angle (°) of propagation when the λ/2 plate is located to realize α=70°.

FIG. 24(a) is a graph showing the relationship between the conversion efficiency (ratio) into the first polarized light and the angle (°) of propagation, in the case where a 3λ/4 plate (Nz=0.2 and biaxial) for the light of λ=550 nm is used; and FIG. 24(b) is a graph showing the relationship between the conversion efficiency (ratio) and the angle (°) of propagation when the λ/2 plate is located to realize α=20°.

FIG. 27 is a cross-sectional view schematically showing the manner in which light goes out from an outgoing surface 20c in the lightguide element 20 in which dielectric films 22a are arranged increasingly densely as becoming farther from an incidence surface 20a.

FIGS. 29(a), 29(b) and 29(c) are step cross-sectional views schematically showing production steps of the illumination device 320 in Embodiment 3.

FIGS. 33(a) and 33(b) are cross-sectional views showing the manner in which a polarization selection layer 22 and a polarization conversion layer 24 are located.

BEST MODE FOR CARRYING OUT THE INVENTION

Hereinafter, embodiments of the present invention will be described with reference to the drawings. The present invention is not limited to the following embodiments.

Embodiment 1

First, with reference to FIG. 1, a structure of an illumination device 120 in an embodiment according to the present invention and a structure of a liquid crystal display (image display apparatus) 100 including the same will be described.

Figure 1:
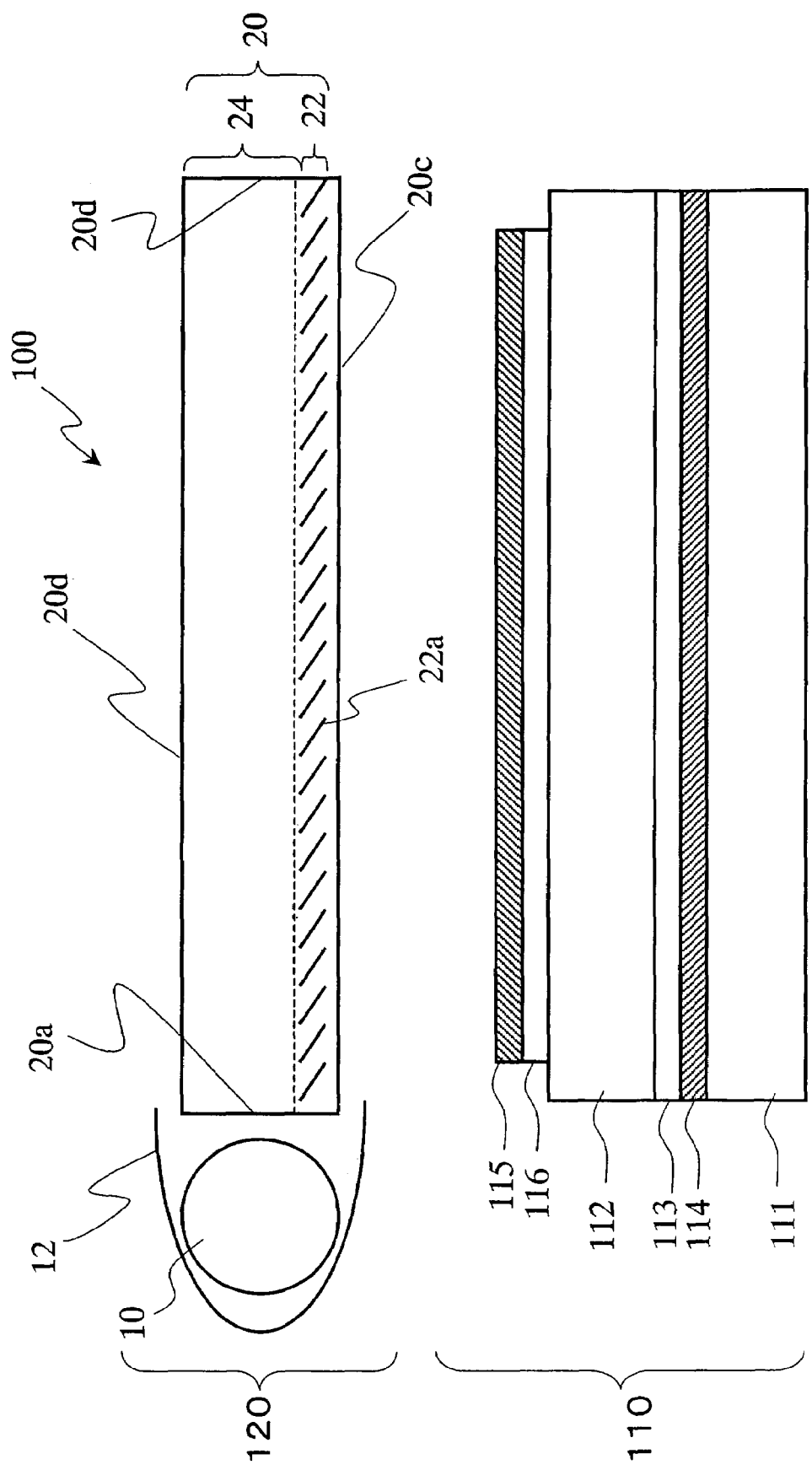
FIG. 1 is a cross-sectional view schematically showing an illumination device 120 in Embodiment 1 according to the present invention and a liquid crystal display (image display apparatus) 100 including the same.

As shown in FIG. 1, the liquid crystal display 100 is a reflection type liquid crystal display including a reflection type liquid crystal display panel 110 and the illumination device (front light) 120.

The reflection type liquid crystal display panel 110 is a known reflection type liquid crystal display panel, and includes a pair of substrates (for example, glass substrates) 111 and 112 and a liquid crystal layer 113 provided therebetween in this embodiment. A reflection electrode 114 is provided on the liquid crystal layer 113 side of the rear-side substrate 111. A transparent electrode (not shown) is provided on the liquid crystal layer 113 side of the viewer-side substrate 112. A polarizer (typically, a polarization plate) 115 and a λ/4 plate (quarter-wave plate) 116 are provided on the viewer side of the substrate 112.

The illumination device 120 includes a light source 10 and a lightguide element 20. Typically, a reflection member 12 is provided so as to surround the light source 10. The reflection member 12 causes light emitted from the light source 10 to be incident on the lightguide element 20 efficiently.

The lightguide element 20 is generally parallelepiped rectangular in this embodiment, and includes a first side surface (incidence surface) 20a for receiving light emitted from the light source 10, a second side surface 20b facing the first side surface 20a, a third side surface and a fourth side surface (neither is shown) located between the first side surface 20a and the second side surface 20b and facing each other, and an outgoing surface 20c and a counter surface 20d facing each other via these four side surfaces interposed therebetween.

The lightguide element 20 includes a polarization selection layer 22 and a polarization conversion layer 24 each having a predetermined thickness in a direction normal to the outgoing surface 20c.

The polarization selection layer 22 causes light of a specific direction of light incident on the incidence surface (first side surface) 20a (hereinafter, also referred to as "first polarized light" for the sake of convenience) to selectively go out from the outgoing surface 20c.

In this embodiment, the polarization selection layer 22 includes a plurality of dielectric films 22a provided at a predetermined angle with respect to the outgoing surface 20c. The dielectric films 22a are arranged at a predetermined pitch, and has a refractive index different from that of the material surrounding the dielectric films 22a. The dielectric films 22a are typically dielectric thin films each having a thickness of about several ten nanometers to several hundred nanometers.

Since the refractive index of the dielectric films 22a is different from the refractive index of the material surrounding the dielectric films 22a, the light reflectance has polarization dependency at an interface between the dielectric films 22a and the material surrounding the dielectric films 22a. More specifically, the reflectance of S polarized light is high and the reflectance of P polarized light is low. Especially, for light incident at an angle close to the Brewster angle, the reflectance of the P polarized light is almost zero and only the S polarized light is reflected. Accordingly, at the interface between the dielectric films 22a and the material surrounding the dielectric films 22a, the reflectance of light vibrating in a direction perpendicular to the direction in which the dielectric films 22a are repeated (vibrating in the direction vertical to the sheet of FIG. 1), and the reflectance of light vibrating in a different direction from the direction of this specific light (first polarized light) is low. Therefore, the first polarized light is selectively reflected toward the outgoing surface 20c, and the first polarized light selectively goes out from the outgoing surface 20c.

In the polarization selection layer 22 including a plurality of dielectric films 22a provided (inclining) at a predetermined angle with respect to the outgoing surface 20c as in this embodiment, the dielectric films 22a reflect the first polarized light included in the light, which is incident on the inside of the lightguide element 20 via the incidence surface 20a, substantially only toward the outgoing surface 20c and reflect almost no such light toward the counter surface 20d. As a result, the first polarized light goes out mainly from the outgoing surface 20c and does not go out from the counter surface 20d almost at all.

On the other hand, the polarization conversion layer 24 converts light polarized in a different direction from that of the first polarized light (for example, light perpendicular to the first polarized light; hereinafter, also referred to as "second polarized light" for the sake of convenience) into the first polarized light.

In this embodiment, the polarization conversion layer 24 is formed of a transparent material having birefringence. More specifically, the polarization conversion layer 24 is an injection-molded transparent resin layer.

An injection-molded transparent resin layer, i.e., a transparent resin layer which is formed by injection molding, has a slow axis which is not uniform but is disperse in a plane parallel to the outgoing surface 20c. Therefore, the second polarized light, which is different from the first polarized light, is depolarized by the birefringence of the transparent resin layer while being propagated in the polarization conversion layer 24, and a part of the depolarized light is converted into the first polarized light.

Figure 2:
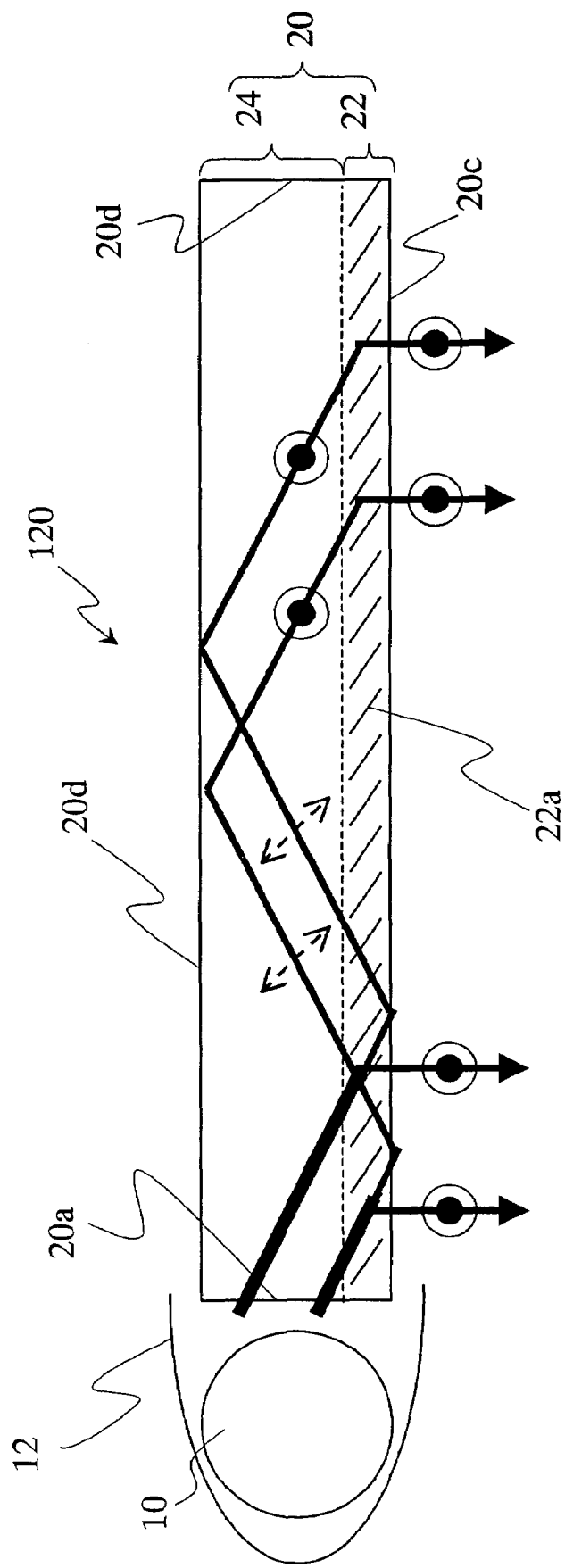
FIG. 2 is a cross-sectional view schematically showing the manner in which light is propagated in a lightguide element 20 of the illumination device 120.

With reference to FIG. 2, the manner in which the light is propagated in the lightguide element 20 will be described. In FIG. 2, the double circles with black inner circles indicate that the polarization direction of the light is vertical to the sheet of FIG. 2, and dashed arrows indicate that the polarization direction of the light is parallel to the sheet of FIG. 2.

Light emitted from the light source 10 is incident on the inside of the lightguide element 20 via the first side surface 20a and is propagated toward the second side surface 20b. Among the light propagated toward the second side surface 20b, the first polarized light vibrating in a direction perpendicular to the direction in which the dielectric films 22a are repeated (in this embodiment, the dielectric films 22a are repeated in a direction normal to the incident surface 20a) is reflected toward the outgoing surface 20c by the polarization selection layer 22 and goes out from the outgoing surface 20c. Among the light propagated toward the second side surface 20b, the second polarized light polarized in a direction perpendicular to that of the first polarized light is converted into the first polarized light by the polarization conversion layer 24, and then is reflected toward the outgoing surface 20c by the polarization selection layer 22 and goes out from the outgoing surface 20c. In this embodiment, the polarization selection layer 22 including a plurality of dielectric films 22a is used. In actuality, light is incident on the interface between the dielectric films 22a and the material surrounding the dielectric films 22a also at angle other than the Brewster angle. Therefore, precisely, light other than the first polarized light is reflected by the interface, and again precisely, light other than the first polarized light goes out from the outgoing surface 20c. Accordingly, the expression "causing the first polarization to selectively go out from the outgoing surface" means "causing the light dominated by the first polarization to selectively go out from the outgoing surface" and does not necessarily mean "causing only the first polarization to selectively go out from the outgoing surface".

In this embodiment, the polarizer 115 of the reflection type liquid crystal display panel 110 is located such that a transmission axis thereof is generally parallel to the polarization direction of the first polarized light which goes out from the outgoing surface 20c. Therefore, the first polarized light going out from the illumination device 120 is incident on the liquid crystal layer 113 without being absorbed by the polarizer 115 almost at all. It is not absolutely necessary that the polarization direction of the first polarized light and the transmission axis of the polarizer 115 is parallel to each other. A phase plate may be provided between the polarizer 115 and the outgoing surface 20c for matching the polarization direction of the first polarized light to the direction of the transmission axis of the polarizer 115.

As described above, in the illumination device 120 according to the present invention, the lightguide element 20 includes the polarization selection layer 22 for causing the first polarized light to selectively go out from the outgoing surface 20c and the polarization conversion layer 24 for converting the second polarized light, polarized in a different direction from that of the first polarized light, into the first polarized light. Consequently, the light incident on the inside of the lightguide element 20 via the incidence surface 20a from the light source 10 can be caused to go out efficiently as light of a specific polarization direction. Therefore, the light utilization efficiency is improved.

In the illumination device 120 in this embodiment, the polarization selection layer 22 reflects the first polarized light substantially only toward the outgoing surface 20c. Therefore, the reduction in the light utilization efficiency and the reduction in the display quality (contrast ratio), which are caused by light reflection toward the counter surface 20d (toward the viewer), can be suppressed.

In addition, in the illumination device 120 in this embodiment, the polarization conversion layer 24 is an injection-molded transparent resin layer. Therefore, it is easy to provide a structure in which the polarization conversion layer 24 is thick and occupies a majority of the area of the lightguide element 20. This enables a large amount of light to be propagated in the light conversion layer 24 to convert the second polarized light into the first polarized light efficiently.

The illumination device 120 in this embodiment can be produced, for example, as follows.

First, as shown in FIG. 3(a), a prism sheet 25 having a thickness of 0.2 mm is formed of isotropic polymethylmethacrylate having a refractive index of 1.49. The prism sheet 25 has a front surface 25a having a sawtooth-like cross section and a generally flat rear surface 25b. The rear surface 25b is to become the outgoing surface 20c later. The front surface 25a is formed of inclining areas 25a1 inclining with respect to the rear surface 25b and vertical areas 25a2 which are generally vertical to the rear surface 25b. The inclining areas 25a1 and the vertical areas 25a2 are alternately arranged.

Next, as shown in FIG. 3(b), $ZrO_2$ having a refractive index of 2.10 is vapor-deposited on the inclining areas 25a1 of the front surface 25a of the prism sheet 25, thereby forming dielectric films (dielectric thin films) 22a having a thickness of 75 nm.

Then, as shown in FIG. 3(c), the prism sheet 25 and a transparent resin sheet 26 having a thickness of 0.8 mm which is formed by injection molding using polymethylmethacrylate having a refractive index of 1.49 are bonded to each other via a transparent adhesive 27 having a refractive index of 1.49. In this manner, the lightguide element 20 including the polarization selection layer 22 and the polarization conversion layer 24 is obtained.

After that, the light source (for example, a cathode ray tube) 10 is located on the incidence surface 20a side of the lightguide element 20, and the reflection member (for example, a reflection film) 12 is located so as to surround the light source 10. Thus, the illumination device 120 shown in FIGS. 1 and 2 is completed.

Figure 4:
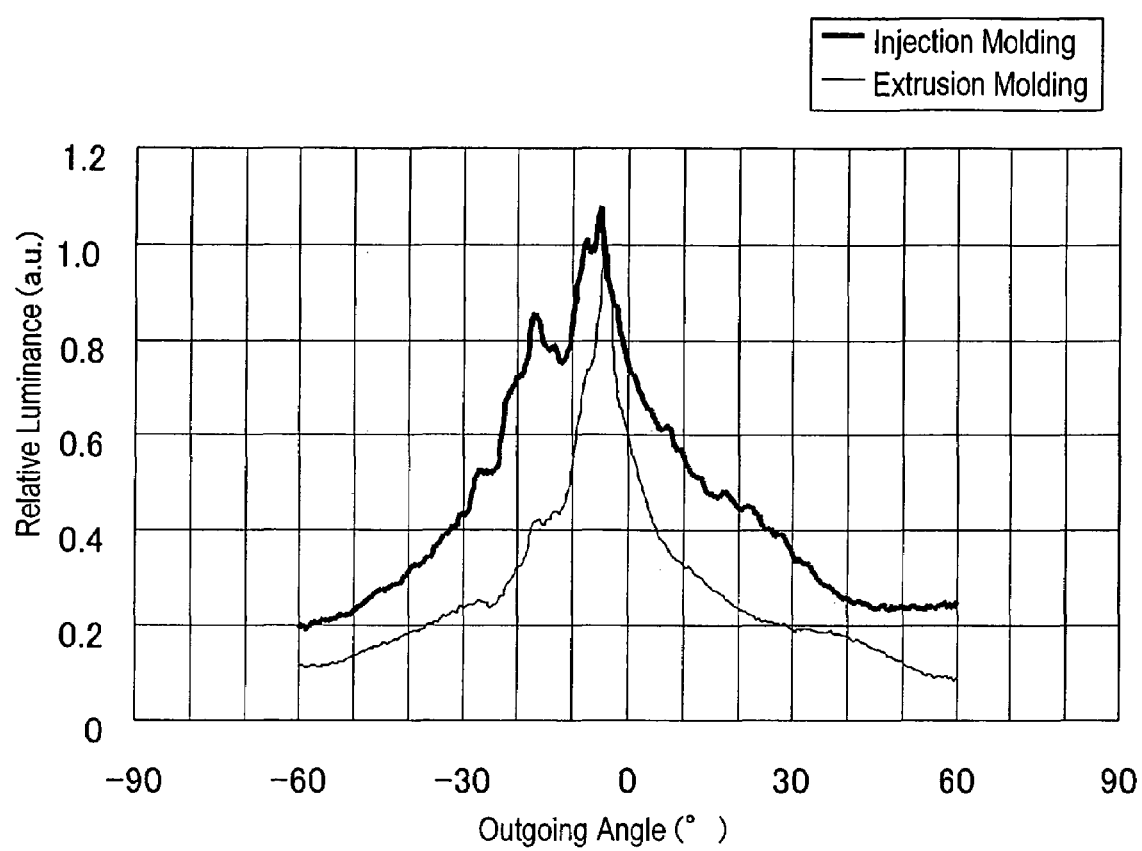
FIG. 4 is a graph showing the relationship between the outgoing angle (°) of the light from an outgoing surface 20c and the relative luminance (arbitrary unit; a.u.) in the illumination device 120 in Embodiment 1.

FIG. 4 shows the relationship between the outgoing angle (°) of the light from the outgoing surface 20c and the relative luminance (arbitrary unit; a.u.) in the illumination device 120 produced in this manner. For the purpose of comparison, FIG. 4 also shows the luminance of an illumination device produced in the same manner as the illumination device 120 except that the transparent resin sheet is formed by extrusion molding.

As can be seen from FIG. 4, the illumination device 120 produced using a transparent resin sheet formed by injection molding provides a higher luminance of the outgoing light than the illumination device produced using a transparent resin sheet formed by extrusion molding. The reason is that the transparent resin sheet formed by extrusion molding does not convert the second polarized light into the first polarized light efficiently, whereas the transparent resin sheet 26 formed by injection molding converts the second polarized light into the first polarized light efficiently.

It is known that the magnitude of birefringence of transparent resin layers formed using a transparent resin (for example, the above-described transparent resin sheets) varies in accordance with the molding method. For example, "Development and Characteristics of the Latest Resins for Optical Uses and Designing and Molding Technologies of High Precision Components" (published by Technical Information Institute Co., Ltd.), page 8, describes that the magnitude of birefringence changes from highest to lowest in the order of injection molding, extrusion molding, compression molding and casting molding.

Accordingly, use of injection molding allows the birefringence of the transparent resin sheet to be sufficiently large. Therefore, by using a transparent resin layer formed by injection molding as the polarization conversion layer 24, the second polarized light propagated in the lightguide element 20 can be efficiently converted into the first polarized light.

When the polarization conversion layer 24 has the slow axis which is disperse in a plane parallel to the outgoing surface 20c (for example, like an injection-molded transparent resin layer as used in this embodiment), the polarization conversion layer 24 is preferably located closer to the counter surface 20d than the polarization selection layer 22 as in this embodiment.

When the polarization conversion layer 24 is located closer to the counter surface 20d than the polarization selection layer 22, the first polarization light directed (reflected) toward the outgoing surface 20c by the polarization selection layer 22 does not pass through the polarization conversion layer 24 before going out from the outgoing surface 20c, and thus is not depolarized by the polarization conversion layer 24.

In this embodiment, polymethylmethacrylate is used as the material of the lightguide element 20 (the material of the prism sheet 25 and the transparent resin sheet 26). The present invention is not limited to this, and various transparent materials including polycarbonate are usable.

In this embodiment, the polarization selection layer 24 includes a plurality of dielectric films 22a. The present invention is not limited to this, and any type of polarization selection layer which can cause light of a specific polarization direction to selectively go out from the outgoing surface 20c is usable. For example, a polarization selection layer including a plurality of dielectric multiple-layer films provided at a predetermined angle with respect to the outgoing surface 20c may be used. In consideration of the improvement in the light utilization efficiency and the display quality, it is preferable to use a polarization selection layer capable of reflecting light of a specific polarization direction substantially only toward the outgoing surface 20c.

Embodiment 2

Figure 5:
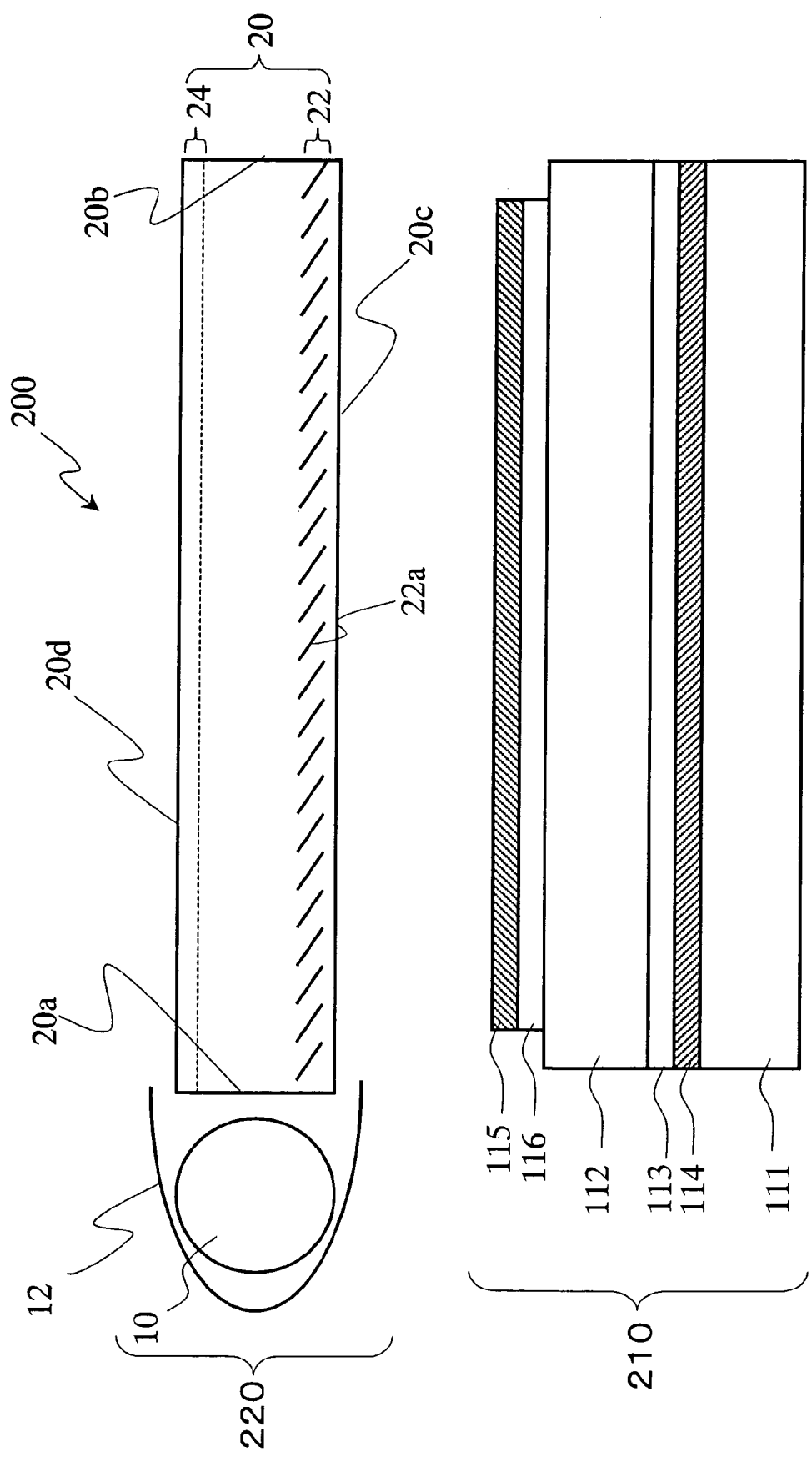
FIG. 5 is a cross-sectional view schematically showing an illumination device 220 in Embodiment 2 according to the present invention and a liquid crystal display (image display apparatus) 200 including the same.

With reference to FIG. 5, a structure of an illumination device 220 in an embodiment according to the present invention and a structure of a liquid crystal display (image display apparatus) 200 including the same will be described. In the figures referred to below, elements having substantially the same functions to those of the elements in the illumination device 120 and the liquid crystal display 100 in Embodiment 1 bear the identical reference numerals thereto, and descriptions thereof will be partially omitted, for the sake of simplicity of description.

As shown in FIG. 5, the liquid crystal display 200 is a reflection type liquid crystal display including a reflection type liquid crystal display panel 210 and the illumination device (front light) 220.

The reflection type liquid crystal display panel 210 is a known reflection type liquid crystal display panel, and has, for example, the same structure as that of the reflection type liquid crystal display panel 110 of the liquid crystal display 100 in Embodiment 1.

The illumination device 220 is different from the illumination device 120 in Embodiment 1 in that the lightguide element 20 includes a phase plate as the polarization conversion layer 24.

In the illumination device 120 shown in FIG. 1, the polarization conversion layer 24 is an injection-molded transparent resin layer and the slow axis thereof is not uniform but is disperse in a plane parallel to the outgoing surface 20c.

By contrast, in the illumination device 220 in this embodiment, the polarization conversion layer 24 is a so-called phase plate, and the slow axis thereof is generally uniform (the same) in a plane parallel to the outgoing surface 20c. The polarization conversion layer 24 as the phase plate is designed such that the directions of the slow axis and the fast axis (typically, perpendicular to the slow axis) thereof do not match the polarization direction of the first polarized light. The second polarized light, which is different from the first polarized light, is converted into the first polarized light by the birefringence (linear birefringence) of the polarization conversion layer 24. As the polarization conversion layer 24 acting as the phase plate, a λ/2 plate (half-wave plate), for example, is usable. Needless to say, the polarization conversion layer 24 is not limited to a λ/2 plate, and phase plates other than the λ/2 plate can be used as described later.

Figure 6:
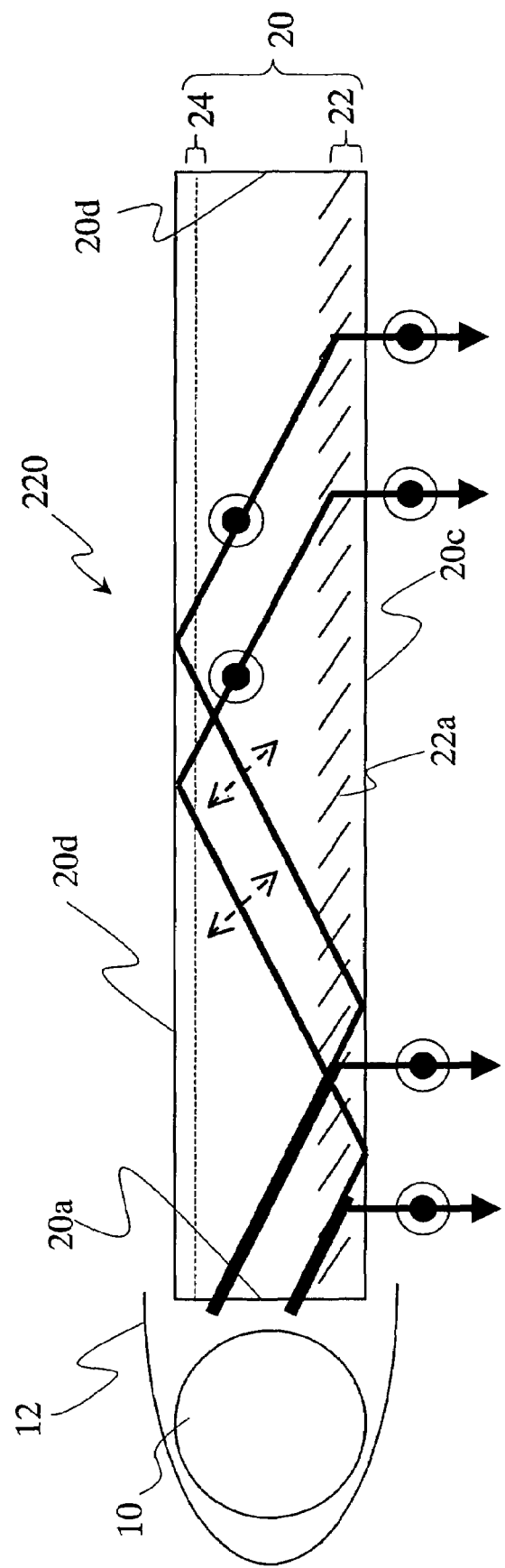
FIG. 6 is a cross-sectional view schematically showing the manner in which light is propagated in a lightguide element 20 of the illumination device 220.

With reference to FIG. 6, the manner in which light is propagated in the lightguide element 20 will be described.

Light emitted from the light source 10 is incident on the inside of the lightguide element 20 via the first side surface 20a and is propagated toward the second side surface 20b. Among the light propagated toward the second side surface 20b, first polarized light vibrating in a direction perpendicular to the direction in which the dielectric films 22a are repeated (in this embodiment, the dielectric films 22a are repeated in a direction normal to the incident surface 20a) is reflected toward the outgoing surface 20c by the polarization selection layer 22 and goes out from the outgoing surface 20c. Among the light propagated toward the second side surface 20b, second polarized light polarized in a direction perpendicular to that of the first polarized light is converted into the first polarized light by the polarization conversion layer 24, and then is reflected toward the outgoing surface 20c by the polarization selection layer 22 and goes out from the outgoing surface 20c.

As described above, in the illumination device 220 in this embodiment also, the lightguide element 20 includes the polarization selection layer 22 for causing the first polarized light to selectively go out from the outgoing surface 20c and the polarization conversion layer 24 for converting the second polarized light, polarized in a different direction from that of the first polarized light, into the first polarized light. Consequently, the light incident on the inside of the lightguide element 20 via the incidence surface 20a from the light source 10 can be caused to go out efficiently as light of a specific polarization direction. Therefore, the light utilization efficiency is improved.

In the illumination device 220 in this embodiment, the polarization conversion layer 24 is a phase plate, and thus the slow axis thereof is generally uniform (the same) in a plane parallel to the outgoing surface 20c. Therefore, the efficiency at which the second polarized light is converted into the first polarized light is generally uniform in a plane parallel to the outgoing surface 20c. This provides an advantage that it is easy to design the illumination device such that the first polarized light uniformly goes out from the outgoing surface 20c.

The illumination device 220 in this embodiment can be produced, for example, as follows.

Figure 7:
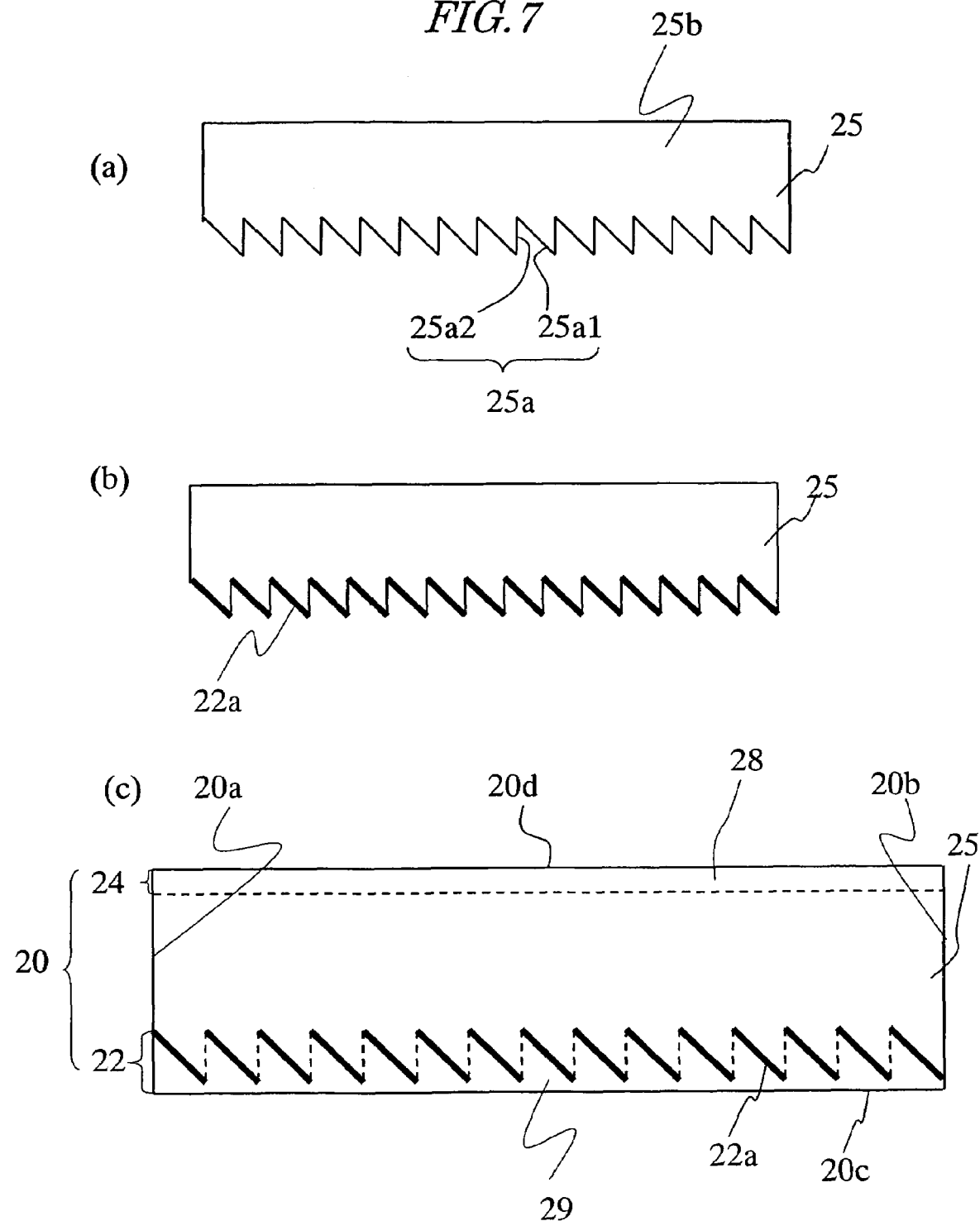
FIGS. 7(a), 7(b) and 7(c) are step cross-sectional views schematically showing production steps of the illumination device 220 in Embodiment 2.

First, as shown in FIG. 7(a), a prism sheet 25 having a thickness of 1.0 mm is formed of isotropic polymethylmethacrylate having a refractive index of 1.49. The prism sheet 25 has a front surface 25a having a sawtooth-like cross section and a generally flat rear surface 25b. The front surface 25a is formed of inclining areas 25a1 inclining with respect to the rear surface 25b and vertical areas 25a2 which are generally vertical to the rear surface 25b. The inclining areas 25a1 and the vertical areas 25a2 are alternately arranged.

Next, as shown in FIG. 7(b), $ZrO_2$ having a refractive index of 2.10 is vapor-deposited on the inclining areas 25a1 of the front surface 25a of the prism sheet 25, thereby forming dielectric films (dielectric thin films) 22a having a thickness of 75 nm.

Then, as shown in FIG. 7(c), the front surface 25a of the prism sheet 25 is flattened by a transparent resin 29 having a refractive index of 1.49, and a λ/2 plate (produced by Nitto Denko Co., Ltd.) 28 formed of ARTON (registered trademark) having a refractive index of 1.51 is bonded to the rear surface 25b of the prism sheet 25. In this manner, the lightguide element 20 including the polarization selection layer 22 and the polarization conversion layer 24 is obtained.

After that, the light source (for example, a cathode ray tube) 10 is located on the incidence surface 20a side of the lightguide element 20, and a reflection member (for example, a reflection film) 12 is located so as to surround the light source 10. Thus, the illumination device 220 shown in FIGS. 5 and 6 is completed.

Figure 8:
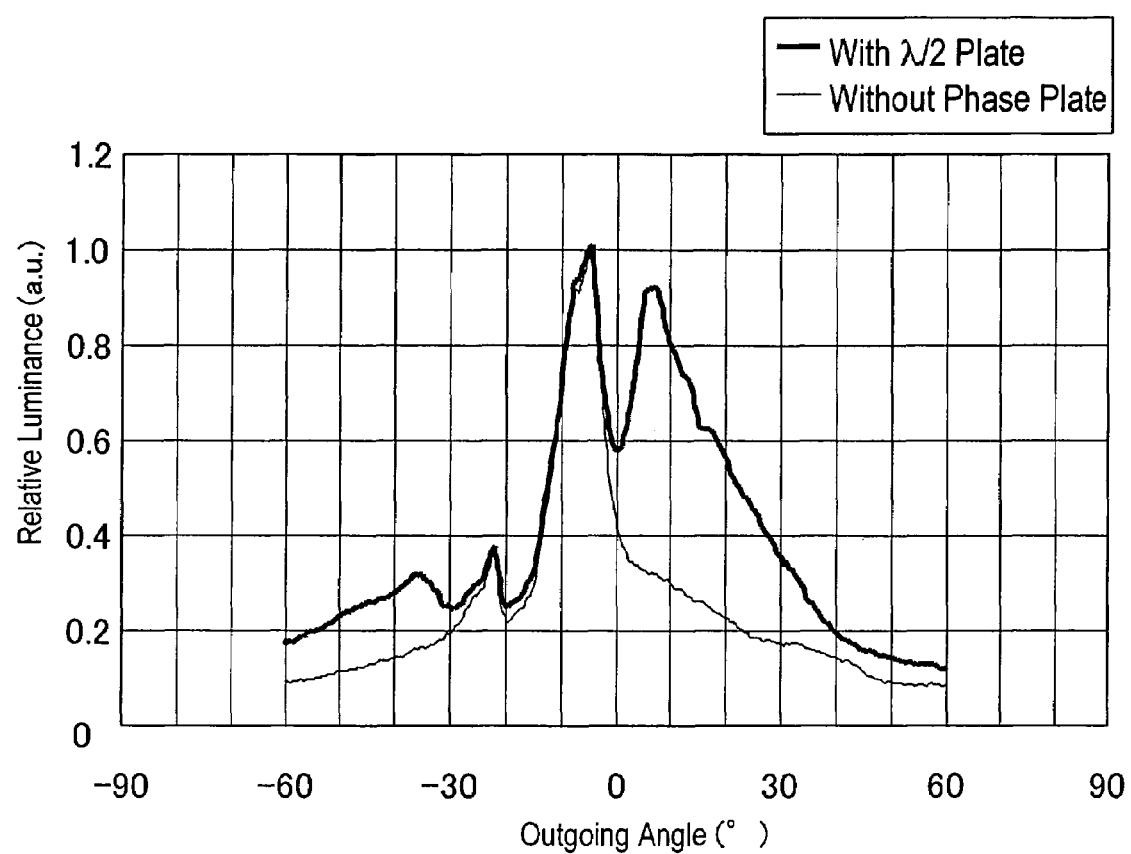
FIG. 8 is a graph showing the relationship between the outgoing angle (°) of the light from an outgoing surface 20c and the relative luminance (arbitrary unit; a.u.) in the illumination device 220 in Embodiment 2.
Figure 9:
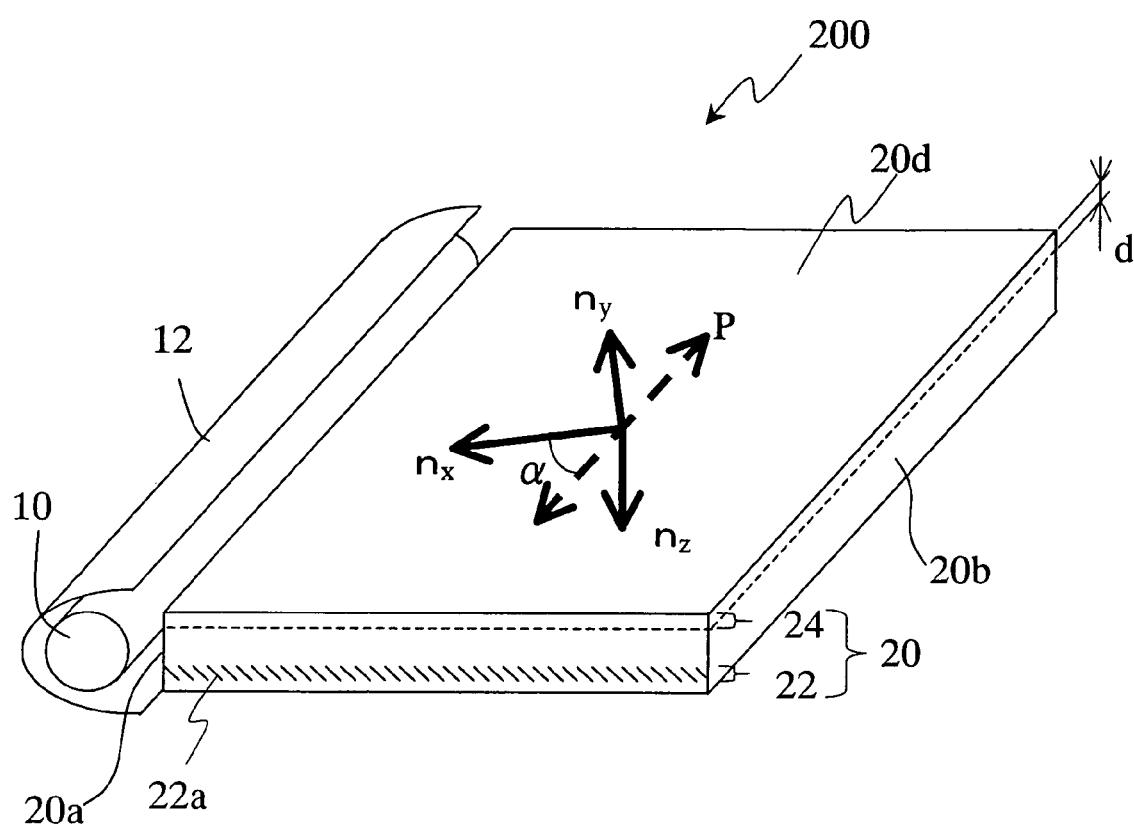
FIG. 9 is an isometric view schematically showing the relationship, in the illumination device 200 among the refractive index $n_x$ in the direction of the slow axis of a phase plate, the refractive index $n_y$ in the direction of the fast axis of the phase plate, the refractive index $n_z$ in the thickness direction of the phase plate, the thickness d of the phase plate, and the angle α made by the polarization direction P of first polarized light and the slow axis of the phase plate.
Figure 13:
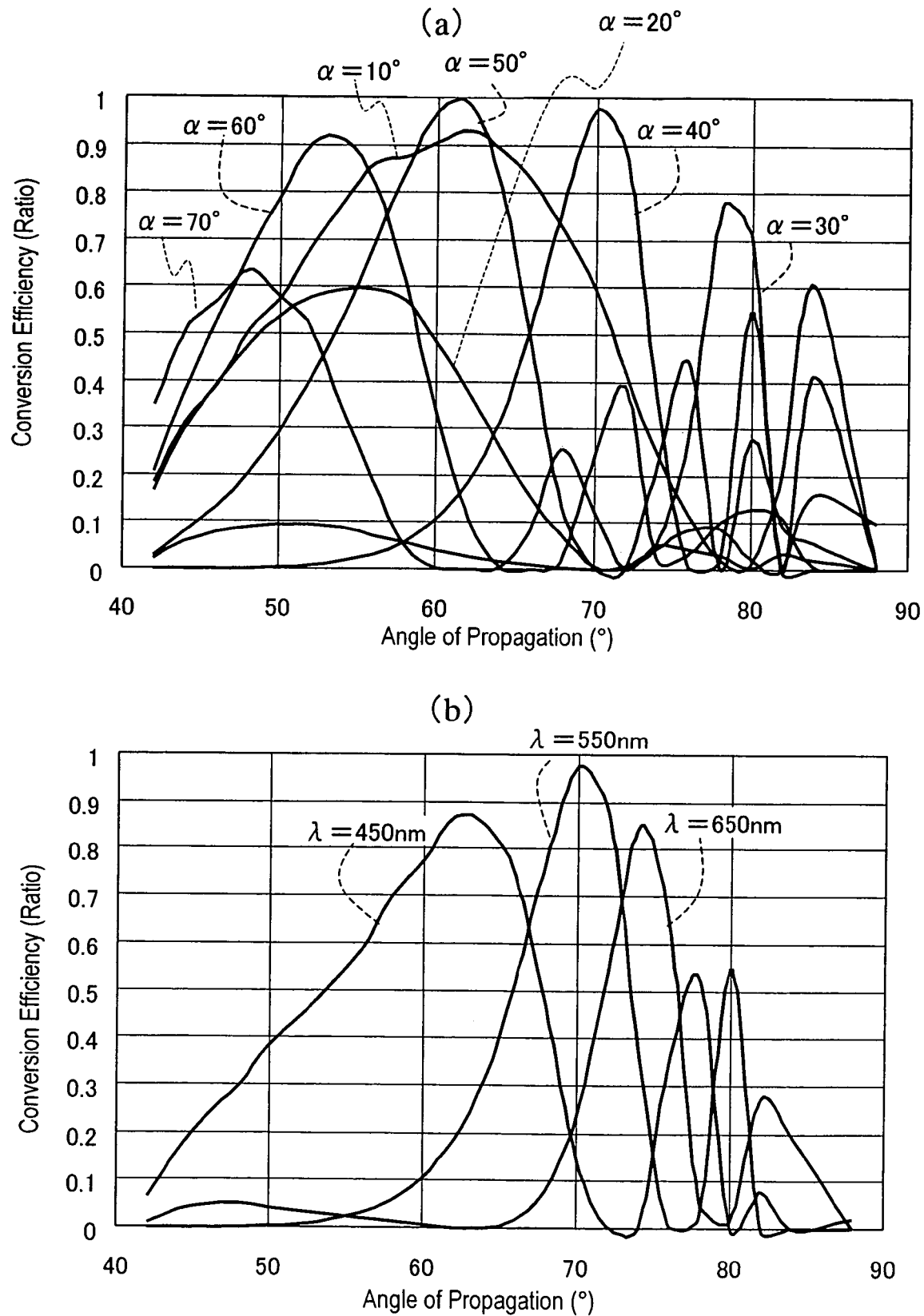
FIG. 13(a) is a graph showing the relationship between the conversion efficiency (ratio) into the first polarized light and the angle (°) of propagation, in the case where a λ plate (Nz=0 and monoaxial) for the light of λ=550 nm is used.
FIG. 13(b) is a graph showing the relationship between the conversion efficiency (ratio) and the angle (°) of propagation when the λ plate is located to realize α=40°.

FIG. 8 shows the relationship between the outgoing angle (°) of the light from the outgoing surface 20c and the relative luminance (arbitrary unit; a.u.) in the illumination device 220 produced in this manner. FIG. 8 shows the luminance in the case where the following relationship is fulfilled by the following factors shown in FIG. 9: the refractive index $n_x$ in the direction of the slow axis of the λ/2 plate 28, the refractive index $n_y$ in the direction of the fast axis of the λ/2 plate 28, the refractive index $n_z$ in the thickness direction of the λ/2 plate 28, the thickness d of the λ/2 plate 28, the wavelength λ of the visible light (not shown), and the angle α made by the polarization direction P of the first polarized light and the slow axis of the λ/2 plate 28.

$(n_x-n_y) \cdot d = 270$ nm;

$(n_x-n_z)/(n_x-n_y) = 1.0$; and

α=65°.

For the purpose of comparison, FIG. 8 also shows the luminance of an illumination device produced in the same manner as the illumination device 220 except for not including a λ/2 plate (phase plate).

As can be seen from FIG. 8, the illumination device 220 including the polarization conversion layer 24 as the phase plate provides a higher luminance of the outgoing light than the illumination device which does not include the phase plate, i.e., the polarization conversion layer. In other words, it is appreciated that the second polarized light is efficiently converted into the first polarized light by the polarization conversion layer 24 as the phase plate.

The specifications of the phase plate as the polarization conversion layer 24 are not limited to those described herein as examples. Hereinafter, preferable specifications of the phase plate will be described. Specifically, a preferable relationship among the refractive index $n_x$ in the direction of the slow axis of the phase plate (the slow axis in a plane parallel to the outgoing surface 20c), the refractive index $n_y$ in the direction of the fast axis of the phase plate (the fast axis in a plane parallel to the outgoing surface 20c), the refractive index $n_z$ in the thickness direction of the phase plate, the thickness d of the phase plate, the wavelength λ of the visible light, and the angle α made by the polarization direction P of the first polarized light and the slow axis of the phase plate.

First, a monoaxial phase plate of $Nz=(n_x-n_z)/(n_x-n_y)=0$, i.e., $n_x=n_z$ will be described. FIGS. 10, 11, 12 and 13 show the calculation results of the efficiency (ratio) at which the second polarized light is converted into the first polarized light after passing through such a phase plate having monoaxial refractive index anisotropy twice. FIGS. 10(a), 11(a), 12(a) and 13(a) are graphs showing the relationship between the conversion efficiency into the first polarized light and the angle (°) at which the light is propagated in the phase plate, with the value of a being varied. FIGS. 10(b), 11(b), 12(b) and 13(b) are graphs showing the relationship between the conversion efficiency into the first polarized light and the angle (°) at which the light is propagated in the phase plate, with the value of λ being varied. The phase differences $(n_x-n_y) \cdot d$ of the phase plates shown in FIGS. 10 through 13 are as shown in Table 1.

TABLE 1

|  | Nz | $(n_x - n_y) \cdot d$ | Remarks |
| --- | --- | --- | --- |
| FIGS. 10(a), (b) | 0 | 137.5 nm | λ/4 plate for the light of λ = 550 nm |
| FIGS. 11(a), (b) | 0 | 275.0 nm | λ/2 plate for the light of λ = 550 nm |
| FIGS. 12(a), (b) | 0 | 412.5 nm | 3λ/4 plate for the light of λ = 550 nm |
| FIGS. 13(a), (b) | 0 | 550.0 nm | λ plate for the light of λ = 550 nm |

The light propagated in the lightguide element 20 is totally reflected in repetition between the outgoing surface 20c and the counter surface 20d. Accordingly, the light propagated in the phase plate is at a total reflection angle θc or greater with respect to a plane parallel to the outgoing surface 20c. Therefore, the efficiency at which the second polarized light is converted into the first polarized light by the phase plate is only needed to be considered for a range of the total reflection angle θ or greater. When the lightguide element and the phase plate are formed of generally used materials, i.e., transparent resin materials such as polymethylmethacrylate, polycarbonate and ARTON (registered trademark), the total reflection angle θc is about 40°.

FIGS. 10(a) and (b) are graphs showing the results obtained when a λ/4 plate was used as the phase plate. FIG. 10(a) shows the conversion efficiency of the light of λ=550 nm. As can be seen from FIG. 10(a), by locating the λ/4 plate so as to realize, for example, α=50°, the second polarized light can be efficiently converted into the first polarized light. Especially, about 90% of the second polarized light propagated at an angle of about 60° in the λ/4 plate is converted into the first polarized light. FIG. 10(b) shows the conversion efficiency obtained when α=50°. As can be seen from FIG. 10(b), the conversion efficiency of the second polarized light propagated at an angle of about 60° in the λ/4 plate is generally constant in the wavelength range of the visible light. This means that the occurrence of coloring of the first polarized light which goes out from the outgoing surface 20c after the conversion is suppressed.

FIGS. 11(a) and (b) are graphs showing the results obtained when a λ/2 plate was used as the phase plate. FIG. 11(a) shows the conversion efficiency of the light of λ=550 nm. As can be seen from FIG. 11(a), by locating the λ/2 plate so as to realize, for example, α=20°, the second polarized light can be efficiently converted into the first polarized light. Especially, about 90% of the second polarized light propagated at an angle of about 80° in the λ/2 plate is converted into the first polarized light. FIG. 11(b) shows the conversion efficiency obtained when α=20°. As can be seen from FIG. 11(b), the conversion efficiency of the second polarized light propagated at an angle of about 80° in the λ/2 plate is generally constant in the wavelength range of the visible light.

FIGS. 12(a) and (b) are graphs showing the results obtained when a 3λ/4 plate was used as the phase plate. FIG. 12(a) shows the conversion efficiency of the light of λ=550 nm. As can be seen from FIG. 12(a), by locating the 3λ/4 plate so as to realize, for example, α=20°, the second polarized light can be efficiently converted into the first polarized light. Especially, about 90% of the second polarized light propagated at an angle of about 45° in the 3λ/4 plate is converted into the first polarized light. FIG. 12(b) shows the conversion efficiency obtained when α=20°. As can be seen from FIG. 12(b), the conversion efficiency of the second polarized light propagated at an angle of about 45° in the 3λ/4 plate is generally constant in the wavelength range of the visible light.

FIGS. 13(a) and (b) are graphs showing the results obtained when a λ plate was used as the phase plate. FIG. 13(a) shows the conversion efficiency of the light of λ=550 nm. As can be seen from FIG. 13(a), by locating the λ plate so as to realize, for example, α=10° or 40° through 60°, the second polarized light can be efficiently converted into the first polarized light. The conversion efficiency is as high as 90% or greater depending on the angle at which the light is propagated in the λ plate. However, as can be seen from FIG. 13(b), when α=40° for example, the conversion efficiency into the first polarized light drastically varies in the range of the visible light. As a result, the amount light which goes out from the outgoing surface 20c varies in accordance with the wavelength, and coloring may occur.

The present inventor reviewed the above-described results in detail. In a consequence, the following was found: when the phase plate has monoaxial refractive index anisotropy, the second polarized light can be efficiently converted into the first polarized light in the case where the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength λ of the visible light, and the angle α made by the polarization direction P of the first polarized light and the slow axis of the phase plate fulfill the following relationship (1).

$(n_x-n_z)/(n_x-n_y)\approx 0$;

$0<(n_x-n_y)\cdot d<\lambda$; and $10°<\alpha<30°$ or $40°<\alpha<60°$ \hfill (1).

Especially when the following relationship (2) is fulfilled, the efficiency at which the second polarized light is converted into the first polarized light does not vary almost at all in the wavelength range of the visible light regardless of the wavelength, and thus the occurrence of coloring is suppressed.

$(n_x-n_z)/(n_x-n_y)\approx 0$;

$(n_x-n_y)\cdot d=\lambda/2$; and $10°<\alpha<30°$ \hfill (2).

Next, a monoaxial phase plate of $Nz=(n_x-n_z)/(n_x-n_y)=1$, i.e., $n_y=n_z$ will be described. FIGS. 14, 15, 16, 17 and 18 show the calculation results of the efficiency (ratio) at which the second polarized light is converted into the first polarized light after passing through such a phase plate having monoaxial refractive index anisotropy twice. The phase differences $(n_x-n_y)\cdot d$ of the phase plates shown in FIGS. 14 through 18 are as shown in Table 2.

TABLE 2

Figure 14:
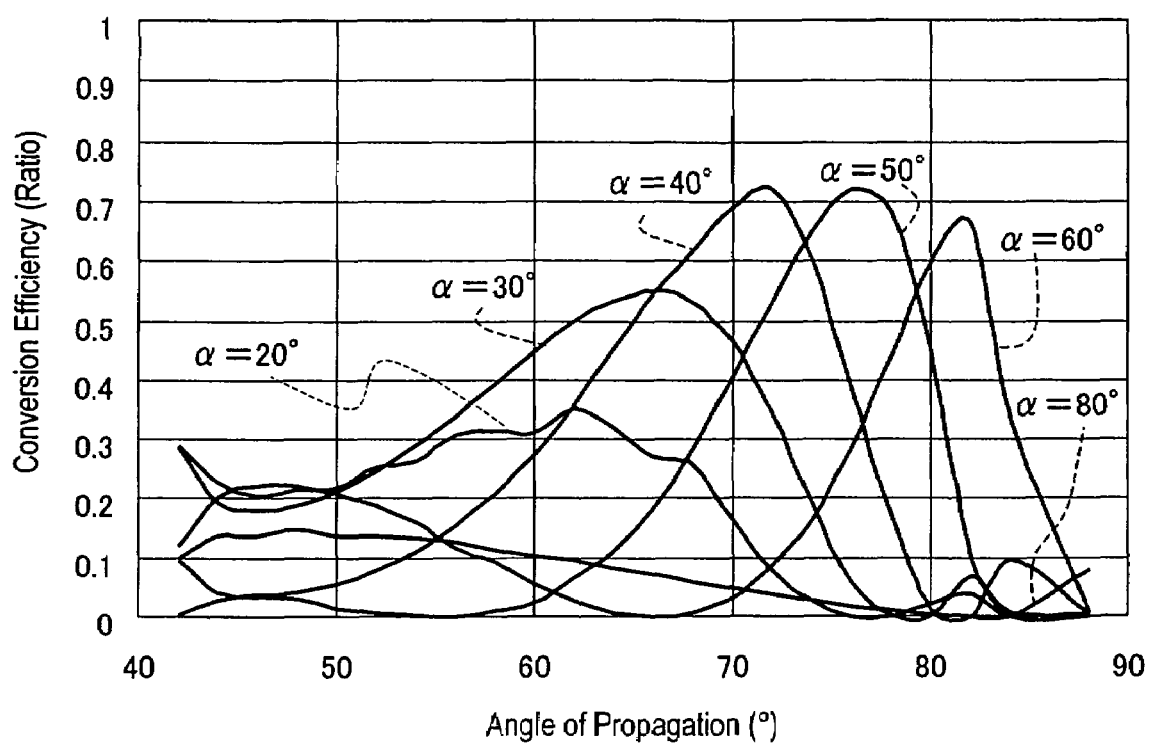
FIG. 14 is a graph showing the relationship between the conversion efficiency (ratio) into the first polarized light and the angle (°) of propagation when a λ/4 plate (Nz=1 and monoaxial) for the light of λ=550 nm is used.
Figure 16:
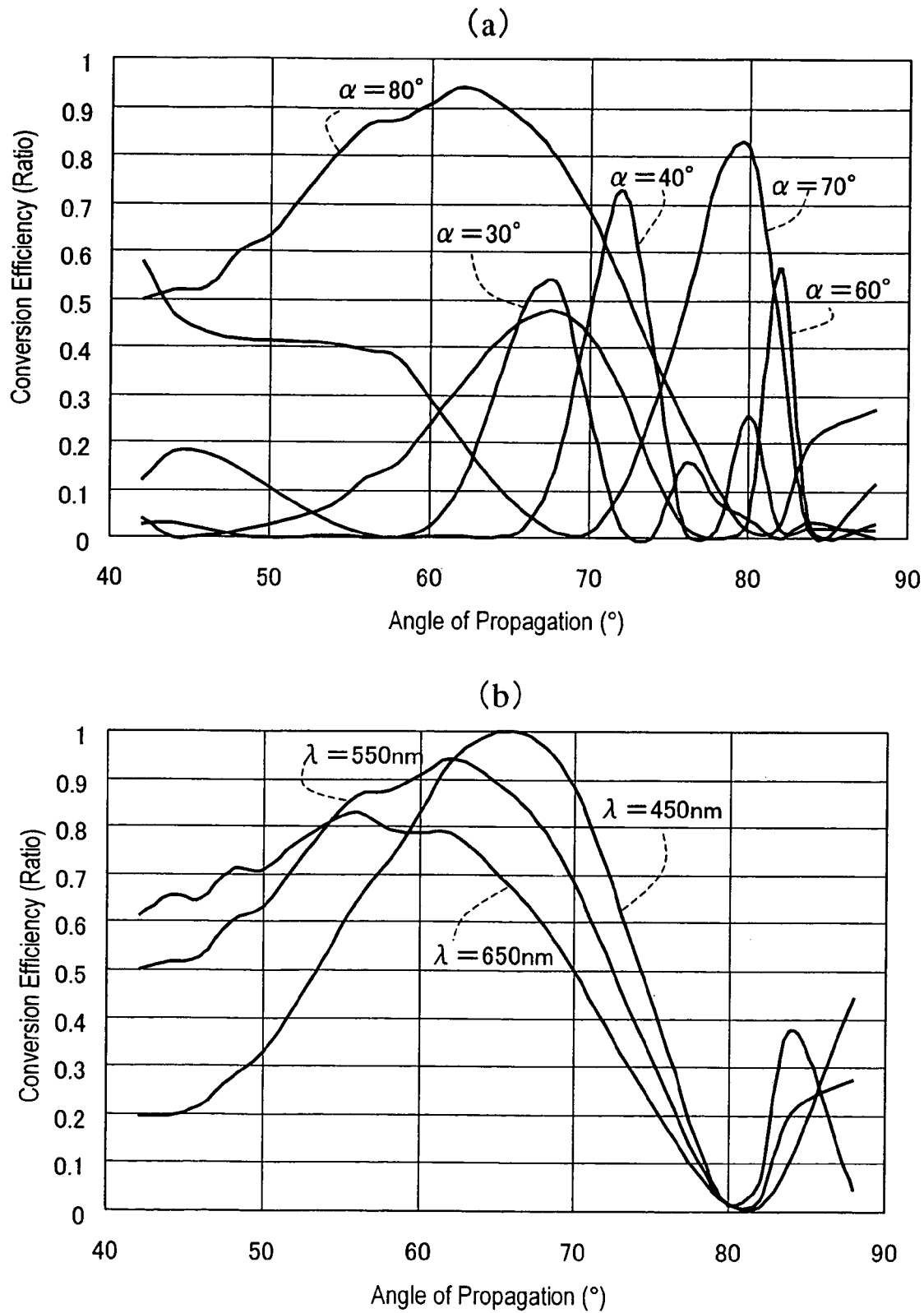
FIG. 16(a) is a graph showing the relationship between the conversion efficiency (ratio) into the first polarized light and the angle (°) of propagation, in the case where a 3λ/4 plate (Nz=1 and monoaxial) for the light of λ=550 nm is used.
FIG. 16(b) is a graph showing the relationship between the conversion efficiency (ratio) and the angle (°) of propagation when the 3λ/4 plate is located to realize α=80°.

|  | Nz | $(n_x - n_y) \cdot d$ | Remarks |
|---|---|---|---|
| FIG. 14 | 1 | 137.5 nm | λ/4 plate for the light of λ = 550 nm |
| FIGS. 15(a), (b) | 1 | 275.0 nm | λ/2 plate for the light of λ = 550 nm |
| FIGS. 16(a), (b) | 1 | 412.5 nm | 3λ/4 plate for the light of λ = 550 nm |
| FIGS. 17(a), (b) | 1 | 550.0 nm | λ plate for the light of λ = 550 nm |
| FIGS. 18(a), (b) | 1 | 687.5 nm | 5λ/4 plate for the light of λ = 550 nm |

FIG. 14 is a graph showing the conversion efficiency of the light of λ=550 nm obtained when a λ/4 was used as the phase plate. As can be seen from FIG. 14, use of the λ/4 plate allows the second polarized light to be converted into the first polarized light, but the conversion efficiency is only about 70% at the maximum.

FIGS. 15(a) and (b) are graphs showing the results obtained when a λ/2 plate was used as the phase plate. FIG. 15(a) shows the conversion efficiency of the light of λ=550 nm. As can be seen from FIG. 15(a), by locating the λ/2 plate so as to realize, for example, α=30° through 70°, the second polarized light can be efficiently converted into the first polarized light, and the conversion efficiency is as high as 90% or greater depending on the angle of propagation of the light. FIG. 15(b) shows the conversion efficiency obtained when α=70°. As can be seen from FIG. 15(b), the conversion efficiency does not vary almost at all in the wavelength range of the visible light regardless of the wavelength.

FIGS. 16(a) and (b) are graphs showing the results obtained when a 3λ/4 plate was used as the phase plate. FIG. 16(a) shows the conversion efficiency of the light of λ=550 nm. As can be seen from FIG. 16(a), by locating the 3λ/4 plate so as to realize, for example, α=80°, the second polarized light can be efficiently converted into the first polarized light. Especially, 90% or greater of the second polarized light propagated at an angle of about 60° in the 3λ/4 plate is converted into the first polarized light. FIG. 16(b) shows the conversion efficiency obtained when α=80°. As can be seen from FIG. 16(b), the conversion efficiency of the second polarized light propagated at an angle of about 60° in the 3λ/4 plate is generally constant in the wavelength range of the visible light.

FIGS. 17(*a*) and (*b*) are graphs showing the results obtained when a λ plate was used as the phase plate. FIG. 17(*a*) shows the conversion efficiency of the light of λ=550 nm. As can be seen from FIG. 17(*a*), by locating the λ plate so as to realize, for example, α=40° through 50° or 80°, the second polarized light can be efficiently converted into the first polarized light, and the conversion efficiency is as high as 90% or greater depending on the angle at which the light is propagated in the λ plate. FIG. 17(*b*) shows the conversion efficiency obtained when α=80°. As can be seen from FIG. 17(*b*), the conversion efficiency of the second polarized light propagated at an angle of about 65° in the λ plate is generally constant in the wavelength range of the visible light.

FIGS. 18(*a*) and (*b*) are graphs showing the results obtained when a 5λ/4 plate was used as the phase plate. FIG. 18(*a*) shows the conversion efficiency of the light of λ=550 nm. As can be seen from FIG. 18(*a*), by locating the 5λ/4 plate so as to realize, for example, α=30° through 60°, the second polarized light can be efficiently converted into the first polarized light, and the conversion efficiency is as high as 90% or greater depending on the angle at which the light is propagated in the 5λ/4 plate. However, as can be seen from FIG. 18(*b*), when α=60° for example, the conversion efficiency into the first polarized light drastically varies in the range of the visible light. As a result, the amount light which goes out from the outgoing surface 20*c* varies in accordance with the wavelength, and coloring may occur.

The present inventor reviewed the above-described results in detail. In a consequence, the following was found: when the phase plate has monoaxial refractive index anisotropy, the second polarized light can be efficiently converted into the first polarized light also in the case where the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength λ of the visible light, and the angle α made by the polarization direction P of the first polarized light and the slow axis of the phase plate fulfill the following relationship (3).

$(n_x-n_z)/(n_x-n_y) \approx 1$;

$\lambda/4 < (n_x-n_y) \cdot d < 5\lambda/4$;

$20° < \alpha < 90°$        (3).

Especially when the following relationship (4) is fulfilled, the efficiency at which the second polarized light is converted into the first polarized light does not vary almost at all in the wavelength range of the visible light regardless of the wavelength, and thus the occurrence of coloring is suppressed.

$(n_x-n_z)/(n_x-n_y) \approx 1$;

$(n_x-n_y) \cdot d = \lambda/2$ $20° < \alpha < 80°$        (4).

So far, the monoaxial phase plates have been described. When a monoaxial phase plate is used, the range of angles of propagation at which the conversion efficiency is high may not be considered to be sufficiently wide as shown in FIGS. 10 through 18.

The present inventor found that use of a phase plate having biaxial refractive index anisotropy enables the range of angles of propagation at which the conversion efficiency is high to be further widened. This will be described below in more detail.

Specifically, a biaxial phase plate of $0 < Nz = (n_x-n_z)/(n_x-n_y) < 1$, i.e., $n_x \neq n_z$ and $n_y \neq n_z$ will be described. FIGS. 19, 20, 21, 22, 23 and 24 show the calculation results of the efficiency (ratio) at which the second polarized light is converted into the first polarized light after passing through such a phase plate having biaxial refractive index anisotropy twice. The phase differences $(n_x-n_y) \cdot d$ of the phase plates shown in FIGS. 19 through 24 are as shown in Table 3.

TABLE 3

Figure 19:
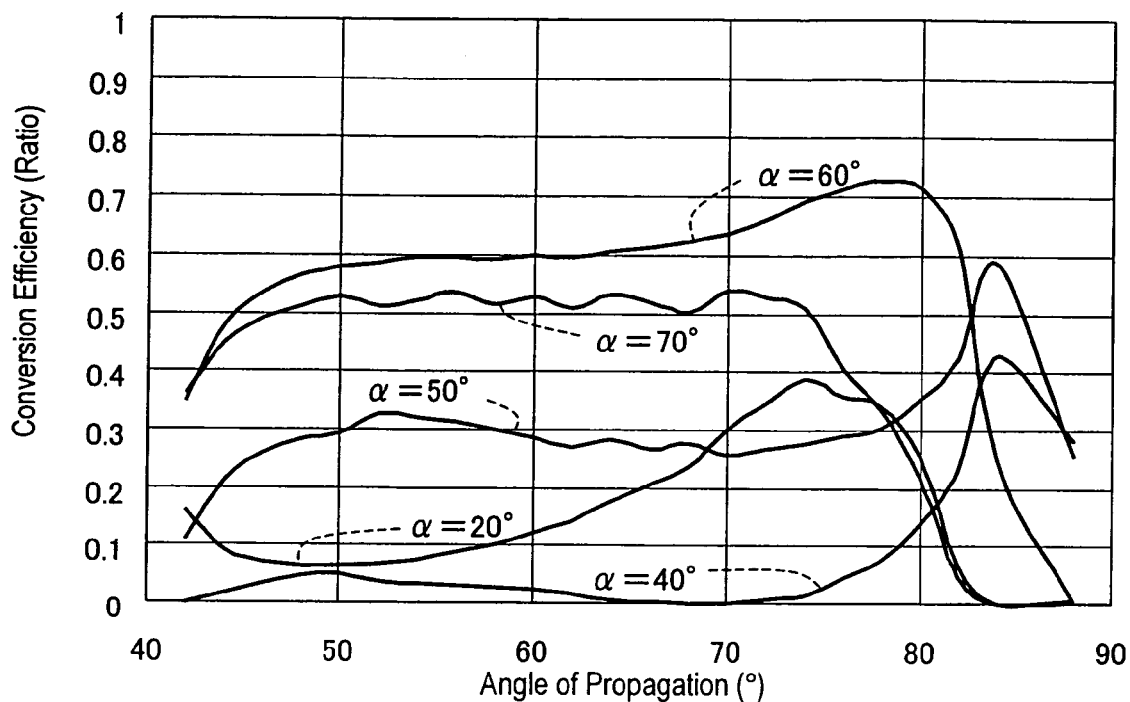
FIG. 19 is a graph showing the relationship between the conversion efficiency (ratio) into the first polarized light and the angle (°) of propagation when a λ/4 plate (Nz=0.5 and biaxial) for the light of λ=550 nm is used.
Figure 20:
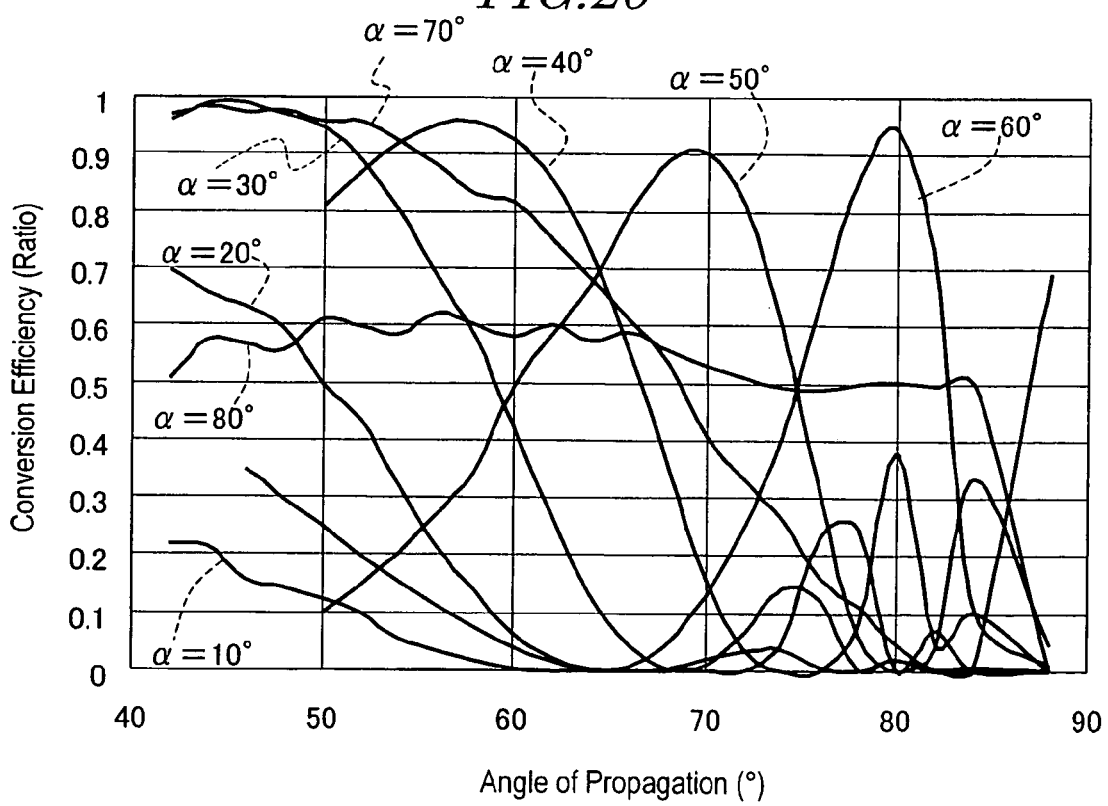
FIG. 20 is a graph showing the relationship between the conversion efficiency (ratio) into the first polarized light and the angle (°) of propagation when a λ/2 plate (Nz=0.9 and biaxial) for the light of λ=550 nm is used.
Figure 23:
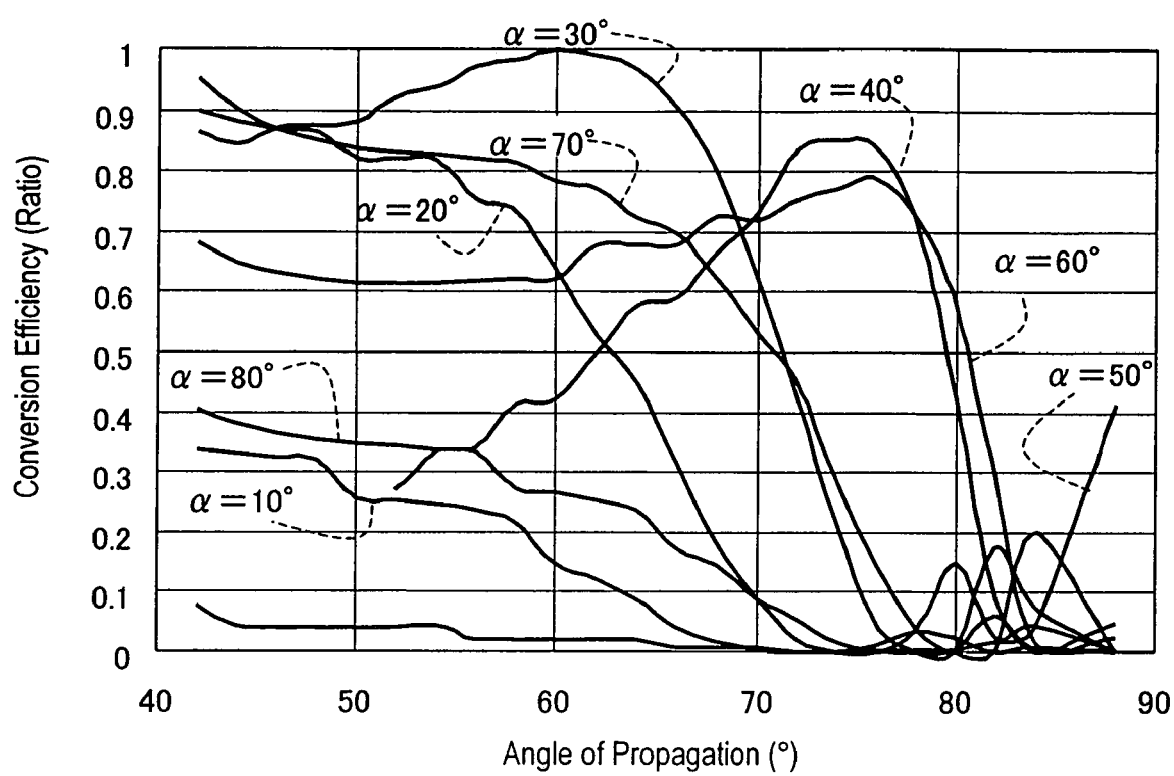
FIG. 23 is a graph showing the relationship between the conversion efficiency (ratio) into the first polarized light and the angle (°) of propagation when a λ/2 plate (Nz=0.6 and biaxial) for the light of λ=550 nm is used.

|  | Nz | $(n_x - n_y) \cdot d$ | Remarks |
|---|---|---|---|
| FIG. 19 | 0.5 | 137.5 nm | λ/4 plate for the light of λ = 550 nm |
| FIG. 20 | 0.9 | 275.0 nm | λ/2 plate for the light of λ = 550 nm |
| FIGS. 21(a), (b) | 0.8 | 275.0 nm | λ/2 plate for the light of λ = 550 nm |
| FIGS. 22(a), (b) | 0.7 | 275.0 nm | λ/2 plate for the light of λ = 550 nm |
| FIG. 23 | 0.6 | 275.0 nm | λ/2 plate for the light of λ = 550 nm |
| FIGS 24(a), (b) | 0.2 | 412.5 nm | 3λ/4 plate for the light of λ = 550 nm |

FIG. 19 is a graph showing the conversion efficiency of the light of λ=550 nm obtained when a λ/4 of Nz=0.5 was used as the phase plate. As can be seen from FIG. 19, use of the λ/4 plate of Nz=0.5 allows the second polarized light to be converted into the first polarized light, but the conversion efficiency is only about 70% at the maximum. According to the review of the present inventor, when a λ/4 plate of 0<Nz<1 was used, a conversion efficiency as high as 90% or greater could not be obtained in a wide range of angles of propagation.

FIG. 20 is a graph showing the conversion efficiency of the light of λ=550 nm obtained when a λ/2 of Nz=0.9 was used as the phase plate. As can be seen from FIG. 20, use of the λ/2 plate of Nz=0.9 allows the second polarized light to be converted into the first polarized light and the conversion efficiency is as high as 90% or greater depending on the angle of propagation, but the range of angles of propagation at which the conversion efficiency is high cannot be considered to be sufficiently wide.

Figure 21:
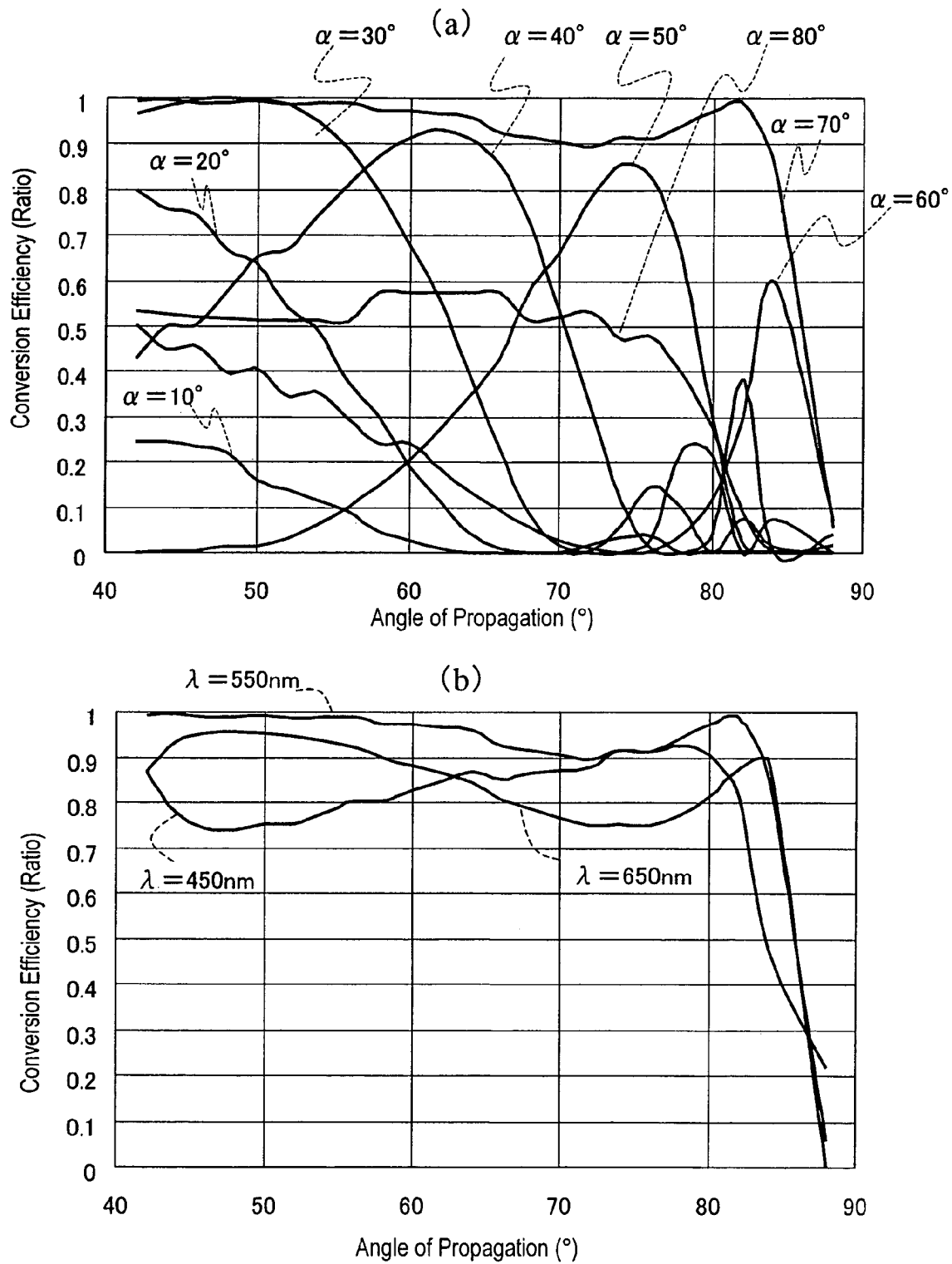
FIG. 21(a) is a graph showing the relationship between the conversion efficiency (ratio) into the first polarized light and the angle (°) of propagation, in the case where a λ/2 plate (Nz=0.8 and biaxial) for the light of λ=550 nm is used.
FIG. 21(b) is a graph showing the relationship between the conversion efficiency (ratio) and the angle (°) of propagation when the λ/2 plate is located to realize α=70°.

FIGS. 21(*a*) and (*b*) are graphs showing the results obtained when a λ/2 plate of Nz=0.8 was used as the phase plate. FIG. 21(*a*) shows the conversion efficiency of the light of λ=550 nm. As can be seen from FIG. 21(*a*), by locating the λ/2 plate of Nz=0.8 so as to realize, for example, α=70°, the second polarized light can be efficiently converted into the first polarized light, and the conversion efficiency is as high as 90% or greater in a wide range of angles of propagation of about 40° through 80°. FIG. 21(*b*) shows the conversion efficiency obtained when α=70°. As can be seen from FIG. 21(*b*), the conversion efficiency, obtained when the λ/2 plate of Nz=0.8 is located so as to realize α=70°, is generally constant in the wavelength range of the visible light.

FIGS. 22(*a*) and (*b*) are graphs showing the results obtained when a λ/2 plate of Nz=0.7 was used as the phase plate. FIG. 22(*a*) shows the conversion efficiency of the light of λ=550 nm. As can be seen from FIG. 22(*a*), by locating the λ/2 plate of Nz=0.7 so as to realize, for example, α=70°, the second polarized light can be efficiently converted into the first polarized light, and the conversion efficiency is as high as 90% or greater in a wide range of angles of propagation of about 40° through 70°. FIG. 22(*b*) shows the conversion efficiency obtained when α=70°. As can be seen from FIG. 22(*b*), the conversion efficiency of the second polarized light, obtained when the λ/2 plate of Nz=0.7 is located so as to realize α=70°, is generally constant in the wavelength range of the visible light.

FIG. 23 is a graph showing the conversion efficiency of the light of λ=550 nm obtained when a λ/2 of Nz=0.6 was used as the phase plate. As can be seen from FIG. 23, use of the λ/2 plate of Nz=0.6 allows the second polarized light to be converted into the first polarized light, and the conversion efficiency is as high as 90% or greater depending on the angle of propagation, but the range of angles of propagation at which the conversion efficiency is high cannot be considered to be sufficiently wide.

FIGS. 24(a) and (b) are graphs showing the results obtained when a 3λ/4 plate of Nz=0.2 was used as the phase plate. FIG. 24(a) shows the conversion efficiency of the light of λ=550 nm. As can be seen from FIG. 24(a), by locating the 3λ/4 plate of Nz=0.2 so as to realize, for example, α=20°, the second polarized light can be efficiently converted into the first polarized light, and the conversion efficiency is as high as 90% or greater in a wide range of angles of propagation of about 50° through 70°. However, as can be seen from FIG. 24(b), in the case where the 3λ/4 plate of Nz=0.2 is used, when α=200 for example, the conversion efficiency into the first polarized light drastically varies in the range of the visible light. As a result, the amount light which goes out from the outgoing surface 20c varies in accordance with the wavelength, and coloring may occur.

The present inventor reviewed the above-described results in detail. In a consequence, the following was found: when the phase plate has biaxial refractive index anisotropy, the second polarized light can be efficiently converted into the first polarized light in a wide range of angles (a wide range of angles of propagation) in the case where the refractive index $n_x$ in the direction of the slow axis of the phase plate, the refractive index $n_y$ in the direction of the fast axis of the phase plate, the refractive index $n_z$ in the thickness direction of the phase plate, the thickness d of the phase plate, the wavelength λ of the visible light, and the angle α made by the polarization direction P of the first polarized light and the slow axis of the phase plate fulfill the following relationship (5).

$0.6<(n_x-n_z)/(n_x-n_y)<0.9$;

$\lambda/4<(n_x-n_y)\cdot d<3\lambda/4$;

$60°<\alpha<80°$ (5).

Especially when the following relationship (6) is fulfilled, the efficiency at which the second polarized light is converted into the first polarized light does not vary almost at all in the wavelength range of the visible light regardless of the wavelength, and thus the occurrence of coloring is suppressed.

$0.6<(n_x-n_z)/(n_x-n_y)<0.9$;

$(n_x-n_y)\cdot d=\lambda/2$ $60°<\alpha<80°$ (6).

In this embodiment, the polarization conversion layer 24 as the phase plate is located closer to the counter surface 20d than the polarization selection layer 22. The present invention is not limited to this, and the polarization conversion layer 24 may be located closer to the outgoing surface 20c than the polarization selection layer 22.

When the polarization conversion layer 24 is a phase plate as in this embodiment, the slow axis of the polarization conversion layer 24 is generally the same in a plane parallel to the outgoing surface 20c. Therefore, where the polarization conversion layer 24 (phase plate) is located closer to the outgoing surface than the polarization selection layer 22, the polarization state (for example, the polarization direction) of the first polarized light which is directed toward the outgoing surface 20c by the polarization selection layer 22 can be controlled by the phase plate, so that the first polarized light goes out from the outgoing surface 20c.

Embodiment 3

Figure 25:
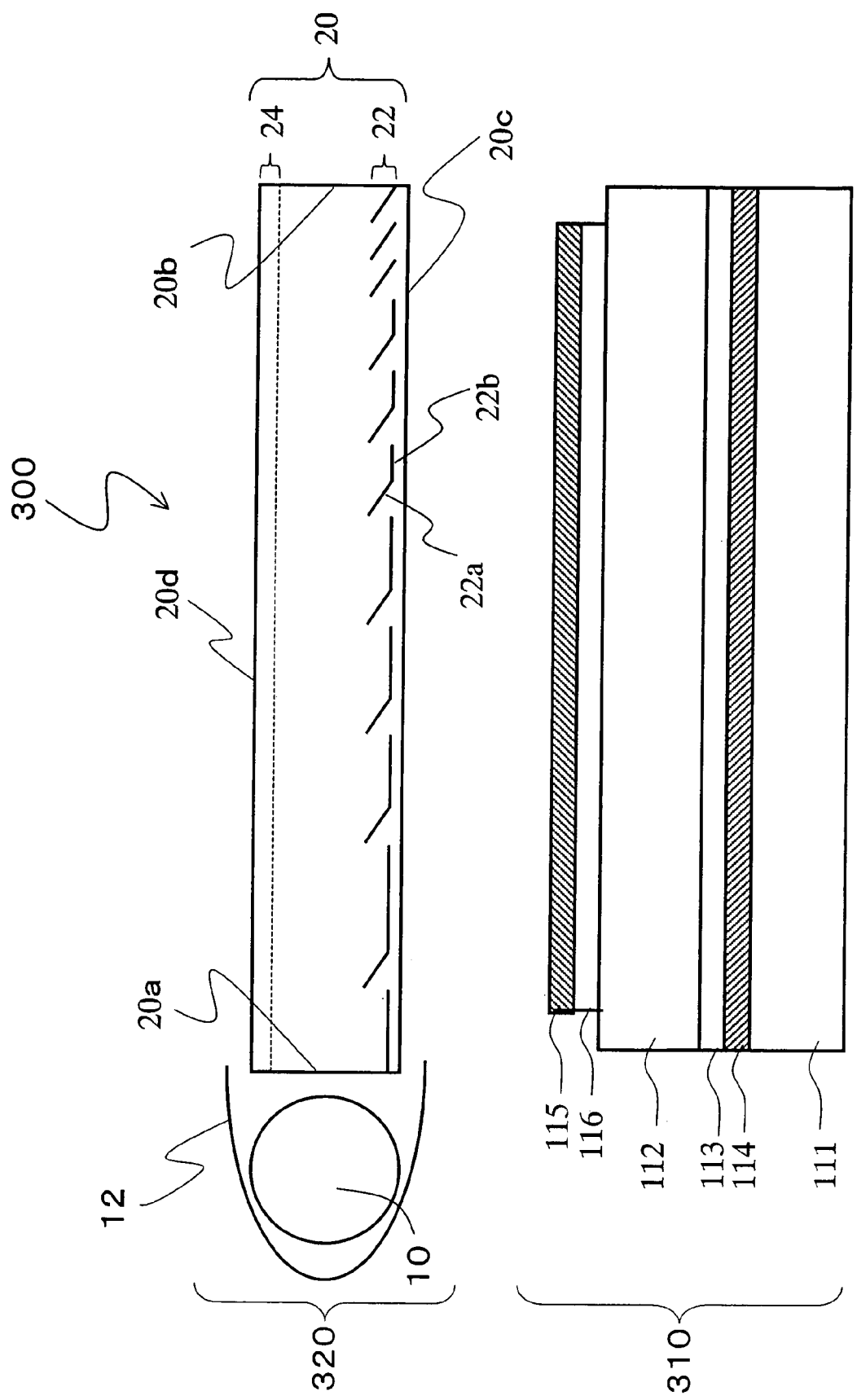
FIG. 25 is a cross-sectional view schematically showing an illumination device 320 in Embodiment 3 according to the present invention and a liquid crystal display (image display apparatus) 300 including the same.

With reference to FIG. 25, a structure of an illumination device 320 in an embodiment according to the present invention and a structure of a liquid crystal display (image display apparatus) 300 including the same will be described.

As shown in FIG. 25, the liquid crystal display 300 is a reflection type liquid crystal display including a reflection type liquid crystal display panel 310 and the illumination device (front light) 320.

The reflection type liquid crystal display panel 310 is a known reflection type liquid crystal display panel, and has, for example, the same structure as that of the reflection type liquid crystal display panel 110 of the liquid crystal display 100 in Embodiment 1.

The lightguide element 20 of the illumination device 320 includes the polarization selection layer 22 located in the vicinity of the outgoing surface 20c and the polarization conversion layer 24 located on the counter surface 20d side of the lightguide element 20. In this embodiment, the polarization conversion layer 24 is a phase plate.

The polarization selection layer 22 includes dielectric films 22a inclining at a predetermined angle with respect to the outgoing surface 20c (hereinafter, the dielectric films 22a will also be referred to as "inclining dielectric films 22a") and dielectric films 22b generally parallel to the outgoing surface 20c (hereinafter, the dielectric films 22b will also be referred to as "parallel dielectric films 22b").

The inclining dielectric films 22a are arranged relatively sparsely in the vicinity of the incidence surface (first side surface) 20a, and are arranged relatively densely in the vicinity of the second side surface 20b. Namely, the inclining dielectric films 22a are arranged increasingly densely as becoming farther from the incidence surface 20a.

By contrast, the parallel dielectric films 22b are arranged relatively densely in the vicinity of the incidence surface (first side surface) 20a, and are arranged relatively sparsely in the vicinity of the second side surface 20b. Namely, the parallel dielectric films 22b are arranged increasingly sparsely as becoming farther from the incidence surface 20a.

The parallel dielectric films 22b and the inclining dielectric films 22a are located in this order from the outgoing surface 20c. Namely, the parallel dielectric films 22b are located closer to the outgoing surface 20c than the inclining dielectric films 22a. Accordingly, the inclining dielectric films 22a and the parallel dielectric films 22b included in the parallel selection layer 22, and the polarization conversion layer 24 are located in the order of the parallel dielectric films 22b, the inclining dielectric films 22a and the polarization conversion layer 24 from the outgoing surface 20c.

Figure 26:
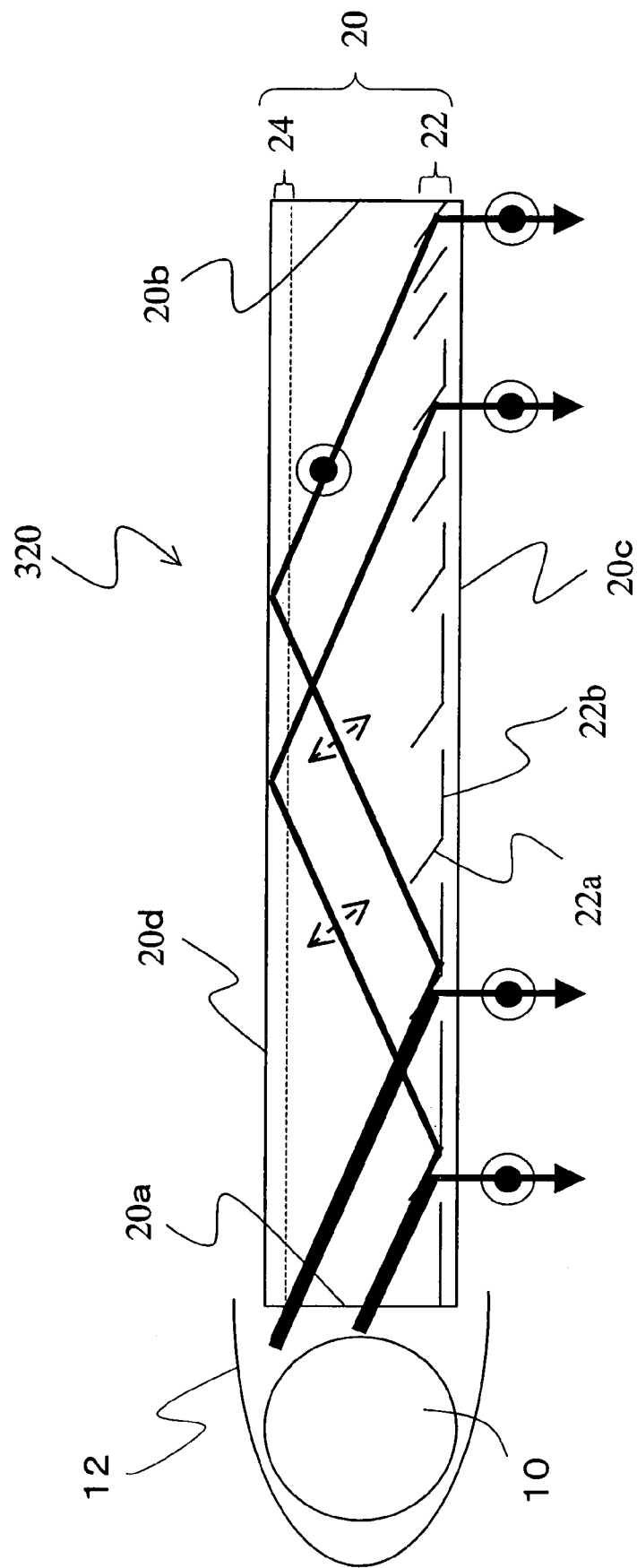
FIG. 26 is a cross-sectional view schematically showing the manner in which light is propagated in a lightguide element 20 of the illumination device 320.

With reference to FIG. 26, the manner in which light is propagated in the lightguide element 20 will be described.

Light emitted from the light source 10 is incident on the inside of the lightguide element 20 via the first side surface 20a and is propagated toward the second side surface 20b. Among the light propagated toward the second side surface 20b, first polarized light vibrating in a direction perpendicular to the direction in which the dielectric films 22a are repeated (in this embodiment, the dielectric films 22a are repeated in a direction normal to the incident surface 20a) is reflected toward the outgoing surface 20c by the inclining dielectric films 22a included in the polarization selection layer 22, and goes out from the outgoing surface 20c.

Among the light propagated toward the second side surface 20b, second polarized light polarized in a direction perpendicular to that of the first polarized light is converted into the first polarized light by the polarization conversion layer 24, and then is reflected toward the outgoing surface 20c by the polarization selection layer 22 and goes out from the outgoing surface 20c.

A part of the light propagated toward the second side surface 20b is reflected toward the counter surface 20d by the parallel dielectric films 22b but is mostly incident on the counter surface 20d at an angle equal to or greater than a critical angle (i.e., at an angle which does not fulfill the total reflection condition). Therefore, such light does not go out from the counter surface 20d.

As described above, in the illumination device 320 in this embodiment also, the lightguide element 20 includes the polarization selection layer 22 for causing the first polarized light to selectively go out from the outgoing surface 20c and the polarization conversion layer 24 for converting the second polarized light, polarized in a different direction from that of the first polarized light, into the first polarized light. Consequently, the light incident on the inside of the lightguide element 20 via the incidence surface 20a from the light source 10 can be caused to go out efficiently as light of a specific polarization direction. Therefore, the light utilization efficiency is improved.

In the illumination device 320, the polarization conversion layer 24 is a phase plate, and thus the slow axis thereof is generally uniform (the same) in a plane parallel to the outgoing surface 20c. Therefore, the efficiency at which the second polarized light is converted into the first polarized light is generally uniform in a plane parallel to the outgoing surface 20c. This provides an advantage that it is easy to design the illumination device such that the first polarized light uniformly goes out from the outgoing surface 20c.

Figure 27:
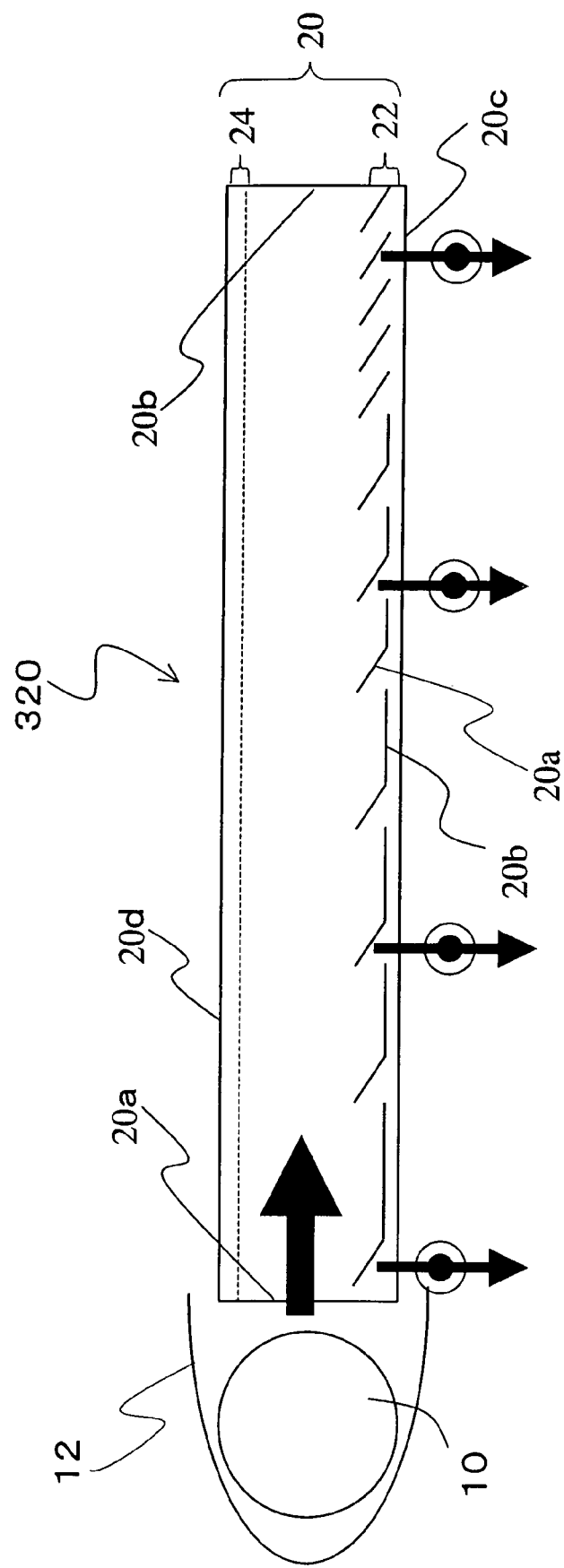

Also in the illumination device 320, the inclining dielectric films 22a included in the polarization selection layer 22 are arranged increasingly densely as becoming farther from the incidence surface 20a (i.e., as becoming farther from the light source 10). As shown in FIG. 27, this can further enhance the uniformity of the strength of the first polarized light going out from the outgoing surface 20c.

Figure 28:
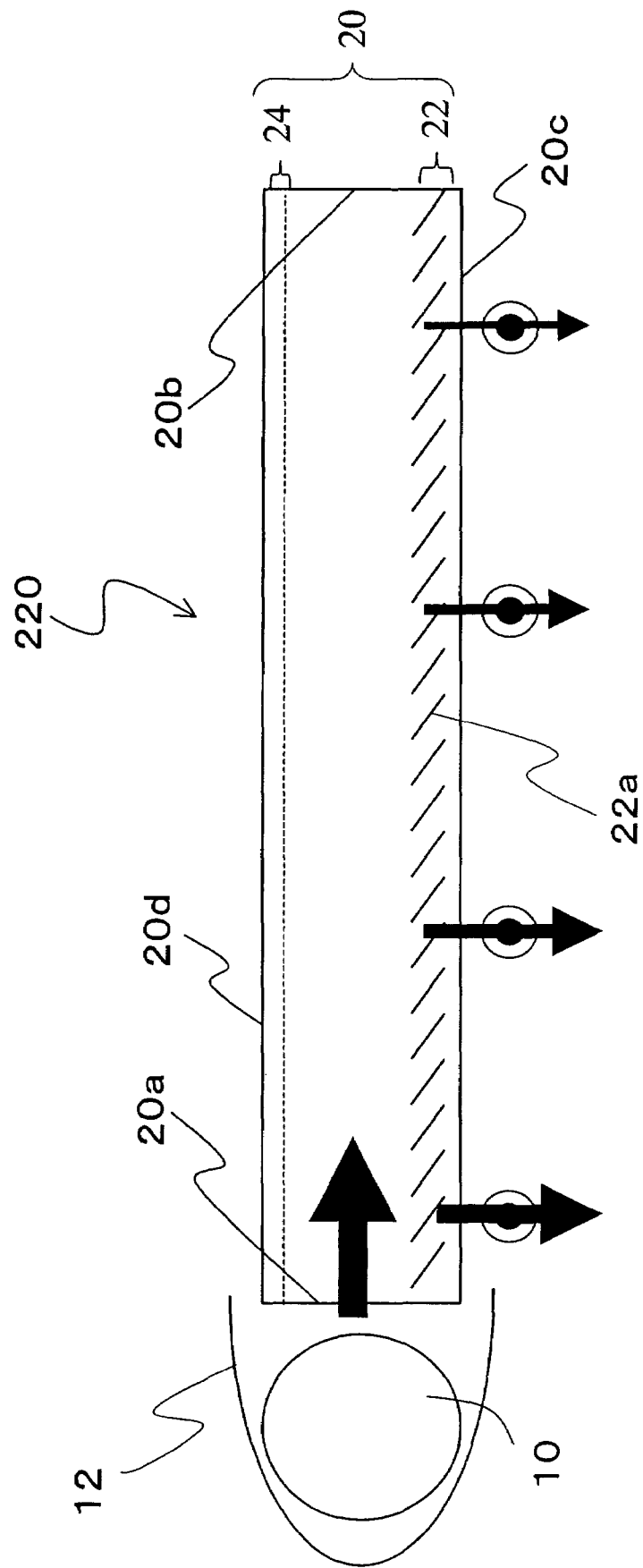
FIG. 28 is a cross-sectional view schematically showing the manner in which light goes out from an outgoing surface 20c in a lightguide element 20 in which dielectric films 22a are arranged uniformly.

By contrast, in the illumination device 220 shown in FIG. 5 (or in the illumination device 120 shown in FIG. 1), the dielectric films 22a inclining at a predetermined angle with respect to the outgoing surface 20c are formed at a uniform rate regardless of the distance from the incidence surface 20a. Therefore, as shown in FIG. 28, an excessive amount of first polarized light may possibly go out in the vicinity of the incidence angle 20a, and the amount of the first polarized light may possibly decrease as becoming farther from the incidence angle 20a. This may reduce the uniformity of the strength of the light going out from the outgoing surface 20c.

The illumination device 320 in this embodiment can be produced, for example, as follows.

First, as shown in FIG. 29(a), a prism sheet 25 having a thickness of 1.0 mm is formed of isotropic polymethylmethacrylate having a refractive index of 1.49. The prism sheet 25 has a main surface (front surface) 25a having a sawtooth-like cross section and a generally flat rear surface 25b. The main surface 25a has a plurality of inclining surfaces (inclining areas) 25a1 inclining with respect to the rear surface 25b, a plurality of vertical surfaces (vertical areas) 25a2 which are generally vertical to the rear surface 25b, and a plurality of parallel surfaces (parallel areas) 25a3 which are generally parallel to the rear surface 25b. The plurality of inclining surfaces 25a1 are arranged increasingly densely as becoming farther from one end and closer to the other end of the prism sheet 25 (as becoming farther from the side surface which will act as the incidence surface 20a later).

Next, as shown in FIG. 29(b), $TiO_2$ having a refractive index of 2.3 is vapor-deposited on the inclining surfaces 25a1 of the main surface 25a of the prism sheet 25 to a thickness of 65 nm, thereby forming dielectric films (dielectric thin films) 22a. At this stage, the dielectric films 22b are also formed on the parallel surfaces 25a3 of the main surface 25 of the prism sheet 25. In FIG. 29(b), the arrows schematically show the manner in which the dielectric material ($TiO_2$ in this embodiment) is vapor-deposited.

Then, as shown in FIG. 29(c), the main surface 25a of the prism sheet 25 is flattened by a transparent resin 29 formed of a transparent resin material having a refractive index of 1.49, and a monoaxial $\lambda/2$ plate (produced by Nitto Denko Co., Ltd.) 28 formed of ARTON (registered trademark) having a refractive index of 1.51 is bonded to the rear surface 25b of the prism sheet 25. In this manner, the lightguide element 30 including the polarization selection layer 22 and the polarization conversion layer 24 is obtained.

After that, the light source (for example, a cathode ray tube) 10 is located on the incidence surface 20a side of the lightguide element 20, and a reflection member (for example, a reflection film) 12 is located so as to surround the light source 10. Thus, the illumination device 320 shown in FIGS. 25 and 26 is completed.

As described above, the illumination device 320 is obtained by constructing the lightguide element 20 so as to include a first member (prism sheet 25) having the main surface 25a which includes the plurality of inclining surfaces 25a1 and the plurality of parallel surfaces 25a3 and include a second member (transparent resin layer 29) provided on the main surface 25a for flattening the main surface 25a, and by forming the dielectric films 22a on the plurality of inclining surfaces 25a1. By arranging the plurality of parallel surfaces 25a3 increasingly sparsely as becoming farther from the incidence surface 20a, the plurality of inclining surfaces 25a1 can be arranged increasingly densely as becoming farther from the incidence surface 20a. Thus, a structure in which the inclining dielectric films 22a are arranged increasingly densely as becoming farther from the incidence surface 20a can be easily realized. Even when a production process of letting the dielectric films 22b be also formed on the parallel surfaces 25a3 is adopted, the light utilization efficiency and the display quality are not deteriorated because the parallel dielectric films 22b formed on the parallel surfaces 25a3 do not reflect the light propagated in the lightguide element 20 toward the counter surface 20d at such an angle that the light goes out from the counter surface 20d.

In this embodiment, the polarization selection layer 22 is located in the vicinity of the outgoing surface 20c and the polarization conversion layer 24 is located on the counter surface 20d side of the lightguide element 20. The locations of the polarization selection layer 22 and the polarization conversion layer 24 are not limited to this. For example, the polarization selection layer 22 may be located in the vicinity of the counter surface 20d, and the polarization conversion layer 24 may be located on the outgoing surface 20c side of the lightguide element 20.

Figure 30:
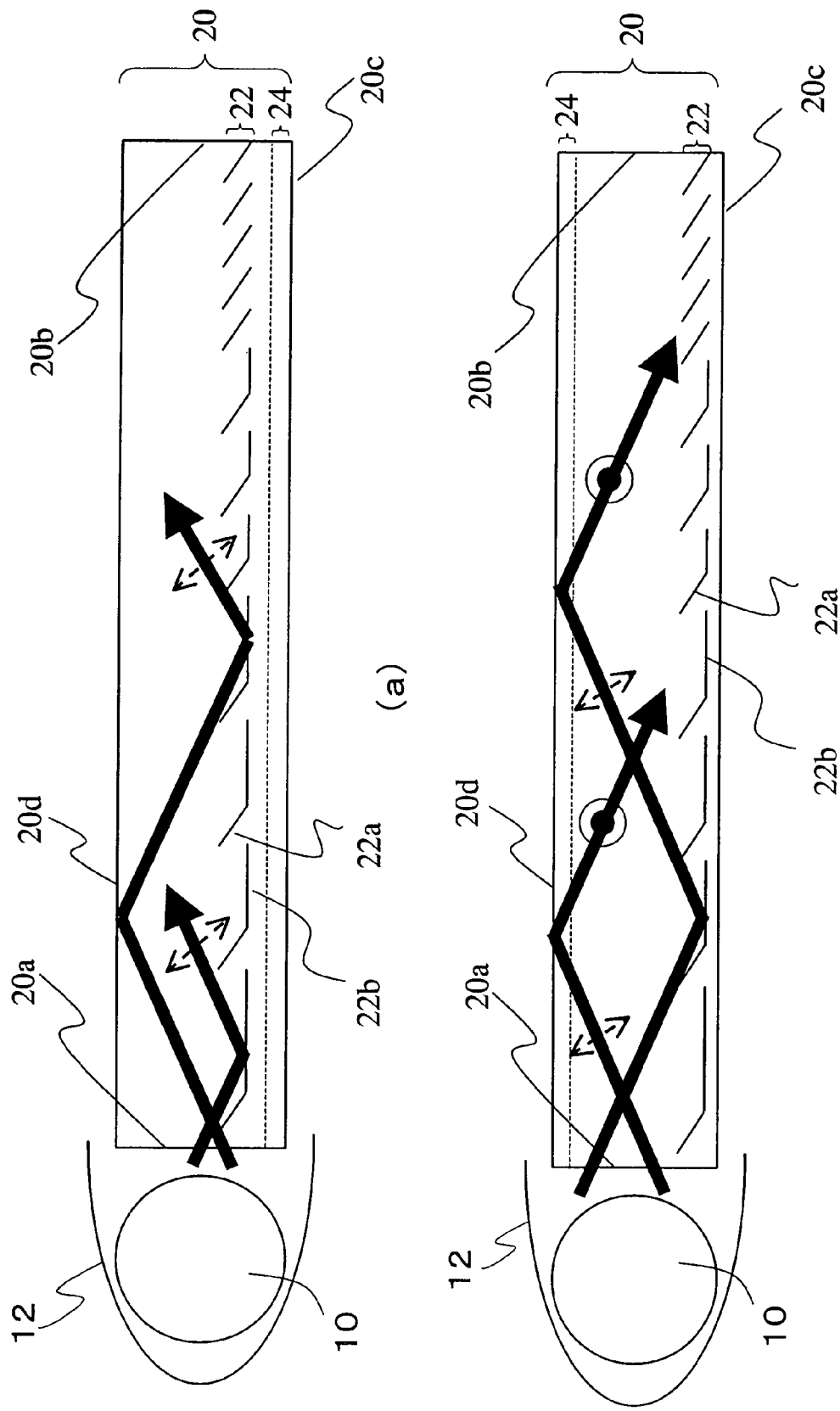
FIGS. 30(a) and 30(b) are cross-sectional views showing the manner in which a polarization selection layer 22 and a polarization conversion layer 24 are located.

However, when the polarization selection layer 22 is located in the vicinity of the outgoing surface 20c, it is preferable to locate, as shown in FIG. 30(b), the polarization selection layer 22 closer to the outgoing surface 20c than the polarization conversion layer 24, rather than locating, as shown in FIG. 30(a), the polarization conversion layer 24 closer to the outgoing surface 20c than the polarization selection layer 22.

The lightguide element 20 in this embodiment includes the dielectric films 22b generally parallel to the outgoing surface 20c in addition to the dielectric films 22a inclining with respect to the outgoing surface 20c. Therefore, a part of the light propagated in the lightguide element 20 is incident on the parallel dielectric films 22b at a large angle exceeding the Brewster angle, and the second polarized light is undesirably reflected by the parallel dielectric films 22b.

Therefore, when the polarization conversion layer 24 is located closer to the outgoing surface 20c than the polarization selection layer 22 as shown in FIG. 30(a), the second polarized light is unlikely to reach the polarization conversion layer 24, which decreases the conversion efficiency into the first polarized light. By contrast, when the polarization selection layer 22 is located closer to the outgoing surface 20c than the polarization conversion layer 24 as shown in FIG. 30(b), the incidence of the second polarized light on the polarization conversion layer 24 is not prevented by the parallel dielectric films 22b. As a result, the second polarized light can be preferably converted into the first polarized light.

Figure 31:
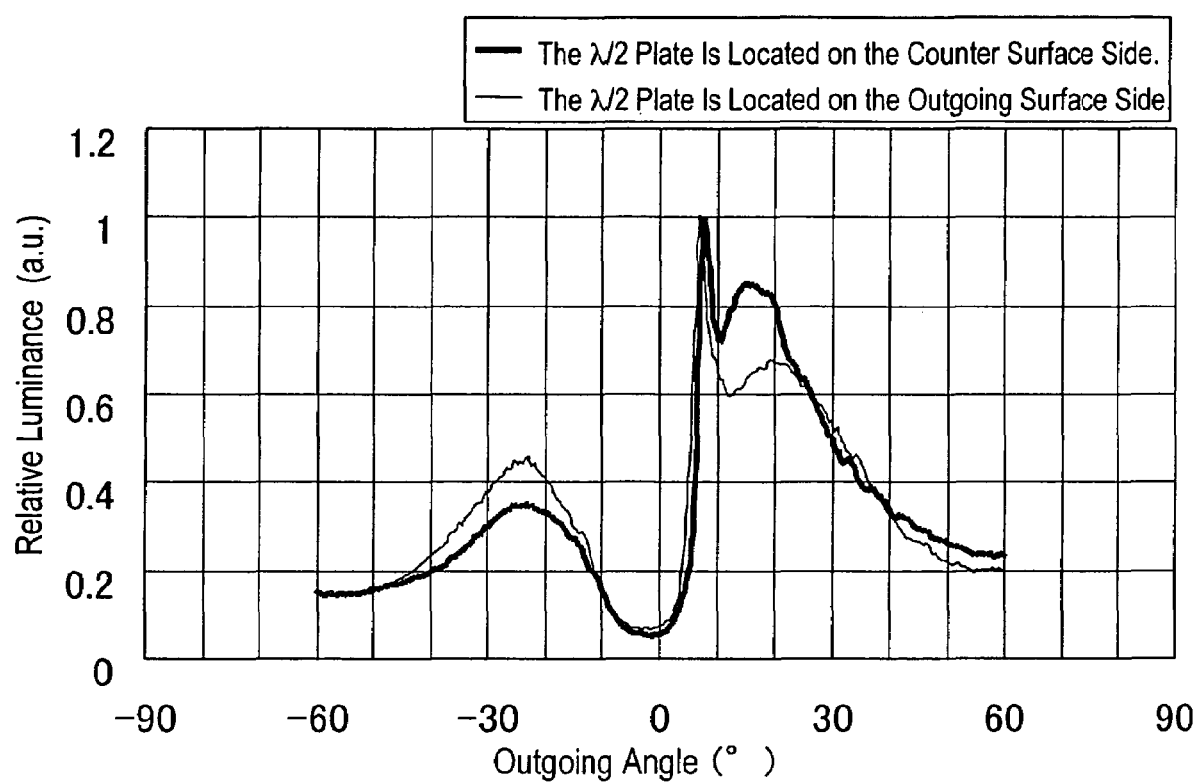
FIG. 31 is a graph showing the relationship between the outgoing angle (°) of the light from an outgoing surface 20c and the relative luminance (arbitrary unit; a.u.) in the illumination device 320 in Embodiment 3.
Figure 32:
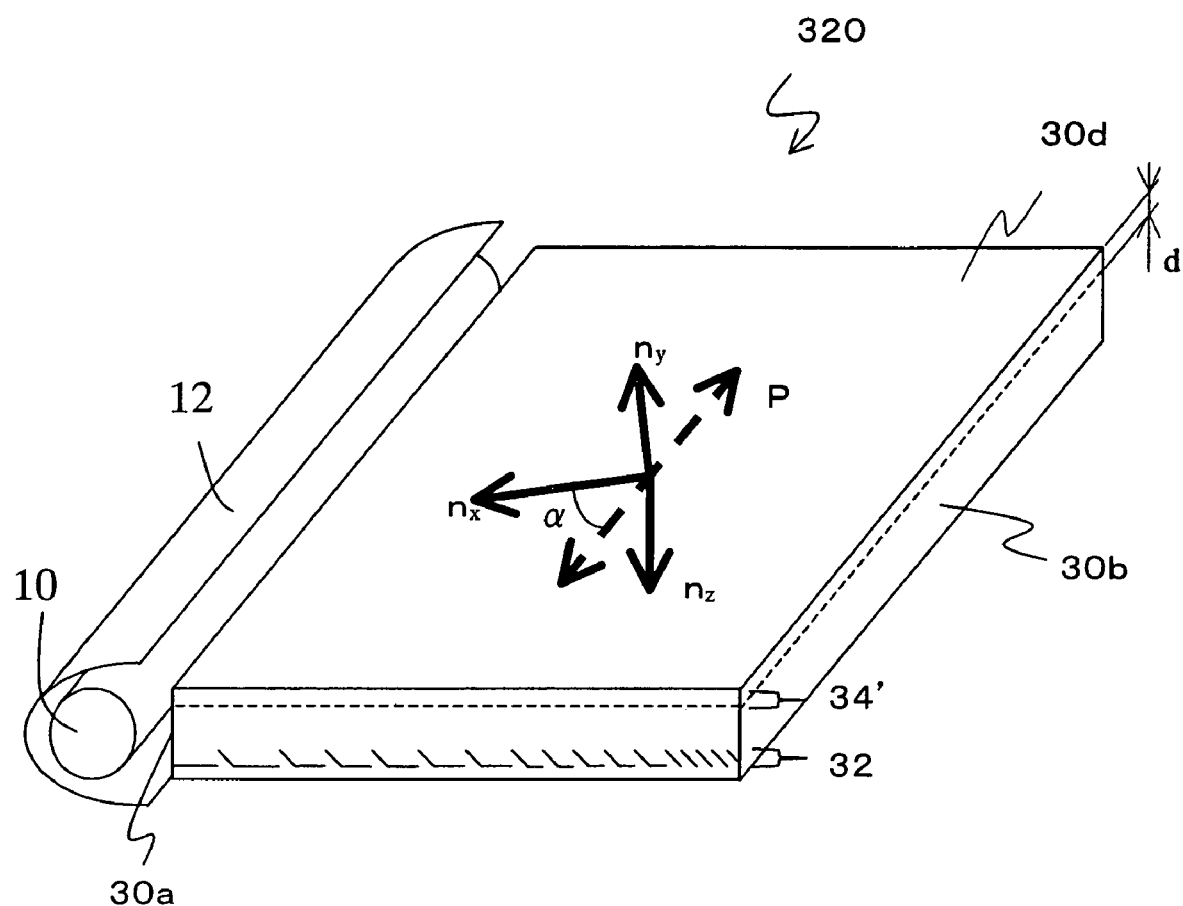
FIG. 32 is an isometric view schematically showing the relationship, in the illumination device 320, among the refractive index $n_x$ in the direction of the slow axis of a phase plate, the refractive index $n_y$ in the direction of the fast axis of the phase plate, the refractive index $n_z$ in the thickness direction of the phase plate, the thickness d of the phase plate, and the angle α made by the polarization direction P of first polarized light and the slow axis of the phase plate.

FIG. 31 shows the relationship between the outgoing angle (°) of the light from the outgoing surface 20c and the relative luminance (arbitrary unit; a.u.) in the illumination device 320 in which the λ/2 plate 28 as the polarization conversion layer 24 is located on the counter surface 20d side of the lightguide element 20 (the structure shown in FIG. 30(b)). FIG. 31 shows the luminance of the illumination device 320 produced as described above with reference to FIG. 29. FIG. 31 shows the luminance in the case where the following relationship is fulfilled by the following factors shown in FIG. 32: the refractive index $n_x$ in the direction of the slow axis of the λ/2 plate 28, the refractive index $n_y$ in the direction of the fast axis of the λ/2 plate 28, the refractive index $n_z$ in the thickness direction of the λ/2 plate 28, the thickness d of the λ/2 plate 28, the wavelength λ of the visible light (not shown), and the angle α made by the polarization direction P of the first polarized light and the slow axis of the λ/2 plate 28.

$(n_x-n_y)\cdot d=270$ nm;

$(n_x-n_z)/(n_x-n_y)=1.0$; and a=70°.

For the purpose of comparison, FIG. 31 also shows the luminance of an illumination device in which the λ/2 plate (phase plate) 28 is located on the outgoing surface 20c side of the lightguide element 20 (the structure shown in FIG. 30(a)).

As can be seen from FIG. 31, the illumination device having the polarization conversion layer 24 on the counter surface 20d side of the lightguide element 20 provides a higher luminance of the outgoing light than the illumination device having the polarization conversion layer 24 on the outgoing surface 20c side of the lightguide element 20. In other words, the efficiency at which the second polarized light is converted into the first polarized light varies in accordance with the location of the polarization conversion layer 24. This is why when the polarization selection layer 22 including the parallel dielectric films 22b is located in the vicinity of the outgoing surface 20c, it is preferable to locate the polarization selection layer 22 closer to the outgoing surface 20c than the polarization conversion layer 24 as shown in FIG. 30(b).

For the same reason, when the polarization selection layer 22 is located in the vicinity of the counter surface 20c, it is preferable to locate, as shown in FIG. 33(b), the polarization selection layer 22 closer to the counter surface 20d than the polarization conversion layer 24, rather than locating, as shown in FIG. 33(a), the polarization conversion layer 24 closer to the counter surface 20d than the polarization selection layer 22.

When the polarization conversion layer 24 is located closer to the counter surface 20d than the polarization selection layer 22 as shown in FIG. 33(a), the second polarized light is reflected by the parallel dielectric films 22b and thus is unlikely to reach the polarization conversion layer 24, which decreases the conversion efficiency into the first polarized light. By contrast, when the polarization selection layer 22 is located closer to the counter surface 20d than the polarization conversion layer 24 as shown in FIG. 33(b), the incidence of the second polarized light on the polarization conversion layer 24 is not prevented by the parallel dielectric films 22b. As a result, the second polarized light can be preferably converted into the first polarized light.

Figure 34:
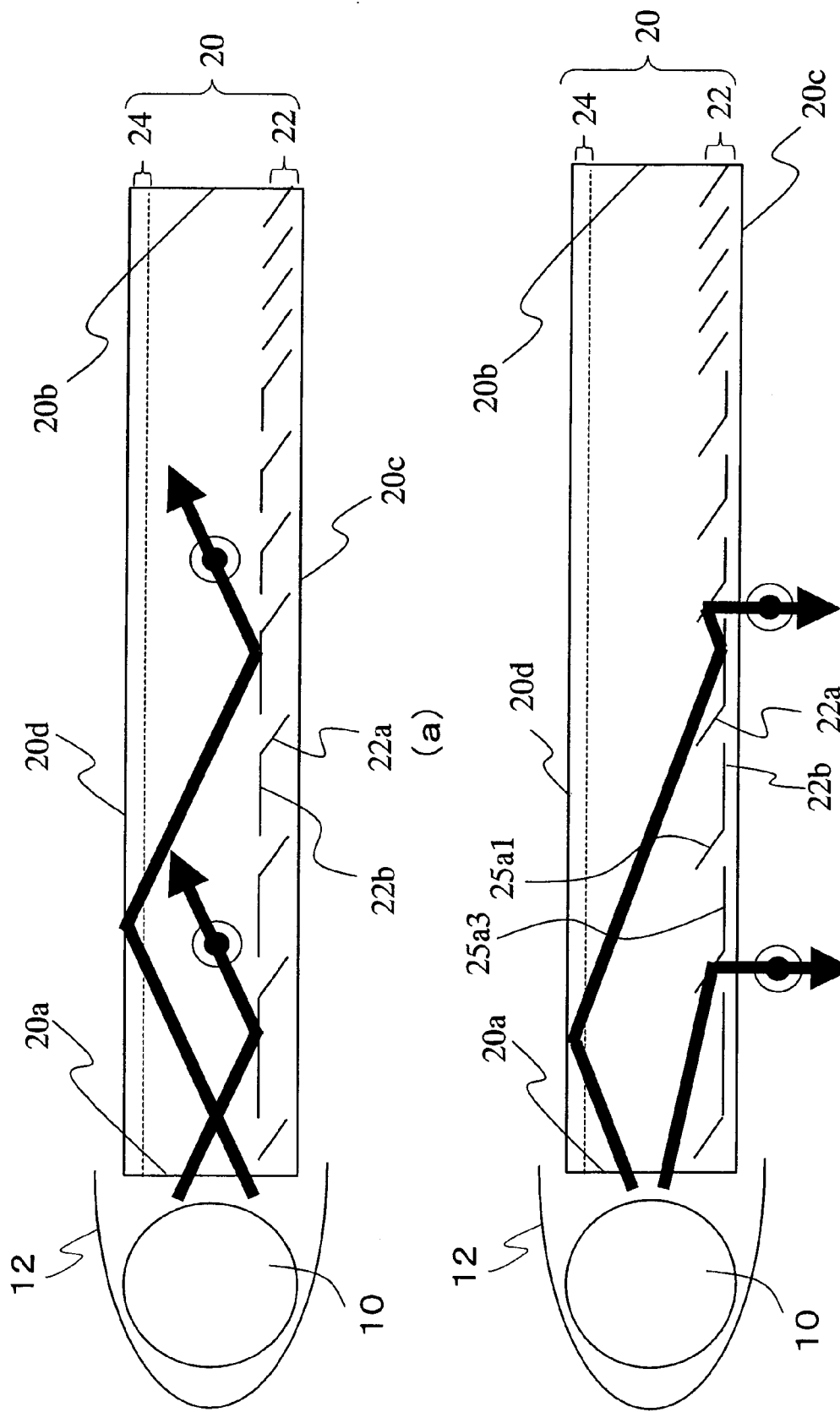
FIGS. 34(a) and 34(b) are cross-sectional views showing the manner in which inclining dielectric films 22a and parallel dielectric films 22b are located.

When the polarization selection layer 22 is located in the vicinity of the outgoing surface 20c and closer to the outgoing surface 20c than the polarization conversion layer 24, it is preferable to locate, as shown in FIG. 34(b), the parallel dielectric films 22b closer to the outgoing surface 20c than the inclining dielectric films 22a, i.e., to locate the parallel surfaces 25a3 of the prism sheet 25 closer to the outgoing surface 20c than the inclining surfaces 25a1, rather than locating, as shown in FIG. 34(a), the parallel dielectric films 22b closer to the counter surface 20d than the inclining dielectric films 22a.

When the parallel dielectric films 22b are located closer to the counter surface 20d than the inclining dielectric films 22a as shown in FIG. 34(a), a part of the light propagated in the lightguide element 20 is reflected by the parallel dielectric films 22b and thus the light is unlikely to reach the inclining dielectric films 22a. As a result, the first polarized light is unlikely to go out from the outgoing surface 20c. By contrast, when the parallel dielectric films 22b are located closer to the outgoing surface 20c than the inclining dielectric films 22a as shown in FIG. 34(b), the light propagated in the lightguide element 20 reaches the inclining dielectric films 22a directly or after being reflected by the parallel dielectric films 22b. Therefore, the light is not prevented by the parallel dielectric films 22b from reaching the inclining dielectric films 22a. As a result, the first polarized light can preferably go out from the outgoing surface 20c.

Figure 35:
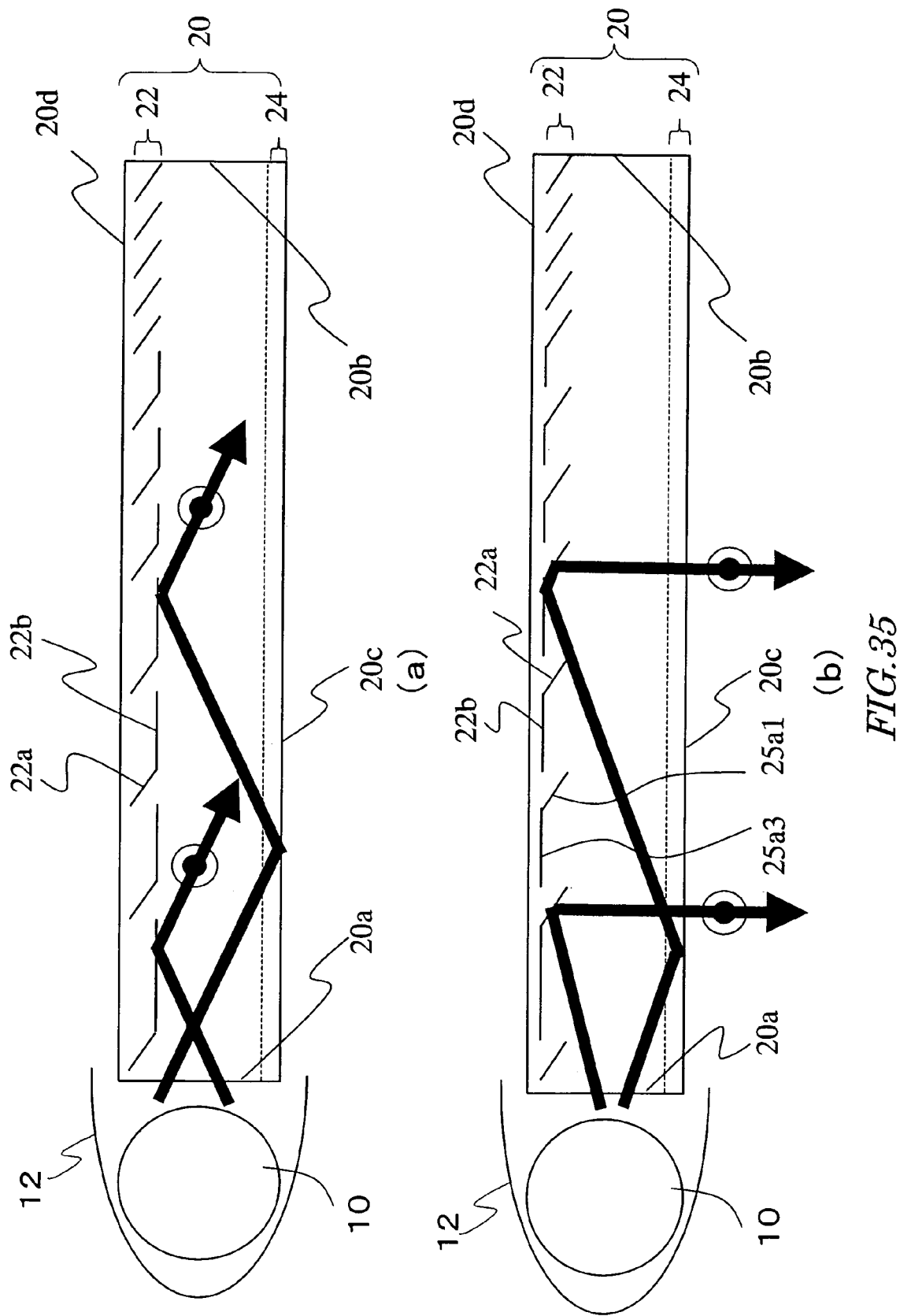
FIGS. 35(a) and 35(b) are cross-sectional views showing the manner in which inclining dielectric films 22a and parallel dielectric films 22b are located.

For substantially the same reason, when the polarization selection layer 22 is located in the vicinity of the counter surface 20d and closer to the counter surface 20d than the polarization conversion layer 24, it is preferable to locate, as shown in FIG. 35(b), the parallel dielectric films 22b closer to the counter surface 20d than the inclining dielectric films 22a, i.e., to locate the parallel surfaces 25a3 of the prism sheet 25 closer to the counter surface 20d than the inclining surfaces 25a1, rather than locating, as shown in FIG. 35(a), the parallel dielectric films 22b closer to the outgoing surface 20d than the inclining dielectric films 22a.

When the parallel dielectric films 22b are located closer to the outgoing surface 20c than the inclining dielectric films 22a as shown in FIG. 35(a), a part of the light propagated in the lightguide element 20 is reflected by the parallel dielectric films 22b and thus the light is unlikely to reach the inclining dielectric films 22a. As a result, the first polarized light is unlikely to go out from the outgoing surface 20c. By contrast, when the parallel dielectric films 22b are located closer to the counter surface 20d than the inclining dielectric films 22a as shown in FIG. 35(b), the light propagated in the lightguide element 20 reaches the inclining dielectric films 22a directly or after being reflected by the parallel dielectric films 22b.

Therefore, the light is not prevented by the parallel dielectric films 22b from reaching the inclining dielectric films 22a. As a result, the first polarized light can preferably go out from the outgoing surface 20c.

In Embodiments 1 through 3 described above, the reflection type liquid crystal displays 100, 200 and 300 respectively including the illumination devices 120, 220 and 320 as the front lights are described. The present invention is not limited to this, and is also preferably applicable to a transmission type liquid crystal display including an illumination device as a backlight.

Embodiment 4

Figure 36:
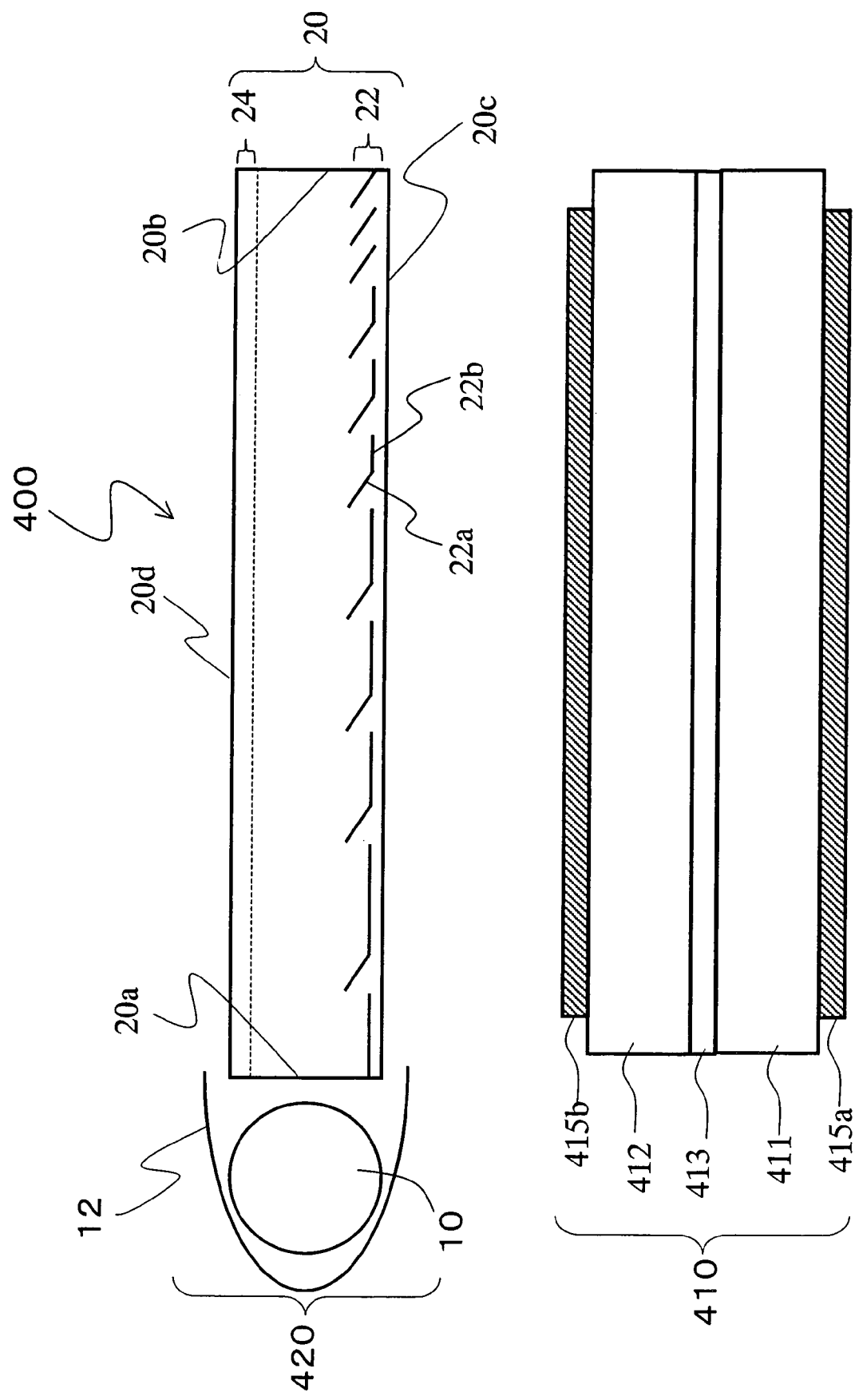
FIG. 36 is a cross-sectional view schematically showing an illumination device 420 in Embodiment 4 according to the present invention and a liquid crystal display (image display apparatus) 400 including the same.

With reference to FIG. 36, a structure of an illumination device 420 in an embodiment according to the present invention and a structure of a liquid crystal display (image display apparatus) 400 including the same will be described.

As shown in FIG. 36, the liquid crystal display 400 is a transmission type liquid crystal display including a transmission type liquid crystal display panel 410 and the illumination device (backlight) 420.

The transmission type liquid crystal display panel 410 is a known transmission type liquid crystal display panel, and includes a pair of substrates (for example, glass substrates) 411 and 412 and a liquid crystal layer 413 provided therebetween. A transmission electrode (not shown) is provided on the liquid crystal layer 413 side of each of the substrates 411 and 412. Polarizers (typically, polarization plates) 415a and 415b are provided on the viewer side of the substrate 411 and the illumination device 420 side of the substrate 412, respectively.

The illumination device 420 has substantially the same structure as that of the illumination device 320 shown in FIGS. 25 and 26, but is different therefrom in that in the illumination device 420, the polarization conversion layer 24 included in the lightguide element 20 is a biaxial λ/2 plate. Namely, in the production process shown in FIG. 29, a biaxial λ/2 plate 28 formed of ARTON (registered trademark) having a refractive index of 1.51 is bonded to the rear surface 25b of the prism sheet 25.

Figure 37:
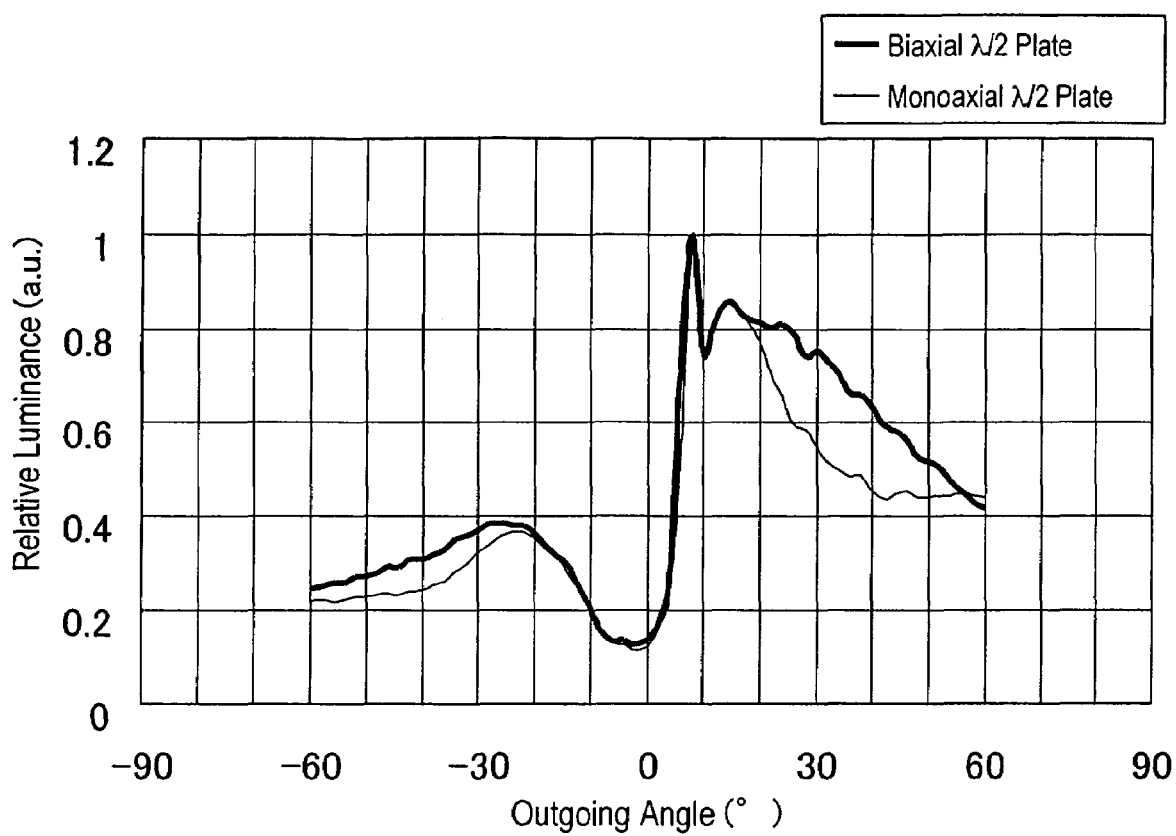
FIG. 37 is a graph showing the relationship between the outgoing angle (°) of the light from an outgoing surface 20c and the relative luminance (arbitrary unit; a.u.) in the illumination device 420 in Embodiment 4.
Figure 38:
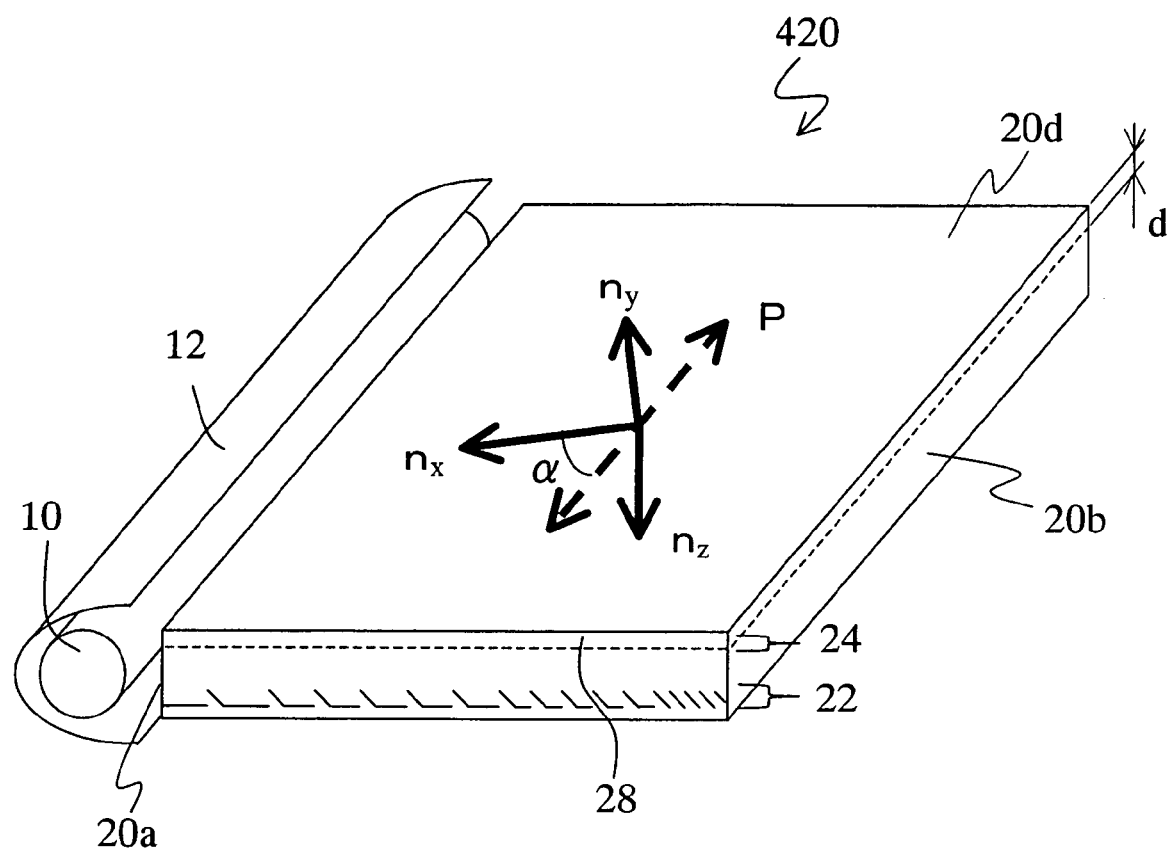
FIG. 38 is an isometric view schematically showing the relationship, in the illumination device 420, among the refractive index $n_x$ in the direction of the slow axis of a phase plate, the refractive index $n_y$ in the direction of the fast axis of the phase plate, the refractive index $n_z$ in the thickness direction of the phase plate, the thickness d of the phase plate, and the angle α made by the polarization direction P of first polarized light and the slow axis of the phase plate.

FIG. 37 shows the relationship between the outgoing angle (°) of the light from the outgoing surface 20c and the relative luminance (arbitrary unit; a.u.) in the illumination device 420. FIG. 37 shows the luminance in the case where the following relationship is fulfilled by the following factors shown in FIG. 38: the refractive index $n_x$ in the direction of the slow axis of the biaxial λ/2 plate 28, the refractive index $n_y$ in the direction of the fast axis of the biaxial λ/2 plate 28, the refractive index $n_z$ in the thickness direction of the biaxial λ/2 plate 28, the thickness d of the biaxial λ/2 plate 28, the wavelength λ of the visible light (not shown), and the angle α made by the polarization direction P of the first polarized light and the slow axis of the biaxial λ/2 plate 28.

$(n_x-n_y)\cdot d=270$ nm;

$(n_x-n_z)/(n_x-n_y)=0.8$; and $\alpha=70°$.

For the purpose of comparison, FIG. 37 also shows the luminance of the illumination device 320 in Embodiment 3 including a monoaxial λ/2 plate (phase plate) as the polarization conversion layer 24.

As can be seen from FIG. 37, the illumination device 420 including a biaxial λ/2 plate as the polarization conversion layer 24 provides a higher luminance of the outgoing light than the illumination device 320 including the monoaxial λ/2 plate as the polarization conversion layer 24. In other words, it is appreciated that the second polarized light is more efficiently converted into the first polarized light by the polarization conversion layer 24 which is a biaxial λ/2 plate.

In the illumination device 420 in this embodiment, a reflection member (for example, a reflection film) may be provided on the counter surface 20d side of the lightguide element 20, and a light scattering member (for example, a light scattering film) may be provided on the outgoing surface 20c side of the lightguide element 20.

In this embodiment, the transmission type liquid crystal display 400 including the illumination device 420 as a backlight is described. Alternatively, the illumination device 420 may be used as a front light of a reflection type liquid crystal display.

Embodiment 5

Figure 39:
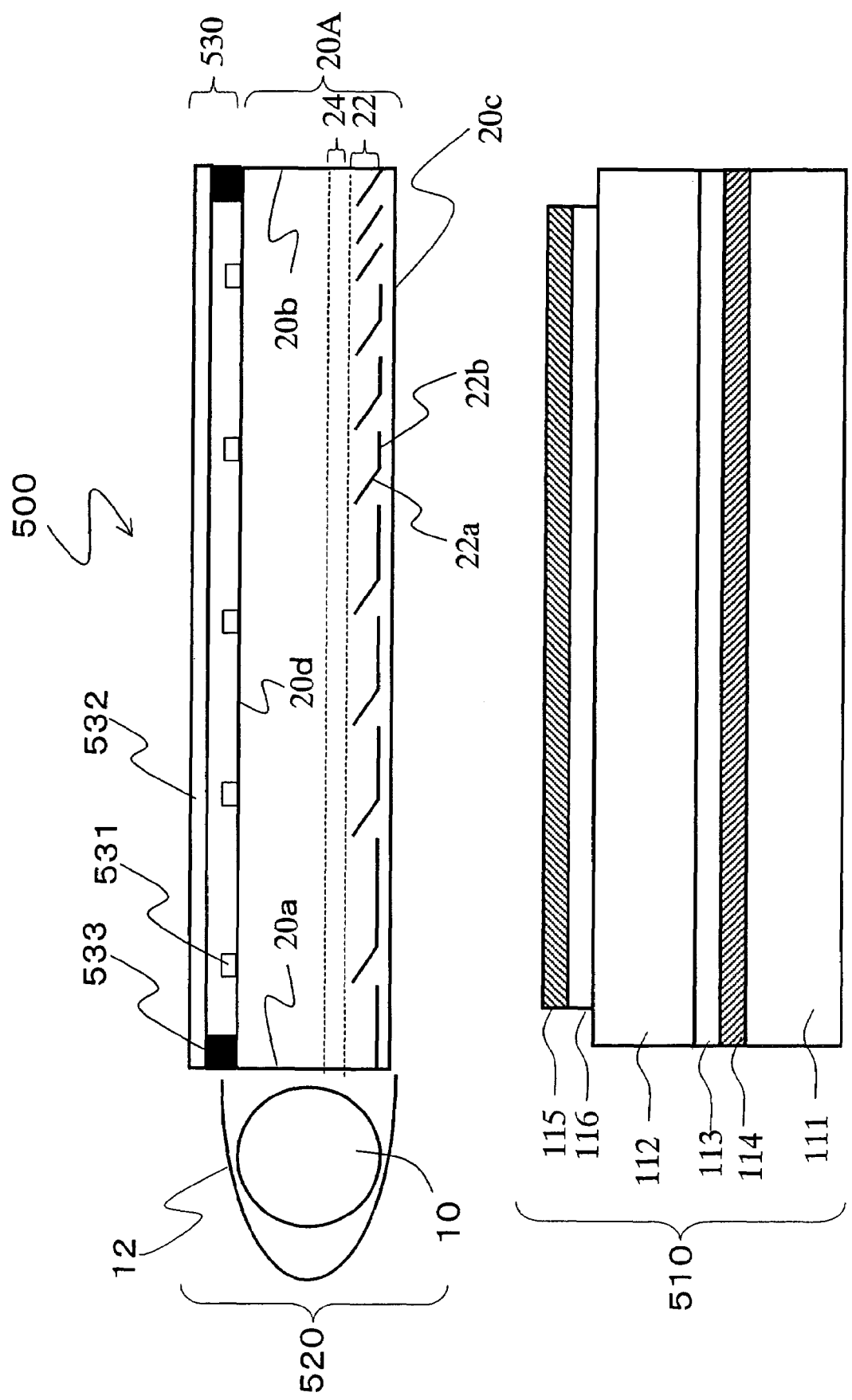
FIG. 39 is a cross-sectional view schematically showing an illumination device 520 in Embodiment 5 according to the present invention and a liquid crystal display (image display apparatus) 500 including the same.

With reference to FIG. 39, a structure of an illumination device 520 in an embodiment according to the present invention and a structure of a liquid crystal display (image display apparatus) 500 including the same will be described.

As shown in FIG. 39, the liquid crystal display 500 is a reflection type liquid crystal display including a reflection type liquid crystal display panel 510 and the illumination device (front light) 520.

The reflection type liquid crystal display panel 510 is a known reflection type liquid crystal display panel, and has, for example, the same structure as that of the reflection type liquid crystal display panel 110 of the liquid crystal display 100 in Embodiment 1.

The illumination device 520 is different from the above-described illumination devices 120, 220, 320 and 420 in that in the illumination device 520, a transparent input device (touch panel) 530 is provided on the counter surface 20d of a lightguide element 20A. In FIG. 39, the polarization selection layer 22 and the polarization conversion layer 24 included in the lightguide element 20A have the same structure as that of the polarization selection layer 22 and the polarization conversion layer 24 included in the lightguide element 20 of each of the illumination devices 320 and 420. Alternatively, the polarization selection layer 22 and the polarization conversion layer 24 of the lightguide element 20A may have the same structure as that of the polarization selection layer 22 and the polarization conversion layer 24 of each of the illumination devices 120 and 220.

The touch panel 530 includes a lower electrode (typically, a transparent conductive film; not shown) and spacers 531 which are formed on the counter surface 20d of the lightguide element 20A, and an upper electrode film 532. The upper electrode film 532 has an upper electrode (typically, a transparent conductive film; not shown) formed on a surface thereof on the side of the lightguide element 20A and is bonded to the counter surface 20d of the lightguide element 20A by an adhesive 531. In the transparent input device 530, the upper electrode and the lower electrode become conductive to each other in accordance with the deformation which is caused by the upper electrode film 532 being pressed, and thus information is input.

The illumination device 520 in this embodiment can be produced, for example, as follows.

Figure 40:
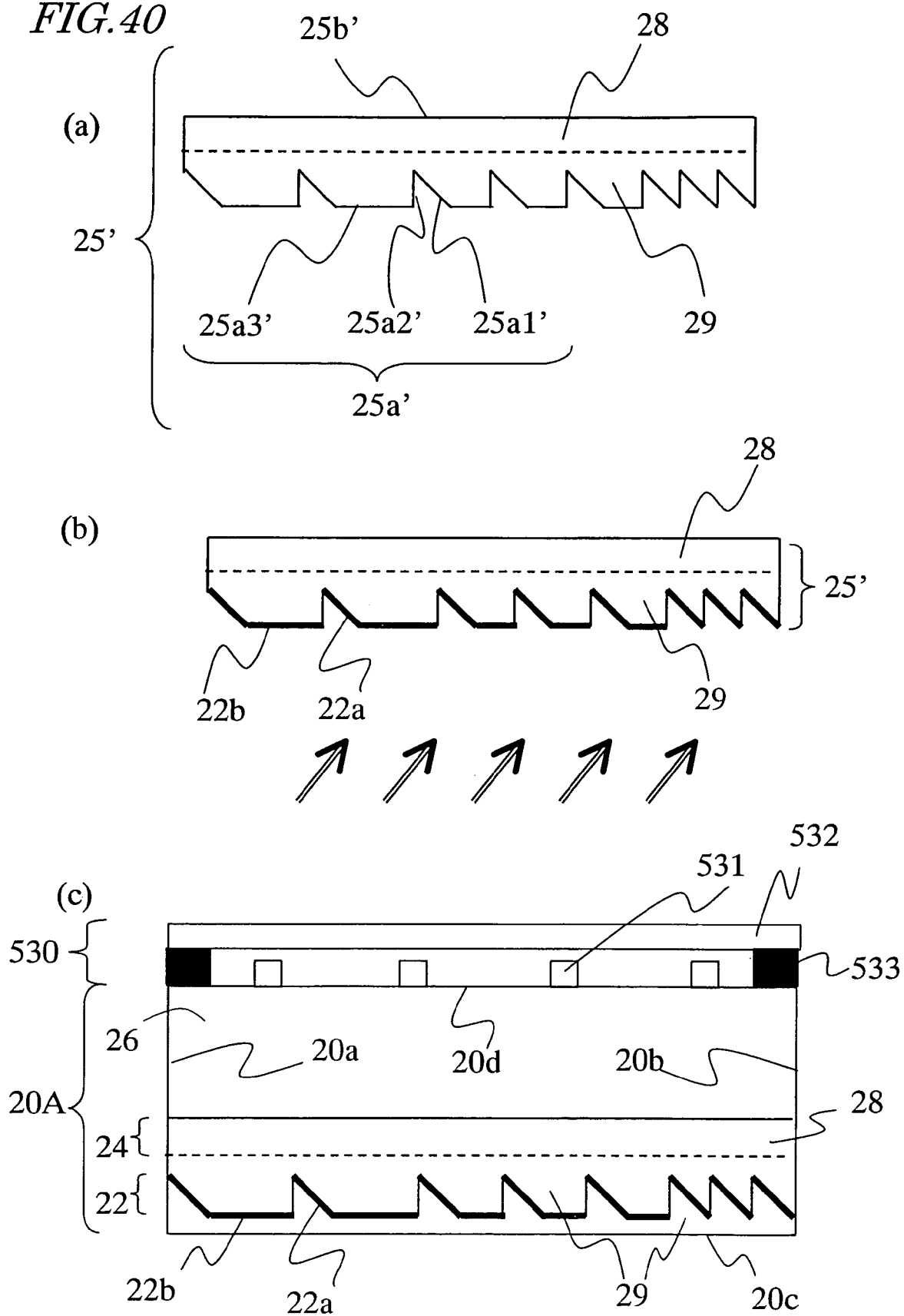
FIGS. 40(a), 40(b) and 40(c) are step cross-sectional views schematically showing production steps of the illumination device 520 in Embodiment 5.

First, as shown in FIG. 40(a), prisms are formed of a transparent resin 29 having a refractive index of 1.51 on a phase plate 28 formed of ARTON (registered trademark) having a refractive index of 1.51, and thus a prism sheet 25' having a thickness of 0.2 mm is formed. The prism sheet 25' has a main surface (front surface) 25a' having a sawtooth-like cross section and a generally flat rear surface 25b'. The main surface 25a' has inclining surfaces (inclining areas) 25a1' inclining with respect to the rear surface 25b', vertical surfaces (vertical areas) 25a2' which are generally vertical to the rear surface 25b', and parallel surfaces (parallel areas) 25a3' which are generally parallel to the rear surface 25b'. The inclining surfaces 25a1' are arranged increasingly densely as becoming farther from one end and closer to the other end of the prism sheet 25' (as becoming farther from the side surface which will act as the incidence surface 20a later).

Next, as shown in FIG. 40(b), $TiO_2$ having a refractive index of 2.3 is vapor-deposited on the inclining surfaces 25a1' of the main surface 25a' of the prism sheet 25' to a thickness of 65 nm, thereby forming dielectric films (dielectric thin films) 22a. At this stage, dielectric films 22b are also formed on the parallel surfaces 25a3' of the main surface 25'.

Then, as shown in FIG. 40(c), the main surface 25a' of the prism sheet 25' is flattened by the transparent resin 29 having a refractive index of 1.51, and a transparent substrate (for example, a glass substrate) 26 having a thickness of 0.7 mm and having the above-described transparent input device (touch panel) 530 formed thereon is bonded to the rear surface 25b' of the prism sheet 25'.

After that, the light source (for example, a cathode ray tube) 10 is located on the incidence surface 20a side of the lightguide element 20A, and a reflection member (for example, a reflection film) 12 is located so as to surround the light source 10. Thus, the illumination device 520 shown in FIG. 39 is completed.

In the reflection type illumination device 500 in this embodiment, the lightguide element 20A of the illumination device 520 as a front light and the transparent input device 530 are integrated together. Therefore, the input function can be added without significantly increasing the thickness.

Embodiment 6

Figure 41:
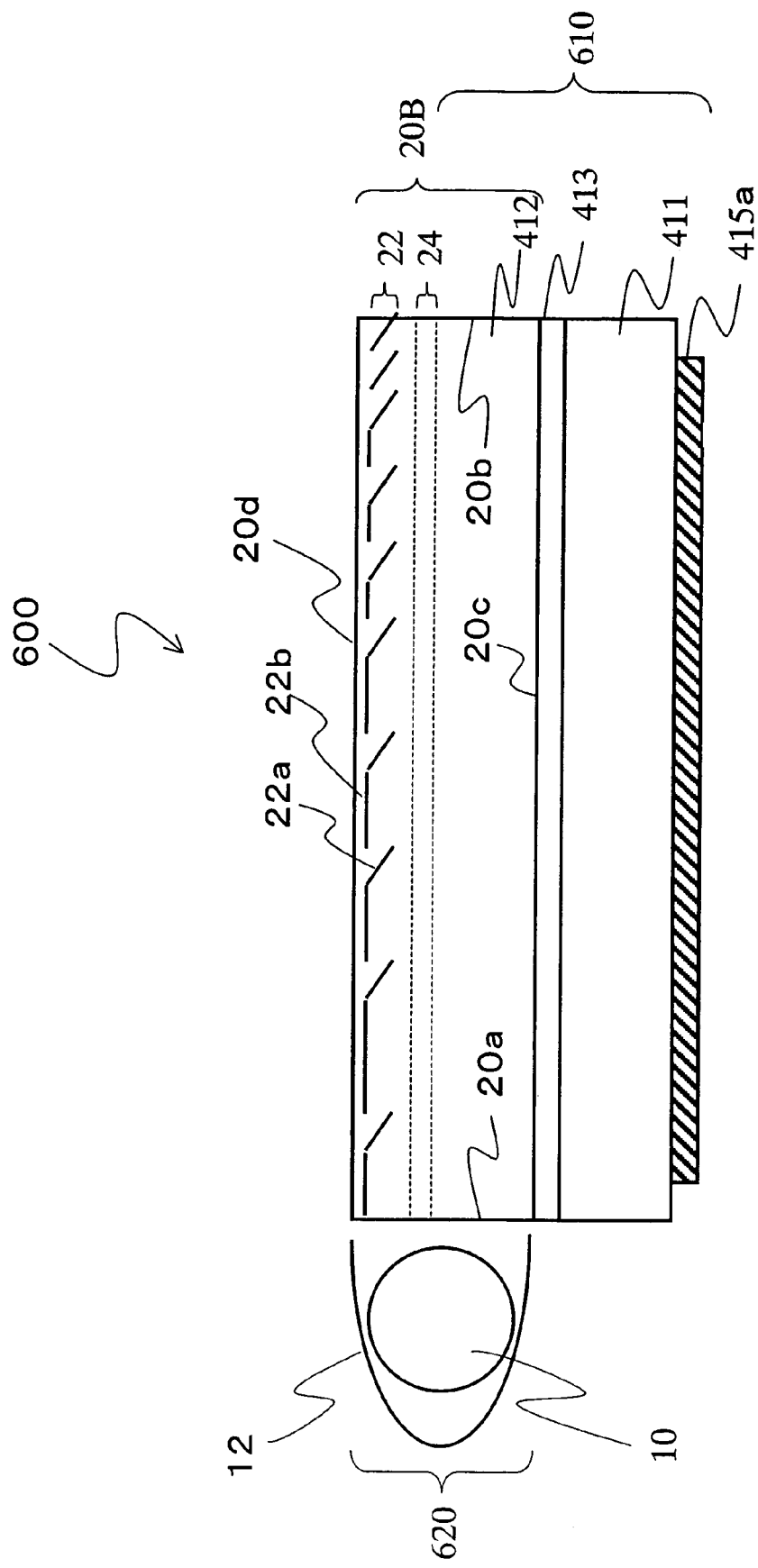
FIG. 41 is a cross-sectional view schematically showing an illumination device 620 in Embodiment 6 according to the present invention and a liquid crystal display (image display apparatus) 600 including the same.

With reference to FIG. 41, a structure of an illumination device 620 in an embodiment according to the present invention and a structure of a liquid crystal display (image display apparatus) 600 including the same will be described.

As shown in FIG. 41, the liquid crystal display 600 is a transmission type liquid crystal display including a transmission type liquid crystal display panel 610 and the illumination device (backlight) 620.

The transmission type liquid crystal display panel 610 has substantially the same structure as that of the transmission type liquid crystal display panel 410 of the liquid crystal display 400 in Embodiment 4. The transmission type liquid crystal display panel 610 is different from the above-described transmission type liquid crystal display panel 410 in that the transmission type liquid crystal display panel 610 includes the polarization selection layer 22 and the polarization conversion layer 24 formed on the substrate 412, instead of the polarizer.

The polarization selection layer 22 and the polarization conversion layer 24 in this embodiment have substantially the same structure as that of the polarization selection layer 22 and the polarization conversion layer 24 shown in FIGS. 33(b) and 35(b), but is different therefrom in being located on the substrate 412 of the transmission type liquid crystal display panel 610.

As described above, in this embodiment, a lightguide element 20B of the illumination device 620 includes the substrate 412, the polarization selection layer 22 and the polar-ization conversion layer 24. The lightguide element 20B also acts as a substrate of the transmission type liquid crystal display panel 410.

The illumination device 620 in this embodiment can be produced, for example, as follows.

Figure 42:
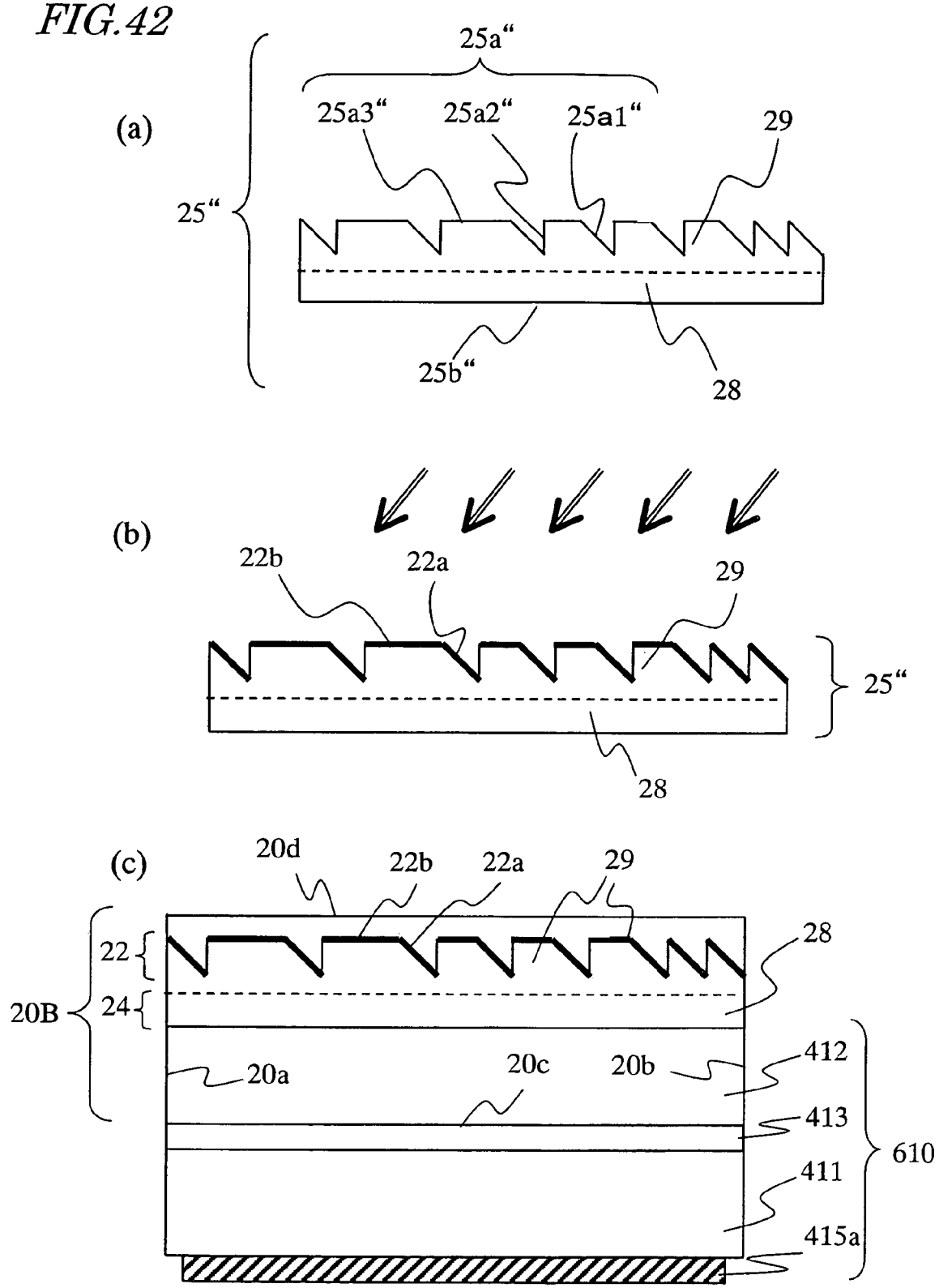
FIGS. 42(a), 42(b) and 42(c) are step cross-sectional views schematically showing production steps of the illumination device 620 in Embodiment 6.
Figure 43:
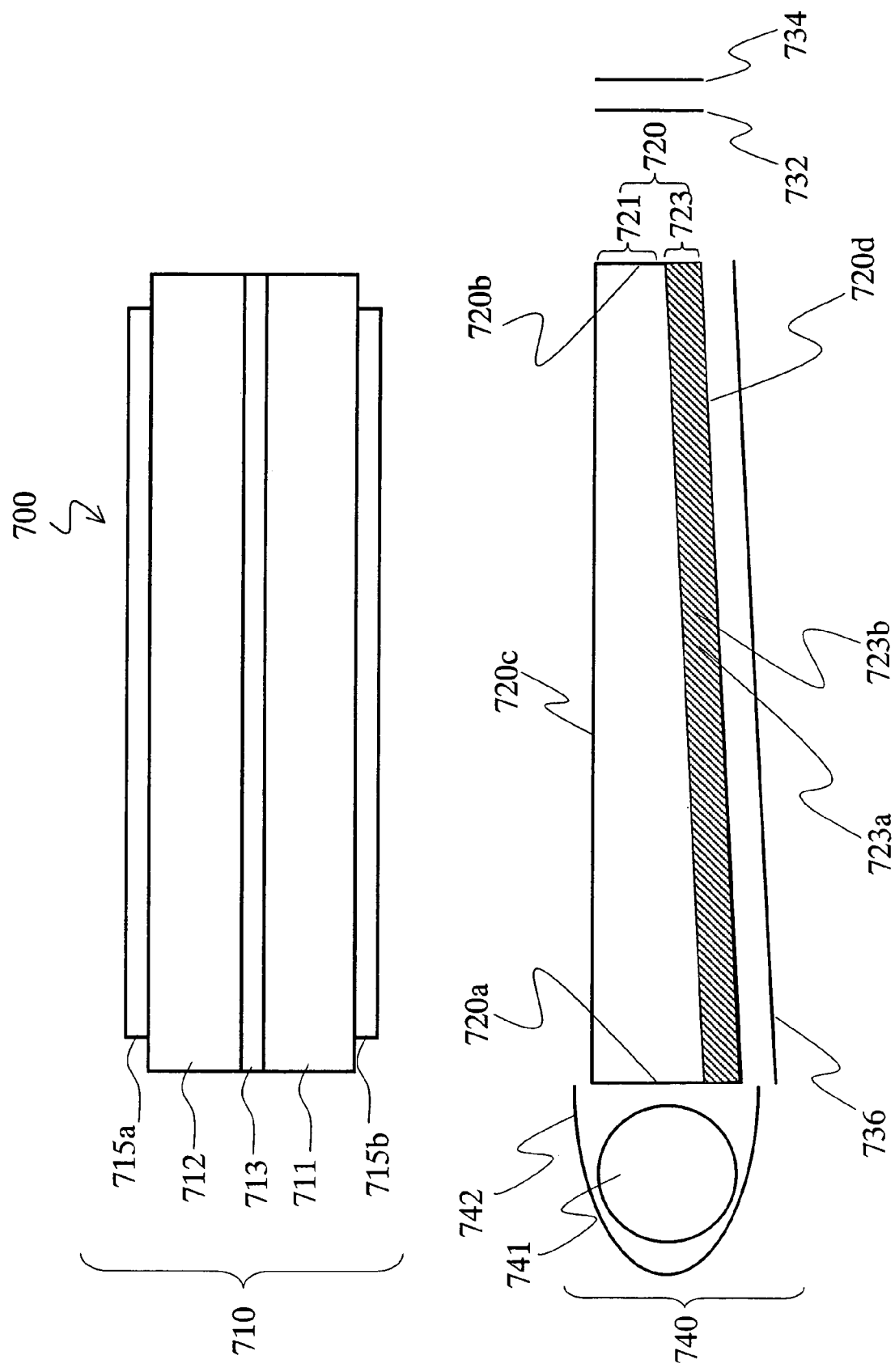
FIG. 43 is a cross-sectional view schematically showing a conventional illumination device 740 and a liquid crystal display 700 including the same.
Figure 44:
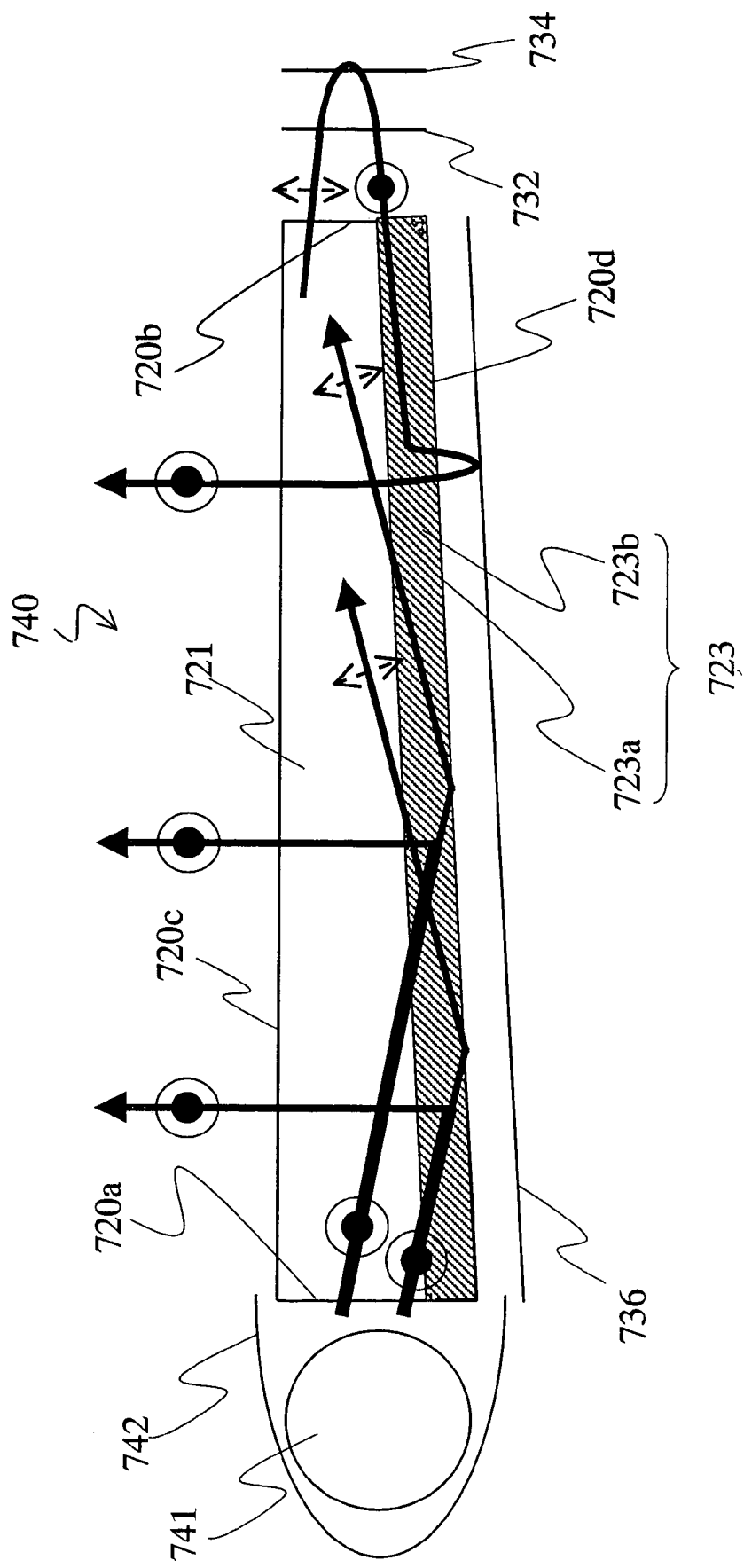
FIG. 44 is a cross-sectional view schematically showing the manner in which light is propagated in a lightguide element 720 of the illumination device 740.
Figure 45:
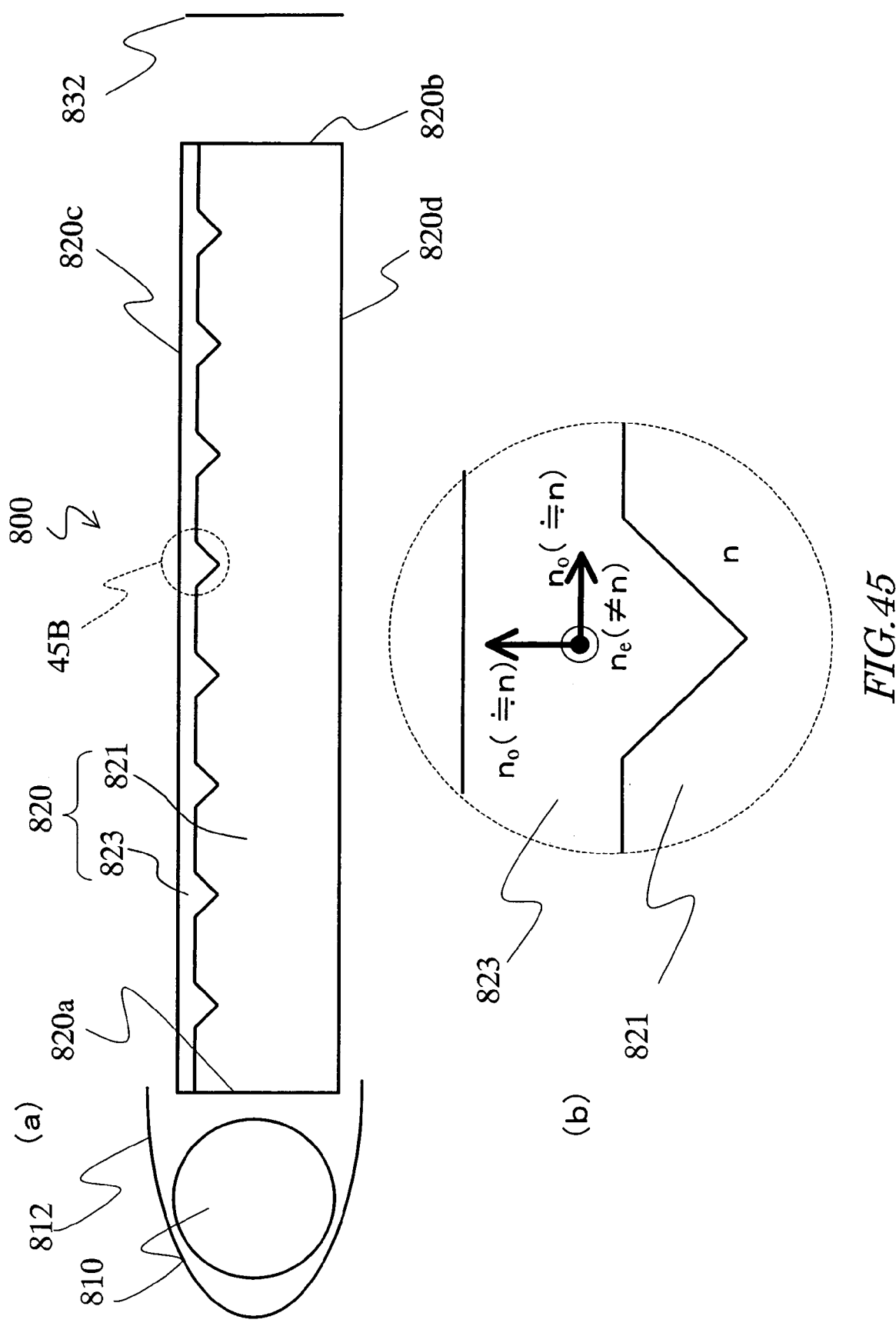
FIG. 45(a) is a cross-sectional view schematically showing a conventional illumination device 800.
FIG. 45(b) is an enlarged view of an area 45B surrounded by the dashed line in FIG. 45(a).
Figure 46:
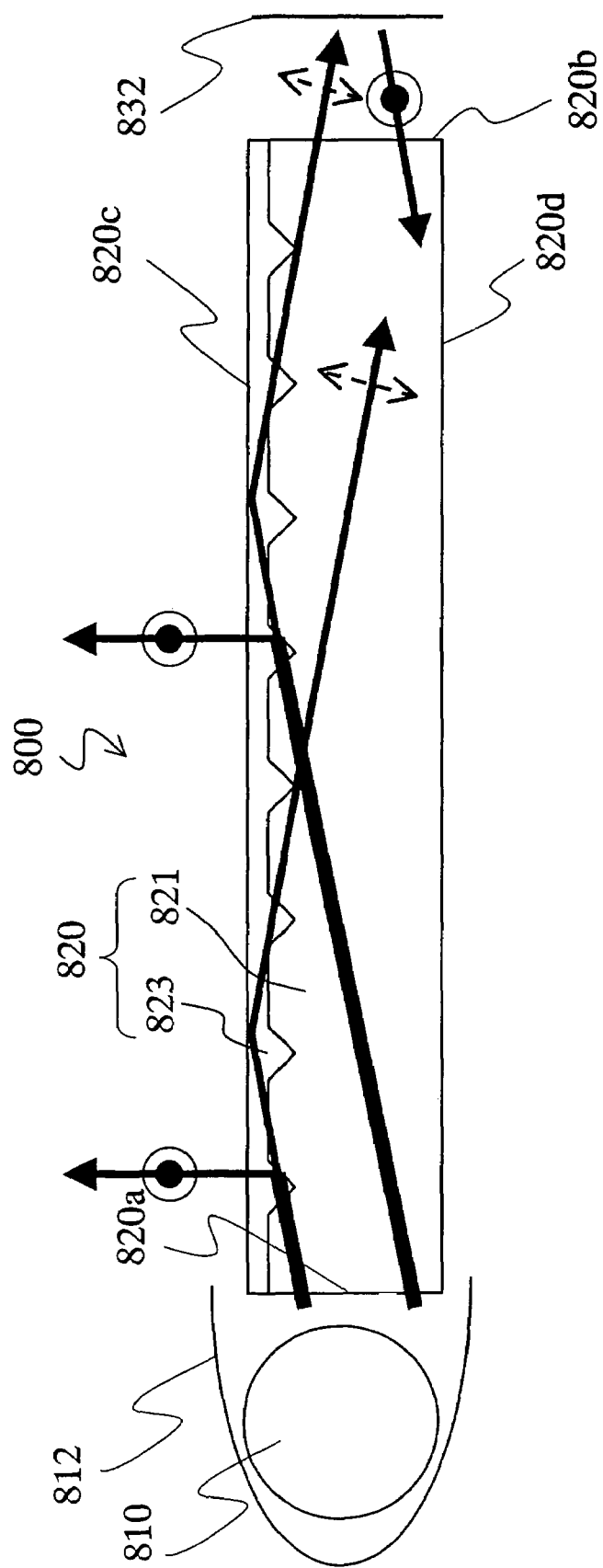
FIG. 46 is a cross-sectional view schematically showing the manner in which light is propagated in a lightguide element 820 of the illumination device 800.
Figure 47:
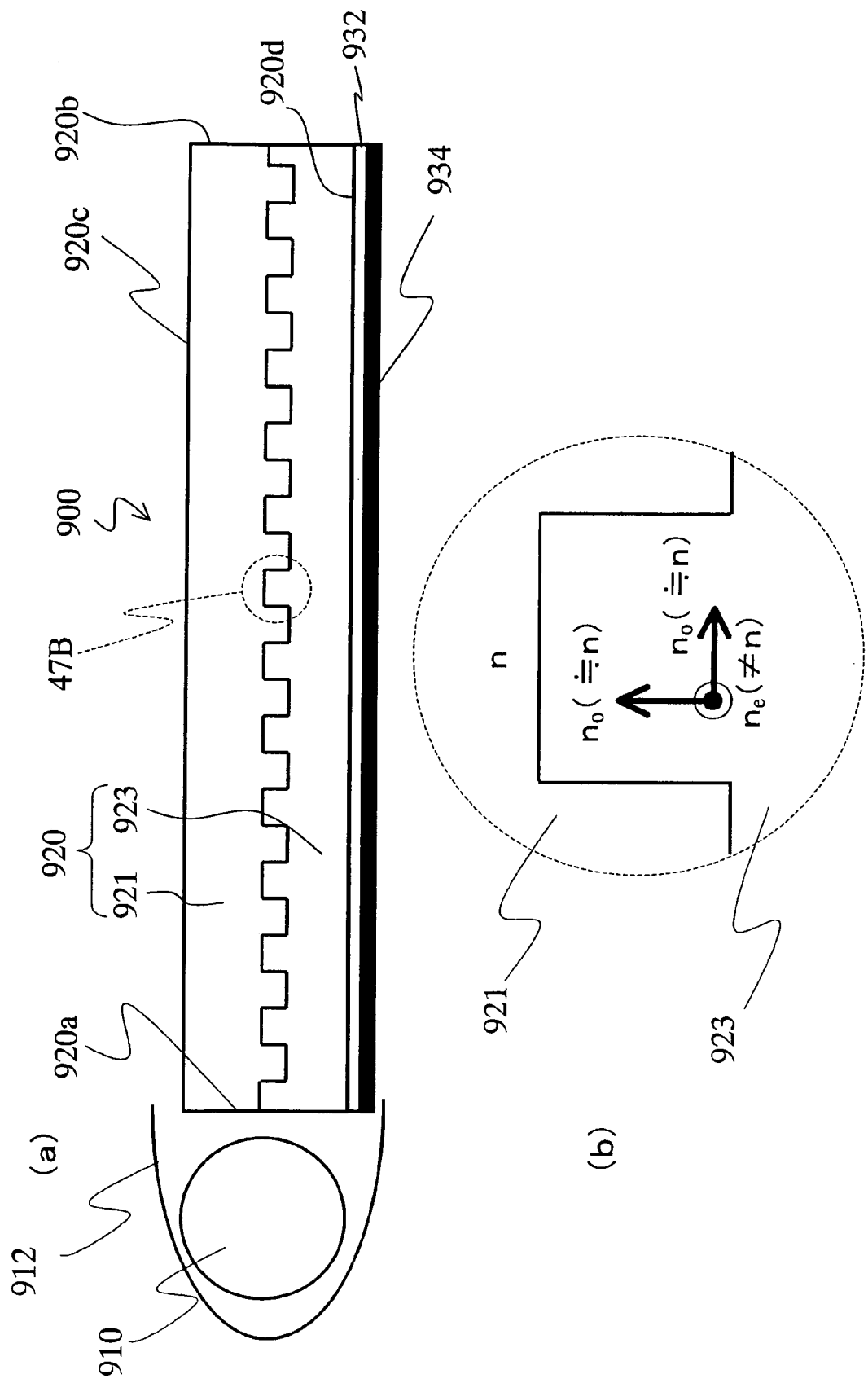
FIG. 47(a) is a cross-sectional view schematically showing a conventional illumination device 900.
FIG. 47(b) is an enlarged view of an area 47B surrounded by the dashed line in FIG. 47(a).
Figure 48:
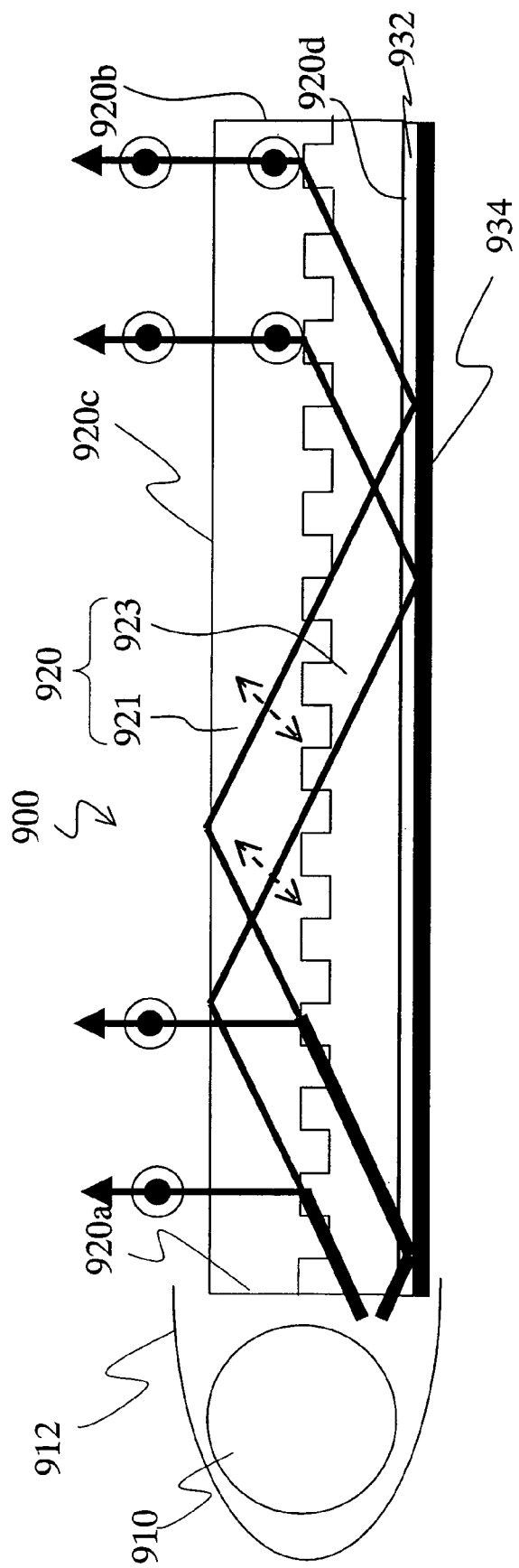
FIG. 48 is a cross-sectional view schematically showing the manner in which light is propagated in a lightguide element 920 of the illumination device 900.

First, as shown in FIG. 42(a), prisms are formed of a transparent resin 29 having a refractive index of 1.53 on a phase plate 28 formed of ZEONOR (registered trademark) having a refractive index of 1.53, and thus a prism sheet 25" having a thickness of 0.2 mm is formed. The prism sheet 25" has a main surface (front surface) 25a" having a sawtooth-like cross section and a generally flat rear surface 25b". The main surface 25a" has inclining surfaces (inclining areas) 25a1" inclining with respect to the rear surface 25b", vertical surfaces (vertical areas) 25a2" which are generally vertical to the rear surface 25b", and parallel surfaces (parallel areas) 25a3" which are generally parallel to the rear surface 25b". The inclining surfaces 25a1" are arranged increasingly densely as becoming farther from one end and closer to the other end of the prism sheet 25" (as becoming farther from the side surface which will act as the incidence surface 20a later).

Next, as shown in FIG. 42(b), $TiO_2$ having a refractive index of 2.3 is vapor-deposited on the inclining surfaces 25a1" of the main surface 25a" of the prism sheet 25" to a thickness of 65 nm, thereby forming dielectric films (dielectric thin films) 22a. At this stage, dielectric films 22b are also formed on the parallel surfaces 25a3" of the main surface 25".

Then, as shown in FIG. 42(c), the main surface 25a" of the prism sheet 25" is flattened by the transparent resin 29 having a refractive index of 1.53, and the rear surface 25b"of the prism sheet 25" is bonded to the substrate 412 of the transmission type liquid crystal display panel 610.

After that, the light source (for example, a cathode ray tube) 10 is located on the incidence surface 20a side of the lightguide element 20B, and a reflection member (for example, a reflection film) 12 is located so as to surround the light source 10. Thus, the illumination device 620 shown in FIG. 41 is completed.

In the transmission type liquid crystal display 600 in this embodiment, the lightguide element 20B of the illumination device 620 as a backlight also acts as a substrate of the transmission type liquid crystal display panel 610, and thus the illumination device 620 and the transmission type liquid crystal display panel 610 are integrated together. Therefore, the display apparatus is reduced in thickness.

When a difference refractive index layer having a different refractive index from that of the substrate 412 is provided between the substrate 412 and the liquid crystal layer 413 of the transmission type liquid crystal display panel 610, light incident on the inside of the lightguide element 20B from the light source 10 is reflected by the interface between the substrate 412 and the different refractive index layer and thus is efficiently propagated in the lightguide element 20B. Therefore, the light from the light source 10 can be effectively utilized as illumination light.

When a polarizer is provided between the substrate 412 and the liquid crystal layer 413 of the transmission type liquid crystal display panel 610, the polarization direction of the light incident on the liquid crystal layer 413 can be further uniformized, and thus the display quality can be improved.

In this embodiment, the transmission type liquid crystal display 600 having the illumination device 620 as a backlight integrated to the transmission type liquid crystal display panel 610 is described. The present invention is not limited to this, and is also preferably applicable to a reflection type liquid crystal display having an illumination device as a front light integrated to a reflection type liquid crystal display panel.

INDUSTRIAL APPLICABILITY

According to the present invention, an illumination device capable of causing light from a light source to go out as light of a specific polarization direction sufficiently efficiently is provided. When this illumination device is used, an image display apparatus providing a high light utilization efficiency and realizing bright display is provided.

An illumination device according to the present invention is preferably usable especially as a backlight or a front light of a liquid crystal display.

The invention claimed is:

1. An illumination device, comprising:
   a light source; and
   a lightguide element including an incidence surface for receiving light emitted from the light source and an outgoing surface from which the light incident from the incidence surface goes out;
   wherein:
   the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction;
   the polarization selection layer reflects the light of the specific polarization direction substantially only toward the outgoing surface, and
   wherein at least part of the polarization conversion layer is substantially parallel to the polarization selection layer, and wherein the polarization conversion layer is a phase plate and is formed of a transparent material having birefringence, and wherein the polarization selection layer includes a plurality of inclining dielectric films provided at a predetermined angle with respect to the outgoing surface.

2. The illumination device of claim 1, wherein directions of a slow axis and a fast axis of the phase plate in a plane parallel to the outgoing surface do not match the specific polarization direction.

3. The illumination device of claim 1, wherein the polarization conversion layer is located oppositely to the outgoing surface with the polarization selection layer interposed therebetween.

4. The illumination device of claim 1, wherein the polarization conversion layer is located closer to the outgoing surface than the polarization selection layer.

5. An image display apparatus, comprising:
   the illumination device of claim 1; and
   a display panel provided on the outgoing surface side of the lightguide element of the illumination device and including at least one polarizer.

6. The image display apparatus of claim 5, wherein the illumination device further includes a transparent input device formed on the counter surface of the lightguide element.

7. The image display apparatus of claim 6, wherein:
   the display panel includes a substrate; and
   the lightguide element included in the illumination device acts as the substrate.

8. An illumination device, comprising:
   a light source; and
   a lightguide element including an incidence surface for receiving light emitted from the light source and an outgoing surface from which the light incident from the incidence surface goes out;
   wherein:
   the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction;
   the polarization selection layer includes a plurality of inclining dielectric films inclining with respect to the outgoing surface, and the plurality of inclining dielectric films are arranged increasingly densely as becoming farther from the incidence surface, and
   wherein at least part of the polarization conversion layer is substantially parallel to the polarization selection layer, and wherein the polarization conversion layer is a phase plate and is formed of a transparent material having birefringence.

9. The illumination device of claim 8, wherein:
   the lightguide element includes a first member having a main surface which includes a plurality of inclining surfaces inclining with respect to the outgoing surface and a plurality of parallel surfaces generally parallel to the outgoing surface, and a second member provided on the main surface of the first member for flattening the main surface;
   the plurality of inclining dielectric films are respectively formed on the plurality of inclining surfaces of the main surface; and
   the plurality of parallel surfaces of the main surface are arranged increasingly sparsely as becoming farther from the incidence surface.

10. The illumination device of claim 9, wherein the polarization selection layer includes a plurality of further dielectric films respectively formed on the plurality of parallel surfaces of the main surface.

11. The illumination device of claim 10, wherein the polarization selection layer is located in the vicinity of the outgoing surface and closer to the outgoing surface than the polarization conversion layer.

12. The illumination device of claim 11, wherein the plurality of parallel surfaces are located closer to the outgoing surface than the plurality of inclining surfaces.

13. The illumination device of claim 9, wherein the first member is a prism sheet including a plurality of prisms arranged on the main surface.

14. The illumination device of claim 9, wherein the second member is a transparent resin layer formed of a transparent resin material.

15. The illumination device of claim 10, wherein the lightguide element further includes a counter surface facing the outgoing surface, and the polarization selection layer is located in the vicinity of the counter surface and closer to the counter surface than the polarization conversion layer.

16. The illumination device of claim 15, wherein the plurality of parallel surfaces are located closer to the counter surface than the plurality of inclining surfaces.

17. An illumination device, comprising:
a light source; and
a lightguide element including an incidence surface for receiving light emitted from the light source and an outgoing surface from which the light incident from the incidence surface goes out;
wherein:
the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction;
the polarization conversion layer is a phase plate;
directions of a slow axis and a fast axis of the phase plate in a plane parallel to the outgoing surface do not match the specific polarization direction, and
wherein at least part of the polarization conversion layer is substantially parallel to the polarization selection layer, and wherein the phase plate has monoaxial refractive index anisotropy.

18. The illumination device of claim 17, wherein a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $(n_x-n_z)/(n_x-n_y) \approx 0, 0 < (n_x-n_y) \cdot d < \lambda$, and $10° < \alpha < 30°$ or $40° < \alpha < 60°$.

19. The illumination device of claim 17, wherein a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $(n_x-n_z)/(n_x-n_y) \approx 0$, $(n_x-n_y) \cdot d = \lambda/2$, and $10° < \alpha < 30°$.

20. The illumination device of claim 17, wherein a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $(n_x-n_z)/(n_x-n_y) \approx 1$, $\lambda/4 < (n_x-n_y) \cdot d < 5\lambda/4$, and $20° < \alpha < 90°$.

21. The illumination device of claim 17, wherein a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $(n_x-n_z)/(n_x-n_y) \approx 1$, $(n_x-n_y) \cdot d = \lambda/2$, and $20° < \alpha < 80°$.

22. An illumination device, comprising:
a light source; and
a lightguide element including an incidence surface for receiving light emitted from the light source and an outgoing surface from which the light incident from the incidence surface goes out;
wherein:
the lightguide element includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction;
the polarization conversion layer is a phase plate;
directions of a slow axis and a fast axis of the phase plate in a plane parallel to the outgoing surface do not match the specific polarization direction, and
wherein at least part of the polarization conversion layer is substantially parallel to the polarization selection layer, and
wherein the phase plate has biaxial refractive index anisotropy.

23. The illumination device of claim 22, wherein a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $0.6 < (n_x-n_z)/(n_x-n_y) < 0.9$, $\lambda/4 < (n_x-n_y) \cdot d < 3\lambda/4$, and $60° < \alpha < 80°$.

24. The illumination device of claim 22, wherein a refractive index $n_x$ in the direction of the slow axis of the phase plate, a refractive index $n_y$ in the direction of the fast axis of the phase plate, a refractive index $n_z$ in a thickness direction of the phase plate, a thickness d of the phase plate, a wavelength $\lambda$ of visible light, and an angle $\alpha$ made by the specific polarization direction and the slow axis of the phase plate fulfill the relationship of $0.6 < (n_x-n_z)/(n_x-n_y) < 0.9$, $(n_x-n_y) \cdot d = \lambda/2$, and $60° < \alpha < 80°$.

25. A lightguide element including an incidence surface for receiving light emitted from a light source and an outgoing surface from which the light incident from the incidence surface goes out;
wherein:
the lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction;
the polarization selection layer reflects the light of the specific polarization direction substantially only toward the outgoing surface, and
wherein at least part of the polarization conversion layer is substantially parallel to the polarization selection layer, and wherein the polarization conversion layer is a phase plate and is formed of a transparent material having birefringence, and wherein the polarization selection layer includes a plurality of inclining dielectric films provided at a predetermined angle with respect to the outgoing surface.

26. A lightguide element including an incidence surface for receiving light emitted from a light source and an outgoing surface from which the light incident from the incidence surface goes out;
wherein:
the lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction; and the polarization selection layer includes a plurality of inclining dielectric films inclining with respect to the outgoing surface, and the plurality of inclining dielectric films are arranged increasingly densely as becoming farther from the incidence surface, and wherein the polarization conversion layer is a phase plate and is formed of a transparent material having birefringence.

27. A lightguide element including an incidence surface for receiving light emitted from a light source and an outgoing surface from which the light incident from the incidence surface goes out;

wherein:

the lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction;

the polarization conversion layer is a phase plate; and directions of a slow axis and a fast axis of the phase plate in a plane parallel to the outgoing surface do not match the specific polarization direction, and wherein the phase plate has monoaxial refractive index anisotropy.

28. A lightguide element including an incidence surface for receiving light emitted from a light source and an outgoing surface from which the light incident from the incidence surface goes out;

wherein:

the lightguide element further includes a polarization selection layer for causing light of a specific polarization direction, among the light incident from the incidence surface, to selectively go out from the outgoing surface, and a polarization conversion layer for converting light of a polarization direction, different from the specific polarization direction, into the light of the specific polarization direction;

the polarization conversion layer is a phase plate;

directions of a slow axis and a fast axis of the phase plate in a plane parallel to the outgoing surface do not match the specific polarization direction; and wherein the phase plate has biaxial refractive index anisotropy.

* * * * *